(12) United States Patent
Gomi et al.

(10) Patent No.: US 6,324,549 B1
(45) Date of Patent: Nov. 27, 2001

(54) DISTRIBUTED SYSTEM AND MEMORY MANAGEMENT DEVICE, METHOD, AND STORAGE MEDIUM

(75) Inventors: Hidehito Gomi; Satoru Fujita, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/261,257

(22) Filed: Mar. 3, 1999

(30) Foreign Application Priority Data

Mar. 4, 1998 (JP) .................................................. 10-052325

(51) Int. Cl.⁷ ...................................................... G06F 12/00
(52) U.S. Cl. ............................ 707/206; 707/10; 707/104; 707/103; 709/201; 709/238; 709/243; 711/159; 711/160
(58) Field of Search .................................. 707/1–10, 104, 707/105, 206; 709/201, 238–244; 711/159, 160

(56) References Cited

U.S. PATENT DOCUMENTS

| 4,755,939 | * | 7/1988 | Watson | 707/206 |
| 5,355,483 | * | 10/1994 | Serlet | 711/159 |
| 5,535,390 | * | 7/1996 | Hildebrandt | 709/312 |
| 5,560,003 | * | 9/1996 | Nilsen et al. | 707/206 |
| 5,832,529 | * | 11/1998 | Wollrath et al. | 707/206 |
| 6,105,040 | * | 8/2000 | Agesen | 707/206 |

OTHER PUBLICATIONS

An efficient, refernece weight–based garbage collection method for distributed system. –Corporaal, H.; Veldman, T; van de Goor, A.J. (Mar. 7–9, 1990; ISBN 0–8186–2035–8; from p463–p465).*

Bevan, D., "Distributed Garbage Collection Using Reference Counting", Springer Verlag, LN CS 259, Jun. 1987, pp. 176–187.

* cited by examiner

Primary Examiner—Hosain T. Alam
Assistant Examiner—Anh Ly
(74) Attorney, Agent, or Firm—McGinn & Gibb, PLLC

(57) ABSTRACT

A remote access managing means of a module manages each of an object that references an outside object and an object that is referenced from the outside by adding a reference weight to each object. In other words, the remote access managing means stores a reference weight according to the type of communication message in the object information of communication messages for dealing with outside modules. For example, an additional reference weight that is set by a reference weight. managing means is stored in an execution request message to an outside object. A heap memory managing means reclaims memory regions of unnecessary objects in the heap memory regions in accordance with the reference weight that is set through the exchange of this type of messages.

67 Claims, 64 Drawing Sheets

FIG.18B

| | |
|---|---|
| E1 | PARTIAL REFERENCE WEIGHT OF A TARGET OBJECT < MINIMUM ? |
| E3 | ADDITIONAL REFERENCE WEIGHT ← POSITIVE PREDETERMINED VALUE |
| E5 | PARTIAL REFERENCE WEIGHT OF A TARGET OBJECT < MAXIMUM ? |
| E7 | PARTIAL REFERENCE WEIGHT ← PARTIAL REFERENCE WEIGHT + NEGATIVE PREDETERMINED VALUE |
| E8 | ADDITIONAL REFERENCE WEIGHT ← NEGATIVE PREDETERMINED VALUE |
| E10 | ADDITIONAL REFERENCE WEIGHT ← 0 |
| E11 | IS AN ARGUMENT OBJECT LOCAL ? |
| E13 | IS THE REMOTE REFERENCE DESTINATION THE SAME AS THE REFERENCE DESTINATION OF THE TARGET OBJECT ? |
| E15 | ADDITIONAL REFERENCE WEIGHT ← 0 |
| E17 | PARTIAL REFERENCE WEIGHT > 1 ? |
| E21 | SUPPLEMENT A PARTIAL REFERENCE WEIGHT |
| E22 | DIVIDE A PARTIAL REFERENCE WEIGHT |
| E23 | ADDITIONAL REFERENCE WEIGHT ← REFERENCE WEIGHT PORTION THAT WAS DECREASED IN STEP E22 |
| E25 | TOTAL REFERENCE WEIGHT ← TOTAL REFERENCE WEIGHT + PREDETERMINED VALUE |
| E26 | ADDITIONAL REFERENCE WEIGHT ← PREDETERMINED VALUE |
| E27 | IS STORAGE COMPLETED FOR ALL ARGUMENT OBJECTS ? |
| E30 | TRANSMIT THE MESSAGE |

FIG. 30
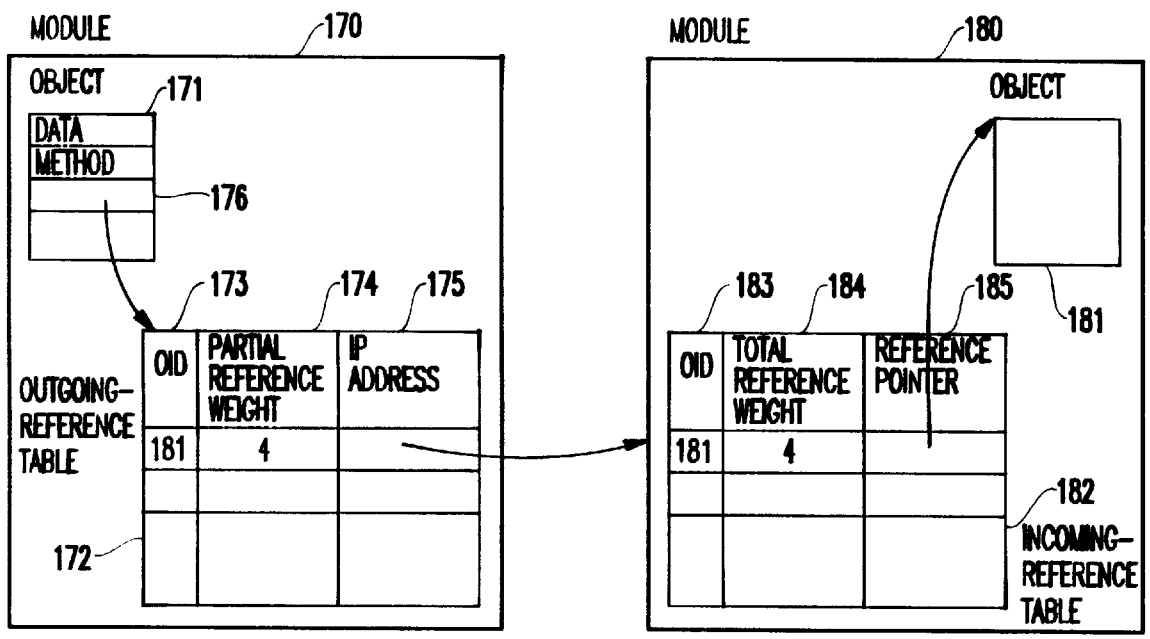
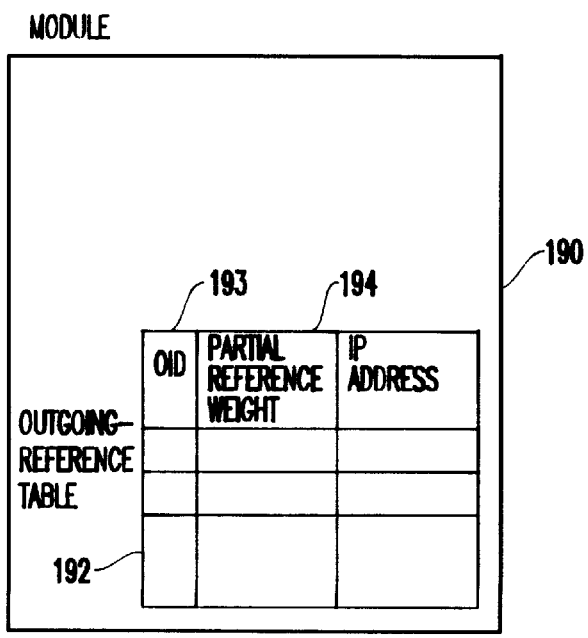

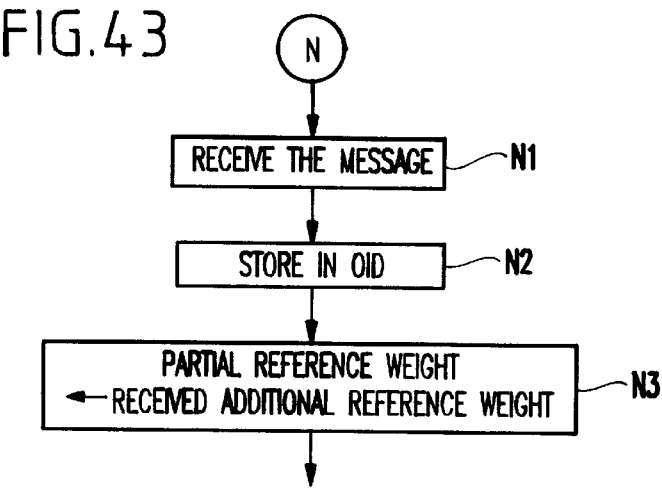
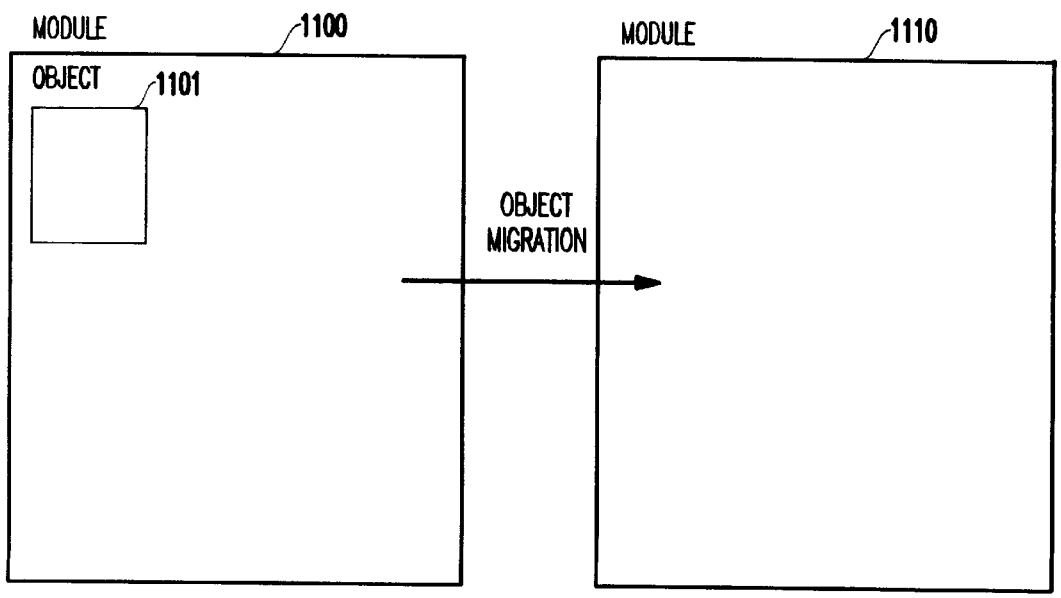

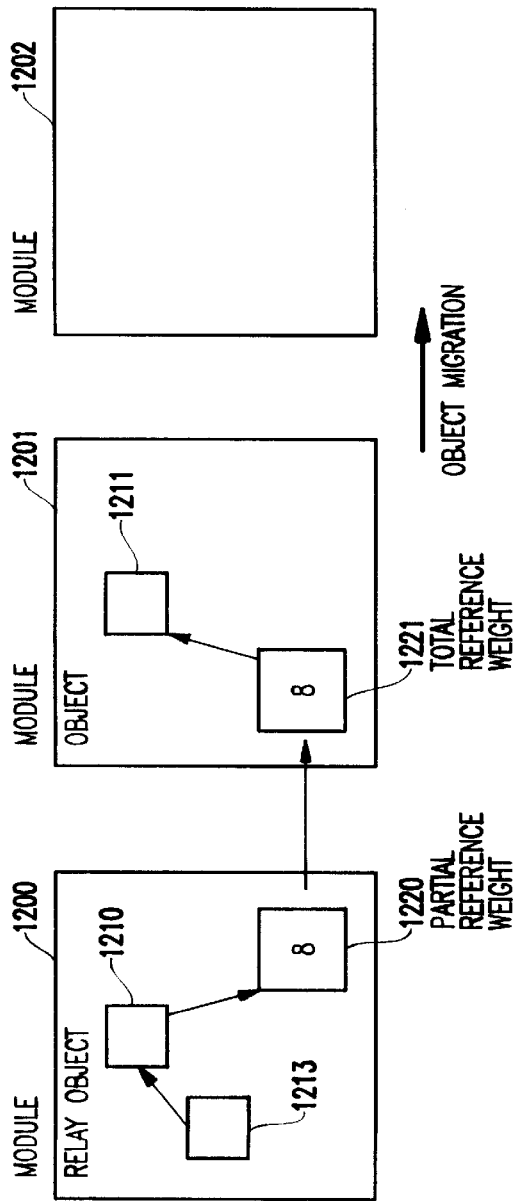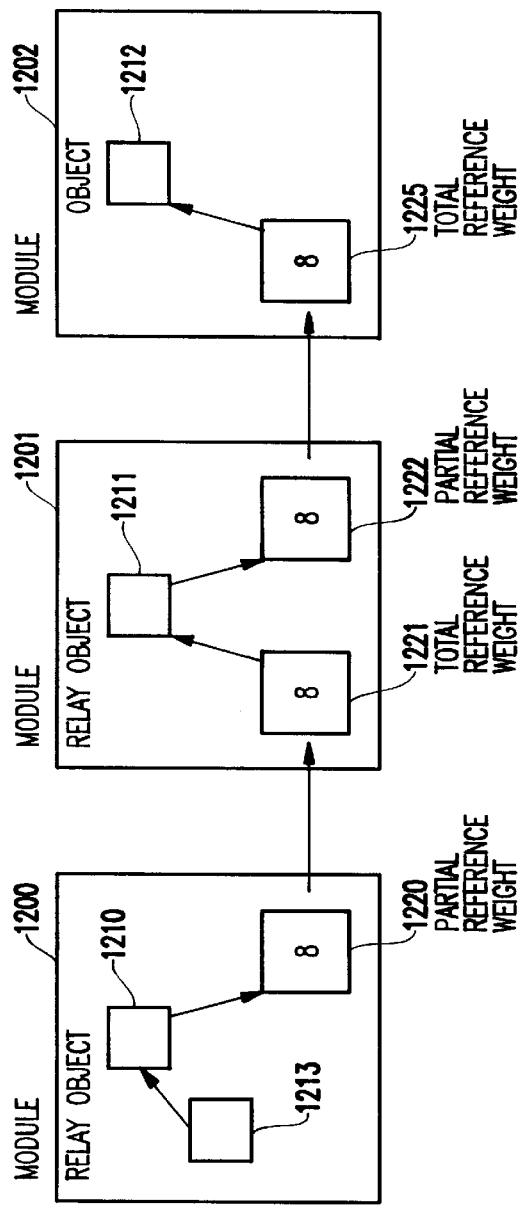

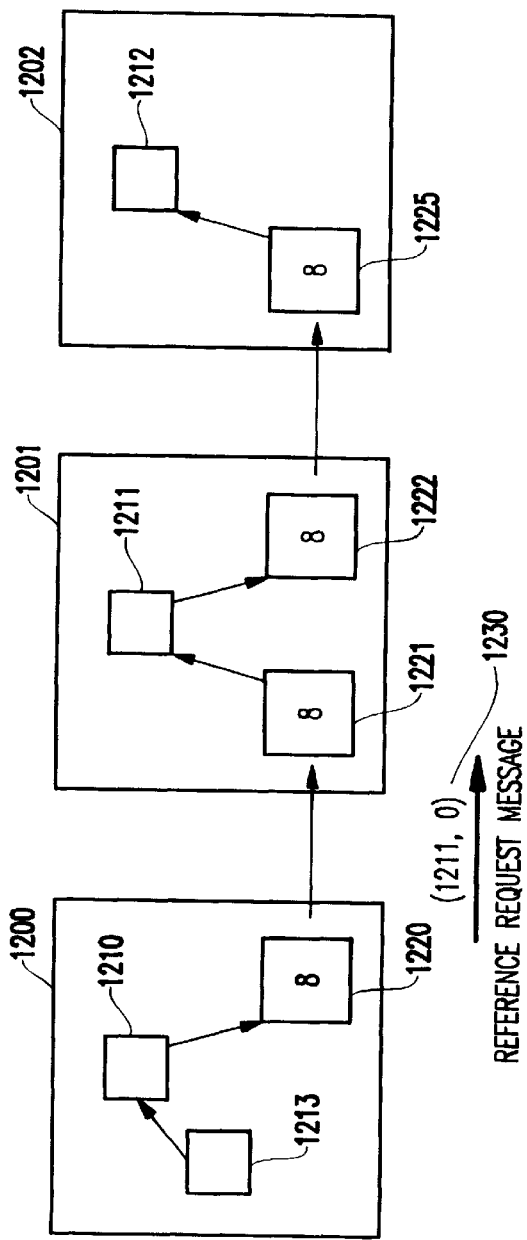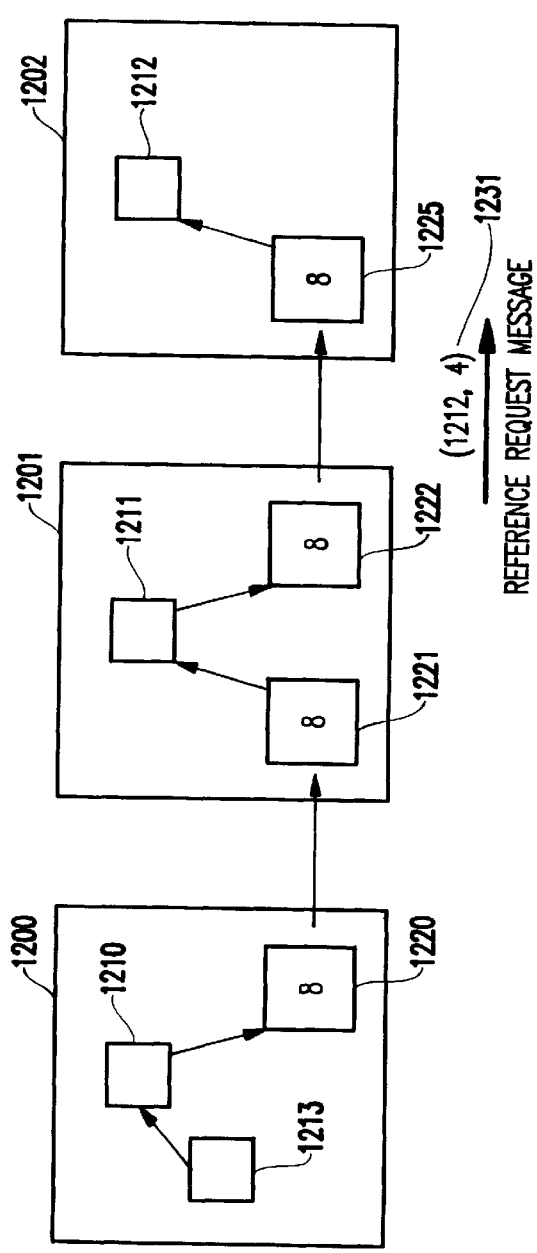

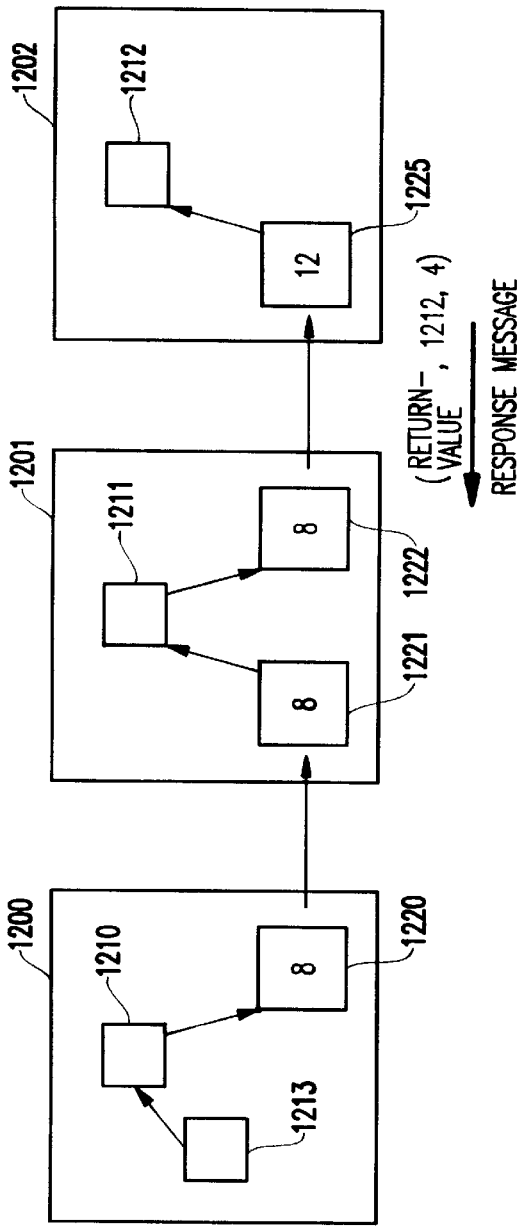
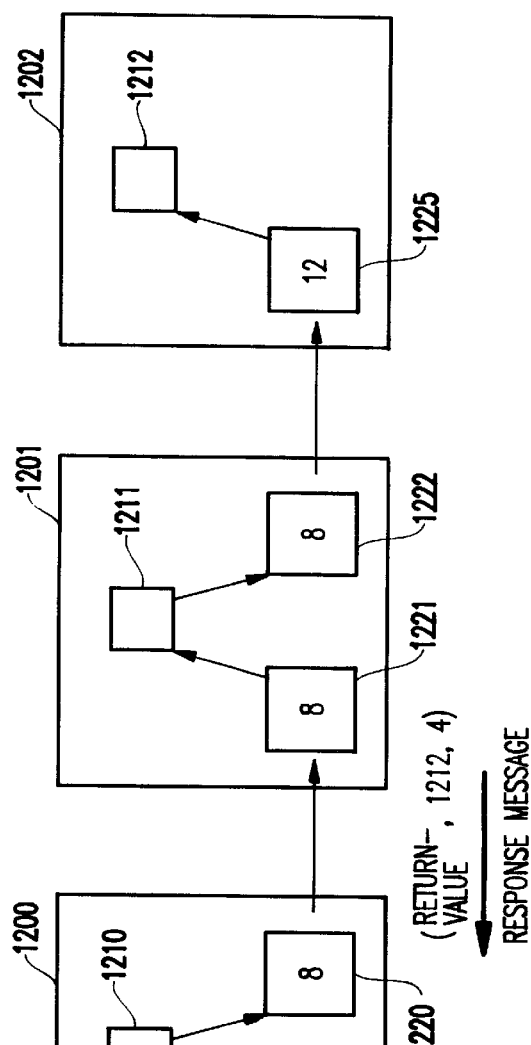

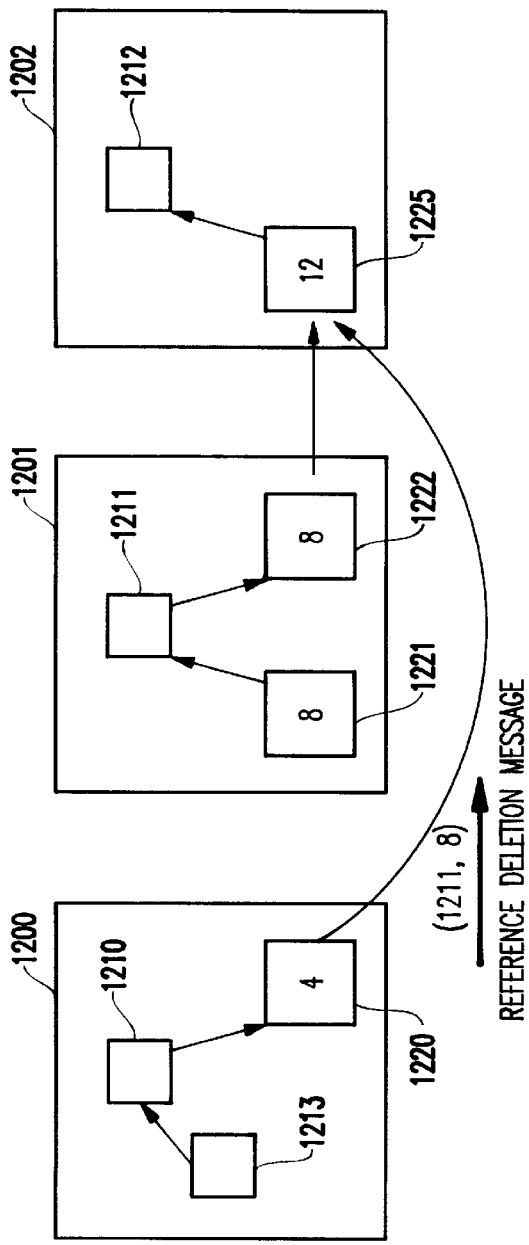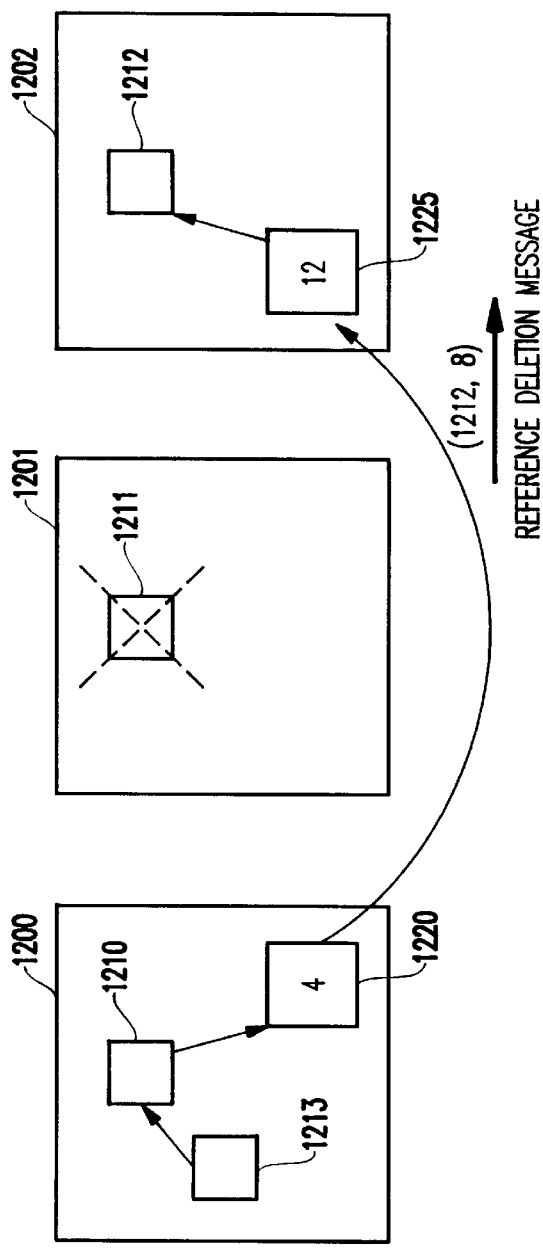

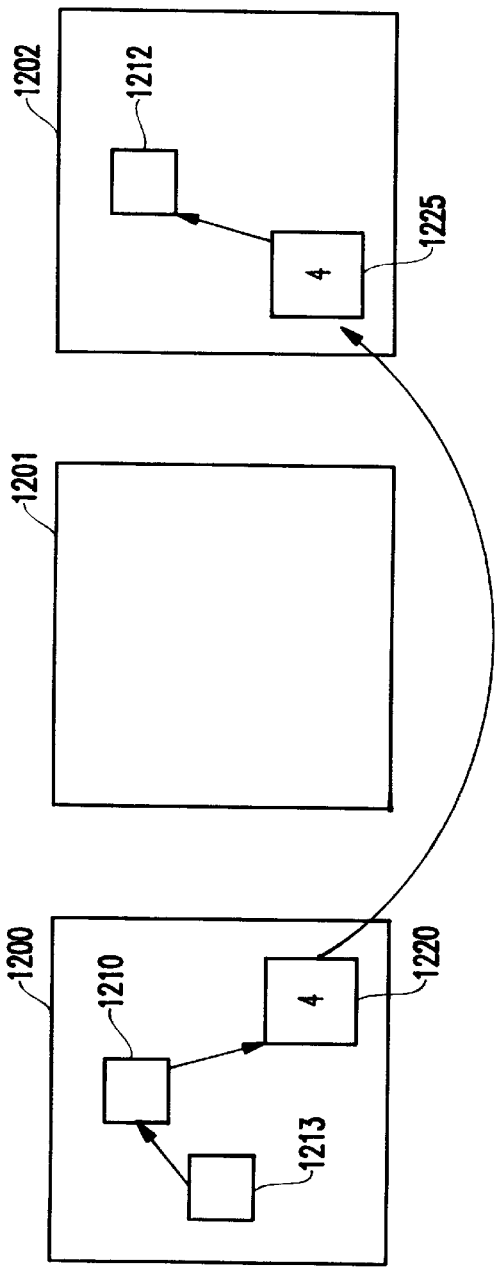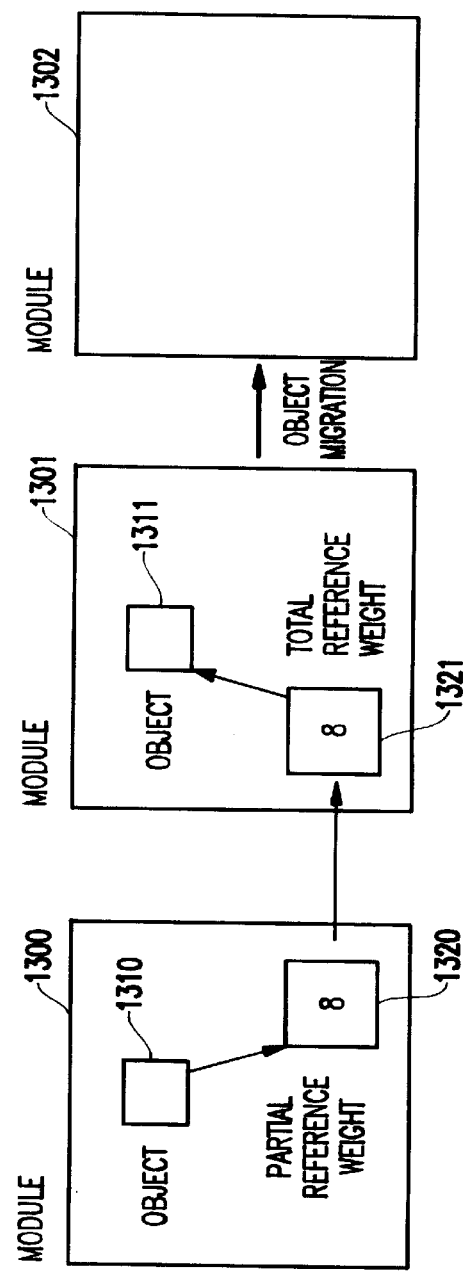

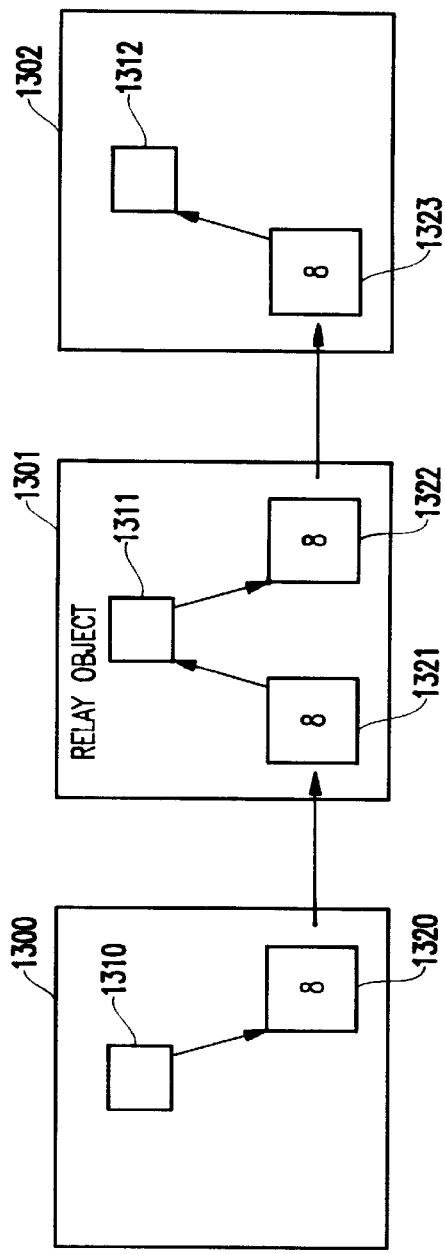
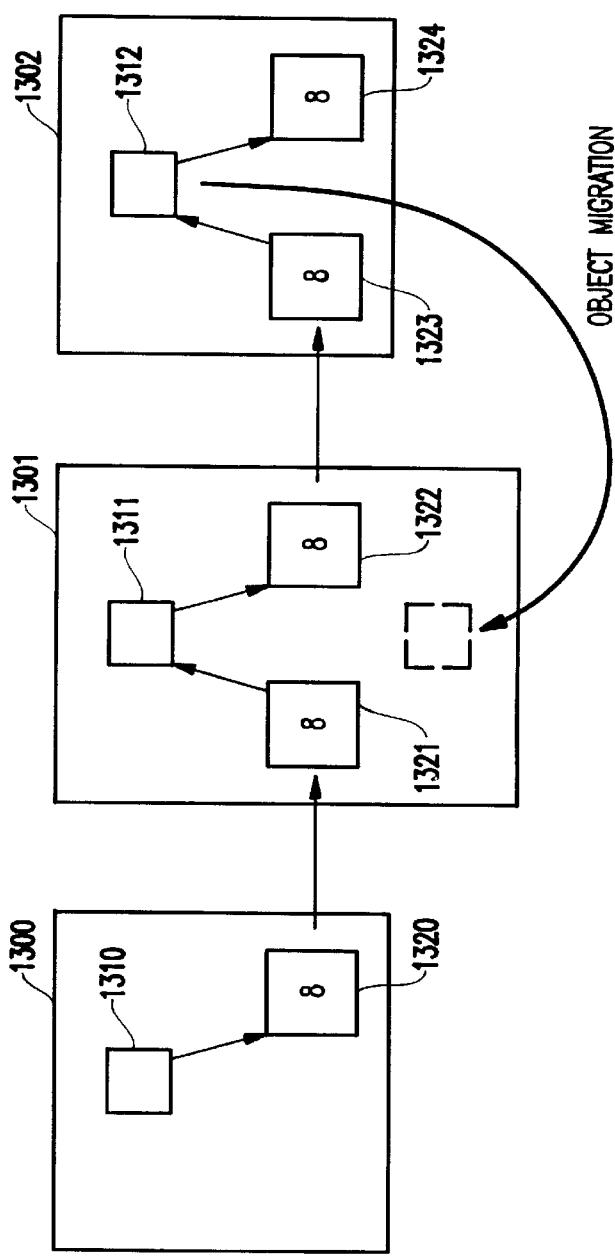

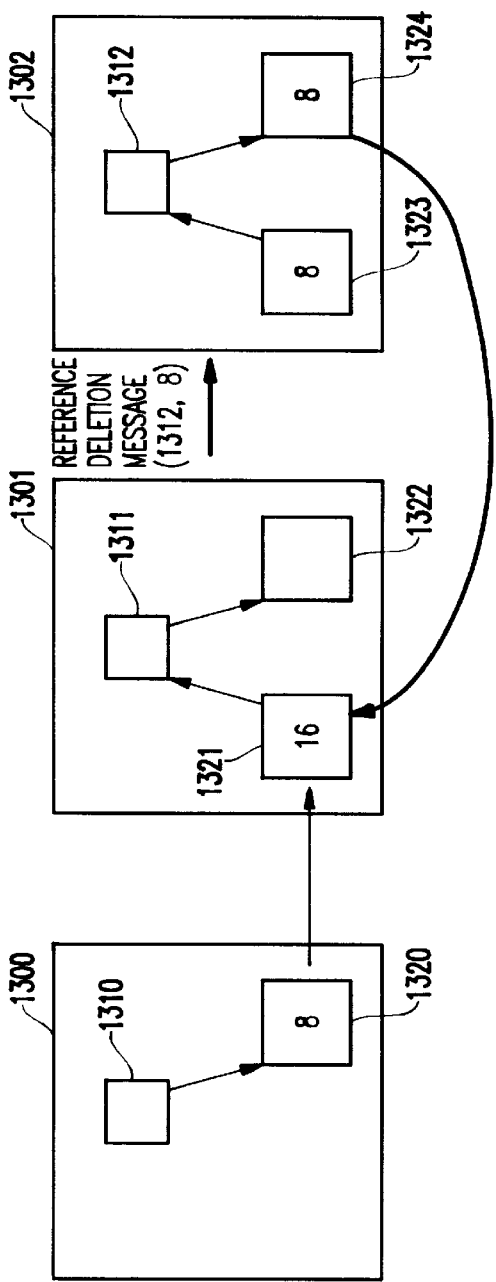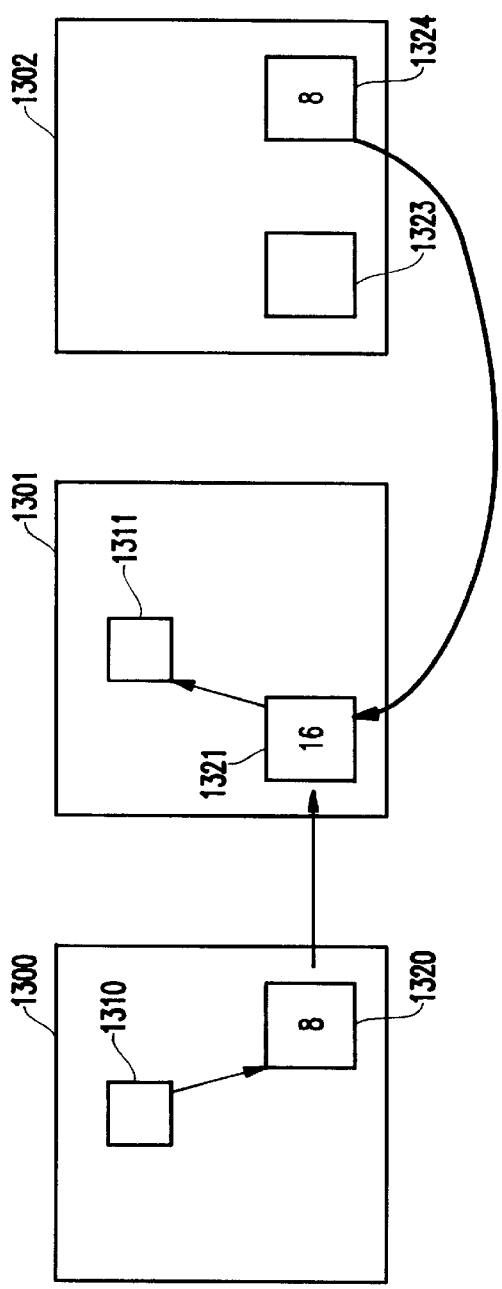

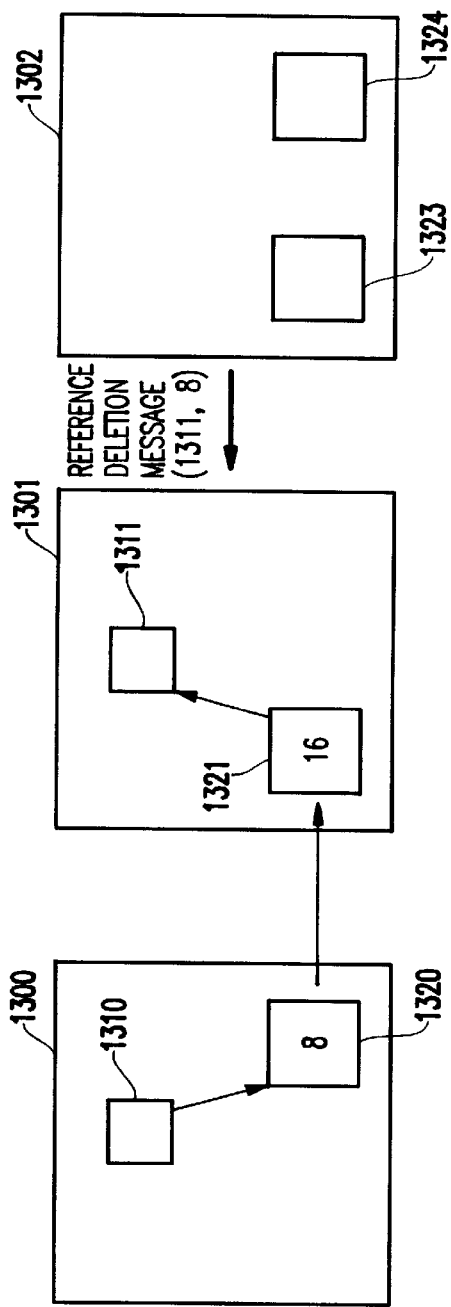
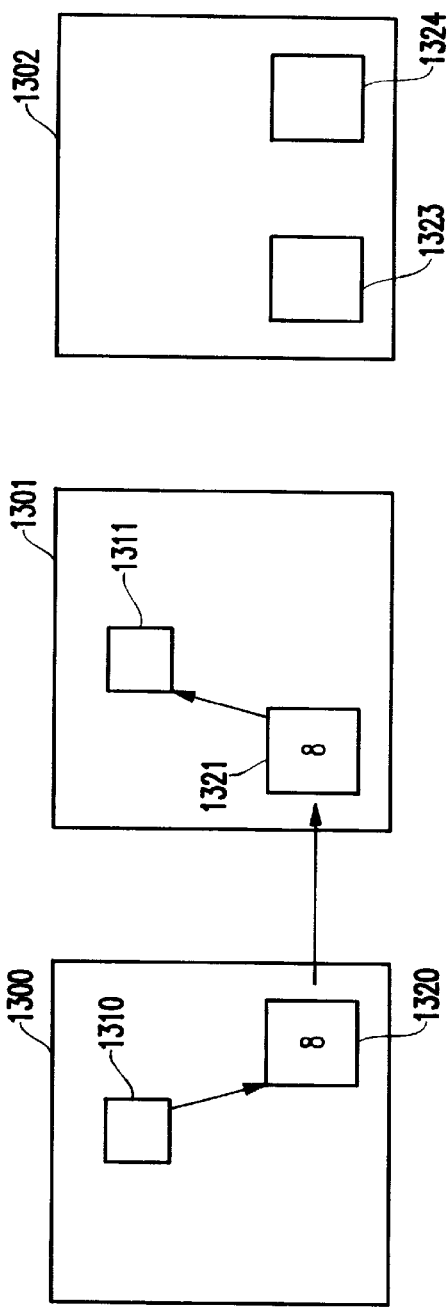

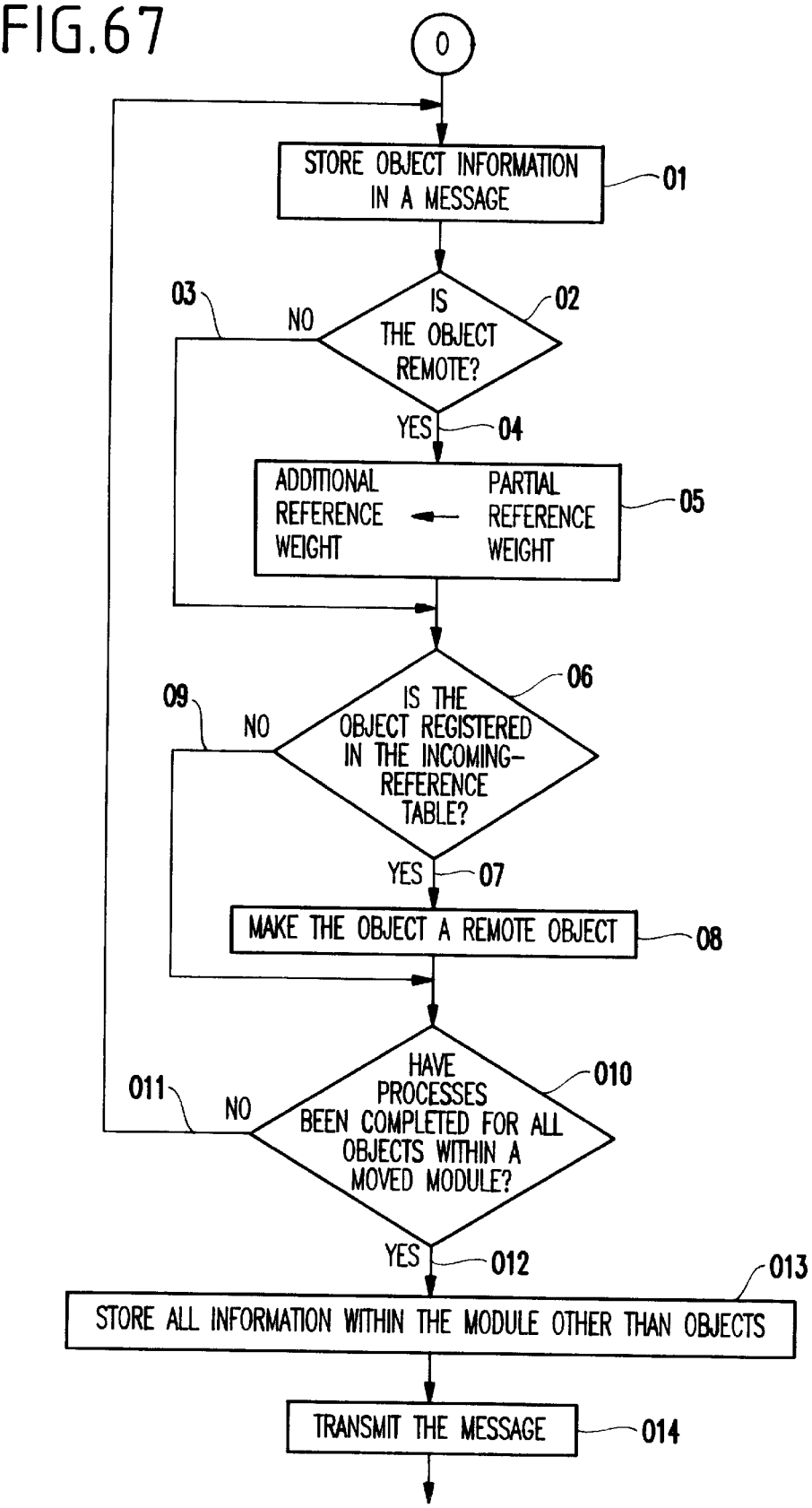

FIG.68B

| | |
|---|---|
| P1 | RECEIVE THE MESSAGE. STORE MIGRATING MODULE INFORMATION OTHER THAN THE OBJECT. |
| P2 | DO RELAY MODULES AND RELAY OBJECTS EXIST ? |
| P4 | IN THE RELAY OBJECT REGISTERED IN THE INCOMING-REFERENCE TABLE ? |
| P6 | TOTAL REFERENCE WEIGHT ← TOTAL REFERENCE WEIGHT + TOTAL REFERENCE WEIGHT RELATING TO THE MIGRATED OBJECT |
| P8 | RESERVE A REGION FOR THE MIGRATED OBJECT IN THE INCOMING-REFERENCE TABLE |
| P9 | TOTAL REFERENCE WEIGHT ← PREDETERMINED VALUE |
| P10 | STORE A REFERENCE POINTER AND OID |
| P11 | PRODUCE AND TRANSMIT A REFERENCE DELETION MESSAGE |
| P12 | IS THE MIGRATED OBJECT LOCAL ? |
| P14 | CHANGE RELAY OBJECTS TO LOCAL |
| P16 | UPDATE THE OUTGOING-REFERENCE TABLE |
| P17 | PARTIAL REFERENCE WEIGHT ← PARTIAL REFERENCE WEIGHT HELD BY THE MOVED OBJECT |
| P19 | RESERVE REGIONS FOR MIGRATED OBJECTS |
| P20 | ASSIGN OID |
| P21 | IS THE MIGRATED OBJECT LOCAL ? |
| P23 | STORE THE DATA OF THE MIGRATED OBJECT |
| P25 | RESERVE A REGION FOR THE MIGRATED OBJECT IN THE OUTGOING-REFERENCE TABLE |
| P26 | STORE OID, IP ADDRESS AND PARTIAL REFERENCE WEIGHT |
| P27 | IS A MIGRATED OBJECT BEING REMOTE-REFERENCED FROM ANOTHER MODULE? |
| P30 | RESERVE A REGION FOR THE MIGRATED OBJECT IN THE INCOMING-REFERENCE TABLE |
| P31 | TOTAL REFERENCE WEIGHT ← PREDETERMINED VALUE |
| P32 | STORE A REFERENCE POINTER AND OID |
| P33 | HAVE OPERATIONS BEEN COMPLETED FOR ALL OBJECTS ? |
| P36 | BEGIN PRODUCING A RESPONSE MESSAGE |
| P37 | ADDITIONAL REFERENCE WEIGHT ← PREDETERMINED VALUE |
| P38 | HAS STORAGE OF ADDITIONAL REFERENCE WEIGHT BEEN COMPLETED FOR ALL OBJECTS ? |
| P41 | TRANSMIT THE RESPONSE MESSAGE |

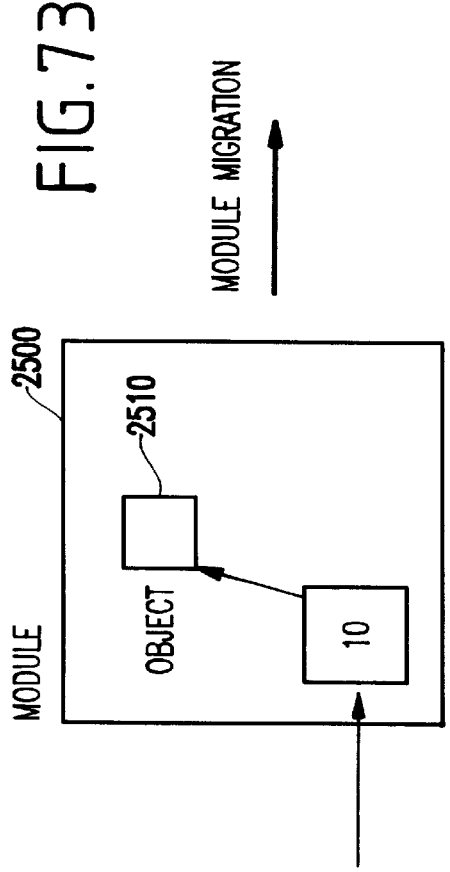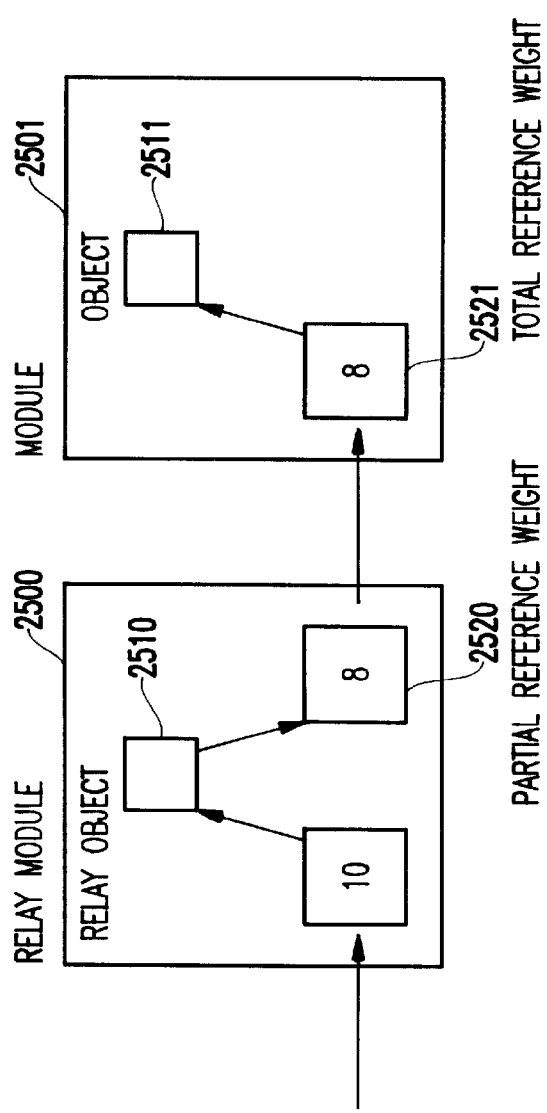

DISTRIBUTED SYSTEM AND MEMORY MANAGEMENT DEVICE, METHOD, AND STORAGE MEDIUM

BACKGROUND OF THE INVENTION

1. Field of the Invention

The present invention relates to a distributed system, a memory management device and method, and to a storage medium, and in particular to memory management for distributed computing.

2. Description of the Related Art

An automatic memory management device and memory management method for distributed computing is considered with the purpose of realizing automatic memory management and garbage collection, not in one single memory space, but in a plurality of memory spaces in a distributed system.

In a paper by D. I. Bevan, "Distributed Garbage Collection Using Reference Counting" (Springer Verlag, LN CS 259, June 1987, pages 176–187), an automatic memory management device that uses a weighted reference counting method manages memory by adding a "reference weight," a numerical value, to objects that reference, i.e., that remote-reference, objects in a different memory space.

In a case in which an object is created that has a remote reference to another object, an initial value of a numerical value (exponentiation of 2) particular to an object and referred to as "total reference weight" is set to the referenced object that is remotely referenced; and a numerical value particular to remote referencing to a referenced object, which is referred to as "partial reference weight," is set to the referencing object that remote-references. Remote reference is thus "created."

In FIG. 1, for example, if the initial value for total reference weight is "64," referenced object 11 holds a total reference weight of "64" and reference object 10 that remote-references referenced object 11 has a partial reference weight of "64" with respect to referenced object 11.

In a case in which a reference object that remotely references an object gives information of the referenced object to a third object by means of a communication message, the reference object subtracts half of its own partial reference weight and updates its new partial reference weight as half. The reference object includes the other half of the reference weight in the communication message to the third object.

The third object accepts the reference weight contained in this communication message and stores the received reference weight as its own partial reference weight. In this way, a reference object can make a reference to a referenced object, and remote reference can be "distributed" from a reference object to a third object.

A difference exists between the "distribution" of remote reference and the "creation" of remote reference in that a third object that receives "distribution" of reference resides in a different memory space than the memory space of the reference object that distributes weight and the memory space of the referenced object. In "distribution" of remote reference, moreover, the total reference weight is constant, and the total reference weight is therefore always equal to the sum of the partial reference weights belonging to reference objects and the sum of reference weight pertaining to objects contained in all communication messages that flow in a distributed system.

For example, in a case in which reference object 10 from the state in FIG. 1 transfers the information of referenced object 11 to object 12, reference object 10 decreases its own partial reference weight "64" by half to "32" as shown in FIG. 2. Reference object 10 includes its decreased weight "32" in a communication message and sends this to object 12. Upon accepting this communication message, object 12 makes its own partial reference weight "32" and becomes a reference object as shown in FIG. 3.

When a reference object is no longer necessary in the memory space in which it resides, it transmits to a referenced object a reference deletion message containing information of it own partial reference weight. This "deletion" of remote referencing enables reclamation of unneeded memory region and reuse.

In FIG. 4, for example, when it is determined that reference object 10 having a partial reference weight of "32" is no longer necessary, a reference deletion message containing the reference weight "32" is transmitted to referenced object 11, which is the reference destination. Upon receiving this reference deletion message, referenced object 11 updates by subtracting the received reference weight "32" from the total reference weight, as shown in FIG. 5. When the total reference weight of a referenced object becomes "0," it can be determined that there are no longer any objects referencing the object from other memory spaces. If there is no referencing from the memory region in which the referenced object itself resides, the regions of that referenced object can be reclaimed.

A reference object having a partial reference weight that has become "1" cannot "distribute" remote referencing. In such a case, the reference object creates a new indirect object that indirectly remote-references and causes the created indirect object to indirectly remote-reference.

In FIG. 6, for example, when reference object 20 having a partial reference weight that has become "1" "distributes" remote referencing to object 22, reference object 20 creates indirect object 23 as shown in FIG. 7. Indirect object 23 takes over the partial reference weight of "1" of reference object 20. Indirect object 23 maintains the reference to referenced object 21 and stores a total reference weight of "64." Reference object 20 updates remote referencing from referenced object 21 to indirect object 23, and makes the partial reference weight "64."

Reference object 20 distributes the reference weight by sending a message containing weight "32" to object 22. After accepting this reference weight, object 22 can remote-reference indirect object 23 with a partial reference weight of "32" as shown in FIG. 8.

Nevertheless, the automatic memory management device of the above-described prior art (hereinafter referred to as "the prior art") has the following problems.

First, the prior art cannot realize memory management when the data region of, for example, an object, is migrated between computers.

In recent years, a method referred to as "agent" is being studied in which the execution of an object is resumed or the execution environment of an object is migrated from a particular execution environment to a different execution environment in a network.

In an agent method, the data region itself of an object, or the memory region itself that is occupied by the agent, changes its execution environment, i.e., the region migrates.

In a distributed system in which an agent or an object region accompanying this agent migrates in this way, automatic memory management is necessary to enable an object that referenced an object before migration to continue to reference the object after migration, despite the migration of the referenced object.

In the prior art, however, it was assumed that data regions of, for example, objects, are stationary in the memory space in which they were created. The prior art therefore did not consider even the existence of migrating objects, and memory management of such objects was therefore impossible.

A second problem in the prior art is the increase in the amount of communication in the network.

In a distributed system made up of a wide range of networks such as the Internet, objects increasingly reference data regions of different computers from remote computers. This trend is further increased by the agent migration and object migration described in regard to the first problem.

In addition, due to agent migration and object migration, the situation frequently occurs that the actual data do not reside at the reference destination of maintained data, but can only be referenced after tracing yet another reference destination.

To reference data regions on a computer at a remote site, a reference request communication message must be sent to the computer of the reference destination to have the requested data sent back. A multi-step exchange of communication therefore takes place for an object to reference the actual data.

Reference destinations should be updated to direct reference destinations whenever possible to prevent multi-step communication. However, it has been difficult to reduce the amount of communication necessary for updating reference destinations.

A third problem in the prior art is the depletion of the reference weight used for managing objects (i.e., the reference weight value is used up and can no long be distributed to other objects).

This depletion occurs because, as reference to the same objects increases in the prior art, reference weight can only decrease as long as references are not deleted and returned for reclamation.

A fourth problem in the prior art is the lack of sufficient memory at each individual computer.

In the prior art, indirect objects are created when reference weight is depleted. A large number of indirect objects are created in memory when weight is frequently used up, and this leads to insufficient memory.

A fifth problem in the prior art is the hindrance of high-speed execution of application programs or even the halting of application programs.

This problem occurs because, as with the fourth problem, indirect objects are created when the reference weight is used up, and the creation of many indirect objects leads to the increase in transmission of messages between reference objects and indirect objects.

SUMMARY OF THE INVENTION

It is an object of the present invention to provide a memory management device and method that operate without conflicts, as in a distributed system that does not allow migration, even in a distributed system that allows migration of the execution environment of the data regions of objects.

It is another object of the present invention to provide a memory management device and method that can reduce the amount of communication needed for memory management in a network.

It is another object of the present invention to provide a memory management device and method that can reduce the possibility of depletion of reference weight used for managing objects.

It is another object of the present invention to provide a memory management device and method that can reduce cases of insufficient memory in individual computers.

It is another object of the present invention to provide a distributed system in which a plurality of computers capable of implementing memory management as described above are joined by a network.

It is another object of the present invention to provide a storage medium that is readable by a computer and that stores a program for implementing memory management as described above.

To realize the above-described objects, the distributed system according to the first viewpoint of the present invention:

is a distributed system that is provided with a plurality of modules and that manages each of a reference origin object that references an object residing in another module and a reference destination object that is referenced from the reference origin object by means of partial reference weight and total reference weight;

wherein the module in which the reference origin object resides is provided with:

partial reference weight discriminating means for discriminating whether or not the partial reference weight of the reference origin object is within a prescribed range;

first transmitting means for transmitting to a module in which the reference destination object resides a first additional reference weight having a prescribed value together with a reference request to the reference destination object when the partial reference weight discriminating means determines that said partial reference weight is not within a prescribed range;

first receiving means for receiving second additional reference weight transmitted from the module in which the reference destination object resides together with a response to the reference request; and partial reference weight updating means for updating partial reference weight of the reference origin object in accordance with the second additional reference weight received by the first receiving means;

and wherein the module in which the reference destination object resides is provided with:

second receiving means for receiving the reference request and the first additional reference weight transmitted from the first transmitting means;

first total reference weight updating means for updating the total reference weight of the reference destination object in accordance with the first additional reference weight received by the second receiving means; and second transmitting means for transmitting to the first receiving means the second additional reference weight having a value corresponding to the first additional reference weight together with the response to the reference request received by the second receiving means.

In the above-described distributed system, the module that includes the reference origin object may be further provided with:

garbage object discriminating means for discriminating whether or not the reference origin object has become unnecessary;

third transmitting means for transmitting to the module in which the reference destination object resides a third additional reference weight that corresponds to the partial reference weight of the reference origin object together with a reference deletion request for deleting reference from the reference origin object when the garbage object discriminating means determines that the reference origin object has become unnecessary; and first memory region reclaiming means for reclaiming memory region of the reference origin object when the garbage object discriminating means determines that the reference origin object has become unnecessary;

and a module that includes the reference destination object may be further provided with:

third receiving means for receiving the reference deletion request and the third additional reference weight transmitted from the third transmitting means; and second total reference weight updating means for updating total reference weight held by the reference destination object in accordance with the third additional reference weight received by the third receiving means.

To achieve the above-described objects, the distributed system according to a second viewpoint of the present invention:

is a distributed system that is equipped with a plurality of modules and that manages each of a reference origin object that references an object residing in another module and a reference destination object that is referenced from the reference origin object by means of partial reference weight and total reference weight;

wherein at least one module of the plurality of modules is provided with:

first transmitting means for transmitting information relating to an object residing in that module to another module;

first receiving means for receiving a first additional reference weight for setting partial reference weight and a response to information relating to the object transmitted from another module; and a first relay object creating means for setting the first additional reference weight received by the first receiving means as the partial reference weight, and converting the object to a relay object for transferring a reference request from another object to the transmission destination of information relating to the object;

and wherein at least one other module of the plurality of modules is provided with:

second receiving means for receiving information relating to an object transmitted from a first transmitting means of another module;

reference destination object creating means for setting a prescribed value as the total reference weight and creating a reference destination object based on information relating to the object received by the second receiving means; and second transmitting means for transmitting to the first receiving means the first additional reference weight having a value corresponding to the total reference weight together with a response to information relating to the object received by the second receiving means.

To achieve the above-described objects, the distributed system according to a third viewpoint of the present invention:

is a distributed system that is made up of a plurality of computers joined by way of a network, that is equipped with a plurality of modules, and that manages each of a reference origin object that references an object residing in another module and a reference destination object that is referenced from the reference origin object by means of partial reference weight and total reference weight;

wherein at least one computer of the plurality of computers is provided with:

first transmitting means for transmitting, to another computer by way of the network, information relating to that module including information relating to an object residing inside the computer;

first receiving means for receiving a response to information relating to the module that was transmitted from a module created in another computer, and first additional reference weight for setting partial reference weight; and first relay module creating means for setting the first additional reference weight received by the first receiving means as the partial reference weight, and converting an object within the module to a relay object for transferring a reference request from another object to a transmission destination of information relating to the module;

and wherein at least one other computer of the plurality of computers is provided with:

second receiving means for receiving information relating to a module transmitted from the first transmitting means of another computer;

module creating means for creating a module having a reference destination object in which a prescribed value is set as total reference weight based on information relating to the module received by the second receiving means; and second transmitting means for transmitting to the first receiving means the first additional reference weight having a value corresponding to the total reference weight together with the response to information relating to the module received by the second receiving means.

To achieve the above-described objects, the memory management device according to a fourth viewpoint of the present invention:

is a memory management device that manages each of a reference origin object that references an object residing in another module and a reference destination object that is referenced from the reference origin object by means of partial reference weight and total reference weight; and is provided with:

partial reference weight discriminating means for discriminating whether or not partial reference weight belonging to the reference origin object is within a prescribed range when the reference origin object references the reference destination object;

first transmitting means for transmitting to another module in which the reference destination object resides a first additional reference weight having a prescribed value together with a reference request to the reference destination object when the partial reference weight discriminating means determines that the partial reference weight is not within a prescribed range;

first receiving means for receiving first additional reference weight and a reference request transmitted from a first transmitting means belonging to another module;

first total reference weight updating means for updating total reference weight belonging to the reference destination object in accordance with the first additional reference weight received by the first receiving means;

second transmitting means for transmitting, to another module that transmitted the reference request, a second additional reference weight having a value corresponding to the first additional reference weight received by the first receiving means, together with the response to the reference request received by the first receiving means;

second receiving means for receiving a second. additional reference weight and a response transmitted by a second transmitting means of another module; and partial reference weight updating means for updating partial reference weight belonging to the reference origin object in accordance with the second additional reference weight received by the second receiving means.

The partial reference weight discriminating means of the above-described memory management device may be further provided with a first discriminating means for discriminating whether or not the partial reference weight is smaller than a prescribed minimum.

In this case, the first transmitting means can transmit a first additional reference weight having a positive value together with the reference request when the first discriminating means determines that the partial reference weight is smaller than the prescribed minimum; and the first total reference weight updating means can update total reference weight belonging to the reference destination object by adding the first additional reference weight having the positive value received by the first receiving means.

The partial reference weight discriminating means in the above-described memory management device may also be provided with a second discriminating means that discriminates whether or not the partial reference weight is greater than a prescribed maximum.

In this case, the first transmitting means can transmit a first additional reference weight having a negative value together with the reference request when the second discriminating means determines that the partial reference weight is greater than the prescribed maximum; and the first total reference weight updating means can update total reference weight belonging to the reference destination object by adding the first additional reference weight having a negative value received by the first receiving means.

The above-described memory management device may be further provided with:

garbage object discriminating means for discriminating whether or not the reference origin object has become unnecessary;

third transmitting means for transmitting, to a module in which the reference destination object resides, a third additional reference weight that corresponds to the partial reference weight of the reference origin object together with a reference deletion request for deleting reference from the reference origin object when the garbage object discriminating means determines that the reference. origin object has become unnecessary;

third receiving means for receiving a reference deletion request and third additional reference weight transmitted from a third transmitting means of another module;

second total reference weight updating means for updating total reference weight belonging to the reference destination object in accordance with the third additional reference weight received by the third receiving means; and first memory region reclaiming means for reclaiming the memory region of the reference origin object when the garbage object discriminating means determines that the reference origin object has become unnecessary.

In this case, the above-described memory management device may be further provided with:

reference state discriminating means for discriminating whether or not the reference destination object has not been referenced from a reference origin object residing in another module and, moreover, has not been referenced from other objects residing in the same module; and second memory region reclaiming means for reclaiming the memory region of the reference destination object when the reference state discriminating means determines that the reference. destination object has not been referenced by either the reference origin object or other objects, To achieve the above-described objects, the memory management device according to a fifth viewpoint of the present invention:

is a memory management device that manages each of a reference origin object that references an object residing in another module and a reference destination object that is referenced from the reference origin object by means of partial reference weight and total reference weight; and is provided with:

first transmitting means for transmitting information relating to an object that resides in the same module to another module;

first receiving means for receiving information relating to an object that is transmitted from a first transmitting means of another module;

first reference destination object creating means for setting a prescribed value as total reference weight and creating a reference destination object based on information relating to the object received by the first receiving means;

second transmitting means for transmitting a first additional reference weight having a value that corresponds to the total reference weight together with a response to information relating to the object received by the first receiving means to a module that transmitted information relating to the object;

second receiving means for receiving a first additional reference weight for setting the partial reference weight and a response to information relating to an object transmitted from a second transmitting means of another module; and first relay object creating means for setting the first additional reference weight received by the second receiving means as a partial reference weight, and converting the object to a relay object for transferring a reference request from another object to a reference destination object created by the first reference destination object creating means.

In this case, a relay object converted by the first relay object creating means need not carry the actual content of the object.

The above-described memory management device may be further provided with:

third transmitting means for transmitting to another module information relating to the reference destination object created by the first reference destination object creating means;

third receiving means for receiving information relating to a reference destination object transmitted from a third transmitting means of another module;

second reference destination object creating means for setting a prescribed value as total reference weight and creating a reference destination object based on information relating to the reference destination object received by the third receiving means;

fourth transmitting means for transmitting, to a module that transmitted information relating to the object, a second additional reference weight having a value that corresponds to the total reference weight together with a response to information relating to the reference destination object received by the third receiving means;

fourth receiving means for receiving a second additional reference weight for setting partial reference weight and a response to information relating to a reference destination object transmitted from a fourth transmitting means of another module; and second relay object creating means for setting the second additional reference weight received by the fourth receiving means as partial reference weight, and converting the reference destination object to a relay object for transferring a reference request from another object to a reference destination object created by the second reference destination object creating means.

In this case, the relay object converted by the second relay object creating means need not carry the actual content of the object.

The above-described memory management device may be further provided with:

fifth transmitting means for, when a relay object created by the first relay object creating means has received a reference request from another object, adding to the reference request a third additional reference weight having a prescribed value and transferring the reference request to module having the first reference destination object;

fifth receiving means for receiving third additional reference weight and a reference request transferred from a fifth transmitting means of another module;

first total reference weight updating means for updating total reference weight belonging to a reference destination object created by the first reference destination object creating means in accordance with the third additional reference weight received by the fifth receiving means;

sixth transmitting means for transmitting a fourth additional reference weight having a value that corresponds to the third additional reference weight and specific information for specifying a module in which the reference destination object resides together with a response corresponding to a reference request received by the fifth receiving means;

sixth receiving means for receiving a response, a fourth additional reference weight, and specific information transmitted from a sixth transmitting means of another module;

reference destination updating means for updating partial reference weight of an object that originated a reference request in accordance with the fourth additional reference weight received by the sixth receiving means and moreover, updating the reference destination of the object in accordance with the specific information;

seventh transmitting means for transmitting, to a module having the reference destination object, a fifth additional reference weight having a value that corresponds to the fourth additional reference weight received by the sixth receiving means together with a reference deletion request for deleting a reference from the relay object;

seventh receiving means for receiving fifth additional reference weight and a reference deletion request transmitted from a seventh transmitting means of another module; and second total reference weight updating means for updating the total reference weight of the reference destination object in accordance with the fifth additional reference weight received by the seventh receiving means.

In this case, the above-described memory management device may be further provided with:

relay discriminating means for discriminating whether or not the relay object is referenced from another object; and memory region reclaiming means for reclaiming memory regions of the relay object when the relay discriminating means determines that the relay object is not referenced from another object.

To realize the above-described objects, the memory management device according to the sixth viewpoint of the present invention:

is a memory management device that is joined with other memory management devices by way of a network and that manages each of a reference origin object that references an object residing in another module and a reference destination object that is referenced from the reference origin object by means of partial reference weight and total reference weight; and is provided with:

first transmitting means for transmitting to another computer by way of the network information relating to a module containing information relating to an object that resides within the memory management device;

first receiving means for receiving information relating to a module transmitted from a first transmitting means of another memory management device;

first module creating means for creating a module having a reference destination object in which a prescribed value is set as total reference weight based on information relating to the module received by the first receiving means;

second transmitting means for transmitting to the second receiving means the first additional reference weight having a value that corresponds to the total reference weight together with a response to information relating to the module received by the first receiving means;

second receiving means for receiving a first additional reference weight for setting partial reference weight and a response to information relating to a module transmitted from a second transmitting means of another memory management device; and first relay module creating means for creating a relay module by setting the first additional reference weight received by the second receiving means as partial reference weight and converting an object within the module to a relay object for transferring a reference request from another object to a transmission destination of information relating to the module.

In this case, a relay object converted by the first relay module creating means need not carry the actual content of an object.

The above-described memory management device may be further provided with:

third transmitting means for transmitting, to yet another computer by way of the network, information relating to a module including information relating to the reference destination object that was created by the first module creating means;

third receiving means for receiving information relating to the module transmitted from a third transmitting means belonging to another computer;

second module creating means for creating a module having a reference destination object in which a prescribed value is set as total reference weight based on information relating to the module received by the third receiving means;

fourth transmitting means for transmitting, to a module that transmitted information relating to the module, a second additional reference weight having a value that corresponds to the total reference weight together with a response to information relating to the module received by the third receiving means;

fourth receiving means for receiving the second additional reference weight and the response transmitted by a fourth transmitting means belonging to another computer; and second relay module creating means for creating a relay module by setting the second additional reference weight received by the fourth receiving means as partial reference weight and converting the reference destination object contained within a module created by the first module creating means to a relay object for transferring a reference request from another object to a reference destination object contained within a module created by the second module creating means.

In this case, a relay object converted by the second relay module creating means need not carry the actual content of an object.

The above-described memory management device may be further provided with:

relay discriminating means for discriminating whether or not all relay objects within a relay module are referenced from other objects; and memory region reclaiming means for reclaiming memory regions of the relay module when the relay discriminating means determines that none of the relay objects are being referenced from other objects.

To realize the above-described objects, the memory management method according to the seventh viewpoint of the present invention:

is a memory management method for managing each of a reference origin object that references an object residing in another module and a reference destination object that is referenced from the reference origin object by means of partial reference weight and total reference weight; and is provided with:

a partial reference weight discrimination step for discriminating whether or not the partial reference weight belonging to the reference origin object is within a prescribed range when the reference origin object references the reference destination object;

a first transmission step for transmitting to the module in which the reference destination object resides a first additional reference weight having a prescribed value together with a reference request to the reference destination object when it is determined in the partial reference weight discrimination step that partial reference weight belonging to the reference origin object is not within a prescribed range;

a first reception step for receiving the first additional reference weight and the reference request transmitted in the first transmission step;

a first total reference weight update step for updating total reference weight belonging to the reference destination object in accordance with the first additional reference weight received in the first reception step;

a second transmission step for transmitting to a module in which the reference origin object resides a second additional reference weight having a value that corresponds to the first additional reference weight together with a response to the reference request received in the first reception step;

a second reception step for receiving the second additional reference weight and the response transmitted in the second transmission step; and a partial reference weight update step for updating partial reference weight belonging to the reference origin object in accordance with the second additional reference weight received in the second reception step.

The above-described memory management method may further include:

a garbage object discrimination step for discriminating whether or not the reference origin object has become unnecessary;

a third transmission step for transmitting to a module in which the reference destination object resides a third additional reference weight that corresponds to a partial reference weight belonging to the reference origin object together with a reference deletion request for deleting a reference from the reference origin object when it is determined in the garbage object. discrimination step that the reference origin object has become unnecessary;

a third reception step for receiving the third additional reference weight and the reference deletion request transmitted in the third transmission step;

a second total reference weight update step for updating total reference weight belonging to the reference destination object in accordance with the third additional reference weight received in the third reception step; and a memory region reclamation step for reclaiming memory regions of the reference origin object when it is determined in the garbage object discrimination step that the reference origin object has become unnecessary.

To realize the above-described objects, the memory management method according to the eighth viewpoint of the present invention:

is a memory management method for managing each of a reference origin object that references an object residing in another module and a reference destination object that is referenced from the reference origin object by means of partial reference weight and total reference weight; and is provided with:

a first transmission step for transmitting to another module information relating to an object residing within that same module;

a first reception step for receiving information relating to an object transmitted in the first transmission step;

a first reference destination object creation step for setting a prescribed value as total reference weight and creating a reference destination object based on information relating to the object received in the first reception step;

a second transmission step for transmitting to a module that transmitted information relating to the object first additional reference weight having a value that corresponds to the total reference weight together with a response to information relating to the object received in the first reception step;

a second reception step for receiving the first additional reference weight for setting partial reference weight and a response to information relating to the object transmitted in the second transmission step; and a first relay object creation step for setting the first additional reference weight received in the second reception step as partial reference weight, and converting the object to a relay object for transferring the reference request from another object to a reference destination object created in said first reference destination object creation step.

The above-described memory management method may further include:

a third transmission step for transmitting to another module information relating to the reference destination object created in the first reference destination object creation step;

a third reception step for receiving information relating to the reference destination object that was transmitted in the third transmission step;

a second reference destination object creation step for setting a prescribed value as total reference weight and creating a reference destination object based on information relating to the reference destination object received in the third reception step;

a fourth transmission step for transmitting, to a module that transmitted information relating to the object, second additional reference weight having a value that corresponds to the total reference weight together with a response to information relating to the reference destination object that was received in the third reception step;

a fourth reception step for receiving the second additional reference weight and the response transmitted in the fourth transmission step; and a second relay object creation step for setting the second additional reference weight received in the. fourth reception step as partial reference weight and converting the reference destination object to a relay object for transferring a reference request from another object to a reference destination object created in the second reference destination object creation step.

The above-described memory management method may further include:

a fifth transmission step for, when a relay object created in the first relay object creation step has received a reference request from another object, adding a third additional reference weight having a prescribed value and transferring the reference request to the first reference destination object;

a fifth reception step for receiving the third additional reference weight and the reference request transmitted in the fifth transmission step;

a first total reference weight update step for updating total reference weight belonging to a reference destination object created in the first reference destination object creation step in accordance with the third additional reference weight received in the fifth reception step;

a sixth transmission step for transmitting a fourth additional reference weight having a value that corresponds to the third additional reference weight and specific information for specifying a module in which the reference destination object resides together with a response to a reference request received in the fifth reception step;

a sixth reception step for receiving the specific information and the fourth additional reference weight and the response transmitted in the sixth transmission step;

a reference destination update step for updating partial reference weight of an object that originated a reference request in accordance with the fourth additional reference weight received in the sixth reception step, and further, updating the reference destination of that object in accordance with the specific information;

a seventh transmission step for transmitting, to a module that has the reference destination object, a fifth additional reference weight having a value that corresponds to the fourth additional reference weight received in the sixth reception step together with a reference deletion request for deleting a reference from said relay object;

a seventh reception step for receiving a fifth additional reference weight and a reference deletion request transmitted in the seventh transmission step; and a second total reference weight update step for updating total reference weight of the reference destination object in accordance with the fifth additional reference weight received in the seventh reception step.

The above-described memory management method may further include:

a relay discrimination step for discriminating whether or not the relay object is referenced from another object; and a memory region reclamation step for reclaiming memory regions of the relay object when it is determined in the relay discrimination step that said relay object is not referenced from another object.

To realize the above-described objects, the memory management method according to the ninth viewpoint of the present invention:

is a memory management method for managing each of a reference origin object that references an object residing in another module and a reference destination object that is referenced from the reference origin object by means of partial reference weight and total reference weight; and is provided with:

a first transmission step for transmitting information relating to a module including information relating to an object to another computer other than the computer in which the module resides;

a first reception step for receiving information relating to a module transmitted in the first transmission step;

a first module creation step for creating a module having a reference destination object in which a prescribed value is set as total reference weight based on information relating to the module received in the first reception step;

a second transmission step for transmitting to the first receiving means the first additional reference weight having a value that corresponds to the total reference weight together with a response to information relating to the module received in the first reception step;

a second reception step for receiving a first additional reference weight for setting partial reference weight and a response to information relating to a module transmitted in the second transmission step; and a first relay module creation step for creating a relay module by setting the first additional reference weight received in the second reception step as partial reference weight and converting an object within that module to a relay object for transferring a reference request from another object to a transmission destination of information relating to the module.

The above-described memory management method may further include:

a third transmission step for transmitting, to yet another computer by way of the network, information relating to a module created in the first module creation step containing information relating to the reference destination object;

a third reception step for receiving information relating to the module transmitted in a third transmission step of another computer;

a second module creation step for creating a module having a reference destination object in which a prescribed value is set as total reference weight based on information relating to the module received in the third reception step;

a fourth transmission step for transmitting, to a module that transmitted information relating to the module, a second additional reference weight having a value that corresponds to the total reference weight together with a response to information relating to the module received in the third reception step;

a fourth reception step for receiving the second additional reference weight and the response transmitted in a fourth transmission step of another computer; and a second relay module creation step for creating a relay module by setting the second additional reference weight received in the fourth reception step as partial reference weight and converting the reference destination object contained within a module created in the first module creation step to a relay object for transferring a reference request from another object to a reference destination object contained within a module created in the second module creation step.

To realize the above-described objects, the recording medium according to the tenth viewpoint of the present invention:

is a recording medium that can be read by a computer and that stores a program for managing each of a reference origin object that references an object residing in another module and a reference destination object that is referenced from the reference origin object by means of partial reference weight and total reference weight; and stores a program for realizing:

a partial reference weight discrimination step for discriminating whether or not a partial reference weight belonging to the reference origin object is within a prescribed range when the reference origin object references the reference destination object;

a first transmission step for transmitting, to a module in which the reference destination object resides, a first additional reference weight having a prescribed value together with a reference request to the reference destination object when it is determined in the partial reference weight discrimination step that the partial reference weight belonging to the reference origin object is not within the prescribed range;

a first reception step for receiving the first additional reference weight and the reference request transmitted in the first transmission step;

a first total reference weight update step for updating total reference weight belonging to the reference destination object in accordance with the first additional reference weight received in the first reception step;

a second transmission step for transmitting, to a module in which the reference origin object resides, a second additional reference weight having a value that corresponds to the first additional reference weight together with a response to the reference request received in the first reception step;

a second reception step for receiving the second additional reference weight and the response transmitted in the second transmission step; and a partial reference weight update step for updating partial reference weight belonging to the reference origin object in accordance with the second additional reference weight received in the second reception step.

The above-described recording medium may further store a program for realizing:

a garbage object discrimination step for discriminating whether or not the reference origin object has become unnecessary;

a third transmission step for transmitting, to a module in which the reference destination object resides, a third additional reference weight that corresponds to a partial reference weight belonging to the reference origin object together with a reference deletion request for deleting references from the reference origin object when it is determined in the garbage object discrimination step that the reference origin object has become unnecessary;

a third reception step for receiving the third additional reference weight and the reference deletion request transmitted in the third transmission step;

a second total reference weight update step for updating the total reference weight belonging to the reference destination object in accordance with the third additional reference weight received in the third reception step; and a memory region reclamation step for reclaiming memory regions of the reference origin object when it is determined in the garbage object discrimination step that the reference origin object has become unnecessary.

To realize the above-described objects, the recording medium according to the eleventh viewpoint of the present invention:

is a recording medium that can be read by a computer and that stores a program for managing each of a reference origin object that references an object residing in another module and a reference destination object that is referenced from the reference origin object by means of partial reference weight and total reference weight; and stores a program for realizing:

a first transmission step for transmitting to another module information relating to an object residing within that same module;

a first reception step for receiving information relating to an object transmitted in the first reception step;

a first reference destination object creation step for setting a prescribed value as total reference weight and creating a reference destination object based on information relating to the object received in the first reception step;

a second transmission step for transmitting, to a module that transmitted information relating to the object, a first additional reference weight having a value that corresponds to the total reference weight together with a response to information relating to the object received in the first reception step;

a second reception step for receiving the first additional reference weight for setting partial reference weight and a response to information relating to the object transmitted in the second transmission step; and a first relay object creation step for setting said first additional reference weight received in said second reception step as partial reference weight and converting said reference destination object to a relay object for transferring a reference request from another object to a reference destination object created in said first reference destination object creation step.

The above-described recording medium may further store a program for realizing:

a third transmission step for transmitting to another module information relating to the reference destination object created in the first reference destination object creation step;

a third reception step for receiving information relating to the reference destination object that was transmitted in the third transmission step;

a second reference destination object creation step for setting a prescribed value as total reference weight and creating a reference destination object based on information relating to the reference destination object received in the third reception step;

a fourth transmission step for transmitting, to the module that transmitted information relating to the object, second additional reference weight having a value that corresponds to the total reference weight together with a response to information relating to the reference destination object that was received in the third reception step;

a fourth reception step for receiving the second additional reference weight and the response transmitted in the fourth transmission step; and a second relay object creation step for setting the second additional reference weight received in the fourth reception step as partial reference weight and converting the reference destination object to a relay object for transferring a reference request from another object to a reference destination object created in the second reference destination object creation step.

The above-described recording medium may further store a program for realizing:

a fifth transmission step for, when a relay object created in the first relay object creation step receives a reference request from another object, adding a third additional reference weight having a prescribed value and transferring the reference request to the first reference destination object;

a fifth reception step for receiving the third additional reference weight and the reference request transmitted in the fifth transmission step;

a first total reference weight update step for updating total reference weight belonging to a reference destination object created in the first reference destination object creation step in accordance with the third additional reference weight received in the fifth reception step;

a sixth transmission step for transmitting a fourth additional reference weight having a value that corresponds to the third additional reference weight and specific information for specifying a module in which the reference destination object resides together with a response to a reference request received in the fifth reception step;

a sixth reception step for receiving the fourth additional reference weight, the specific information, and the response transmitted in the sixth transmission step;

a reference destination update step for updating partial reference weight of an object originating a reference request in accordance with the fourth additional reference weight received in the sixth reception step, and moreover, updating the reference destination of that object in accordance with the specific information;

a seventh transmission step for transmitting, to a module that has the reference destination object, a fifth additional reference weight having a value that corresponds to the fourth additional reference weight received in the sixth reception step together with a reference deletion request for deleting a reference from said relay object;

a seventh reception step for receiving a fifth additional reference weight and a reference deletion request transmitted in the seventh transmission step; and a second total reference weight update step for updating total reference weight of the reference destination object in accordance with the fifth additional reference weight received in the seventh reception step.

The above-described recording medium may further store a program for realizing:

a relay discrimination step for discriminating whether or not the relay object is referenced from another object; and a memory region reclamation step for reclaiming memory regions of the relay object when it is determined in the relay discrimination step that the relay object is not referenced from another object.

To realize the above-described objects, the recording medium according to the twelfth viewpoint of the present invention:

is a recording medium that can be read by a computer and that stores a program for managing each of a reference origin object that references an object residing in another module and a reference destination object that is referenced from the reference origin object by means of partial reference weight and total reference weight; and stores a program for realizing:

a first transmission step for transmitting information relating to a module including information relating to an object to another computer other than the computer in which the module resides;

a first reception step for receiving information relating to a module transmitted in the first transmission step;

a first module creation step for creating a module having a reference destination object in which a prescribed value is set as total reference weight based on information relating to the module received in the first reception step;

a second transmission step for transmitting to a first receiving means the first additional reference weight having a value that corresponds to the total reference weight together with a response to information relating to the module received in the first reception step;

a second reception step for receiving a first additional reference weight for setting partial reference weight and a response to information relating to a module transmitted in the second transmission step; and a first relay module creation step for creating a relay module by setting the first additional reference weight received in the second reception step as partial reference weight and converting an object within that module to a relay object for transferring a reference request from another object to a transmission destination of information relating to the module.

The above-described recording medium may further store a program for realizing:

a third transmission step for transmitting, to yet another computer by way of the network, information relating to a module created in the first module creation step containing information relating to the reference destination object;

a third reception step for receiving information relating to the module transmitted in a third transmission step of another computer;

a second module creation step for creating a module having a reference destination object in which a prescribed value is set as total reference weight based on information relating to the module received in the third reception step;

a fourth transmission step for transmitting, to a module that transmitted information relating to the module, a second additional reference weight having a value that corresponds to the total reference weight together with a response to information relating to the module received in the third reception step;

a fourth reception step for receiving the second additional reference weight and the response transmitted in a fourth transmission step of another computer; and a second relay module creation step for creating a relay module by setting the second additional reference weight received in the fourth reception step and converting the reference destination object contained within a module created in the first module creation step to a relay object for transferring a reference request from another object to a reference destination object contained within a module created in the second module creation step.

The above and other objects, features, and advantages of the present invention will become apparent from the following description based on the accompanying drawings which illustrate examples of the present invention.

BRIEF DESCRIPTION OF THE DRAWINGS

FIG. 30 illustrates a concrete example of the operation in the first embodiment of the present invention;

FIG. 43 is a flow chart showing the operation in Step N of FIG. 40;

FIG. 44 is for explaining the operation in the second embodiment of the present invention;

FIG. 49 is for explaining a first concrete example of the operation in the second embodiment of the present invention;

FIG. 50 is for explaining a first concrete example of the operation in the second embodiment of the present invention;

FIG. 51 is for explaining a first concrete example of the operation in the second embodiment of the present invention;

FIG. 52 is for explaining a first concrete example of the operation in the second embodiment of the present invention;

FIG. 53 is for explaining a first concrete example of the operation in the second embodiment of the present invention;

FIG. 54 is for explaining a first concrete example of the operation in the second embodiment of the present invention;

FIG. 55 is for explaining a first concrete example of the operation in the second embodiment of the present invention;

FIG. 56 is for explaining a first concrete example of the operation in the second embodiment of the present invention;

FIG. 57 is for explaining a first concrete example of the operation in the second embodiment of the present invention;

FIG. 58 is for explaining a second concrete example of the operation in the second embodiment of the present invention;

FIG. 59 is for explaining a second concrete example of the operation in the second embodiment of the present invention;

FIG. 60 is for explaining a second concrete example of the operation in the second embodiment of the present invention;

FIG. 61 is for explaining a second concrete example of the operation in the second embodiment of the present invention;

FIG. 62 is for explaining a second concrete example of the operation in the second embodiment of the present invention;

FIG. 63 is for explaining a second concrete example of the operation in the second embodiment of the present invention;

FIG. 64 is for explaining a second concrete example of the operation in the second embodiment of the present invention;

FIG. 67 is a flow chart showing the operation in Step O of FIG. 66;

FIG. 73 is for explaining a concrete example of the operation in the third embodiment of the present invention;

FIG. 74 is for explaining a concrete example of the operation in the third embodiment of the present invention;

DETAILED DESCRIPTION OF THE PREFERRED EMBODIMENTS

Explanation is next presented regarding the embodiments of the present invention with reference to the accompanying figures.

First Embodiment

Figure 1:
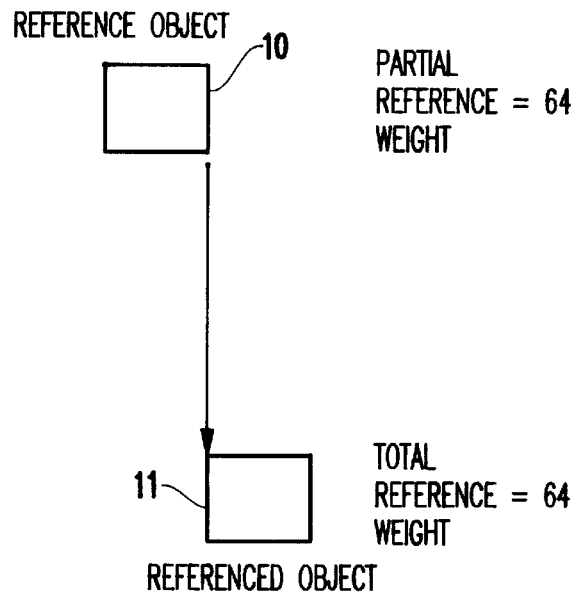
FIG. 1 shows a concrete example of the operation of an example of the prior art.
Figure 2:
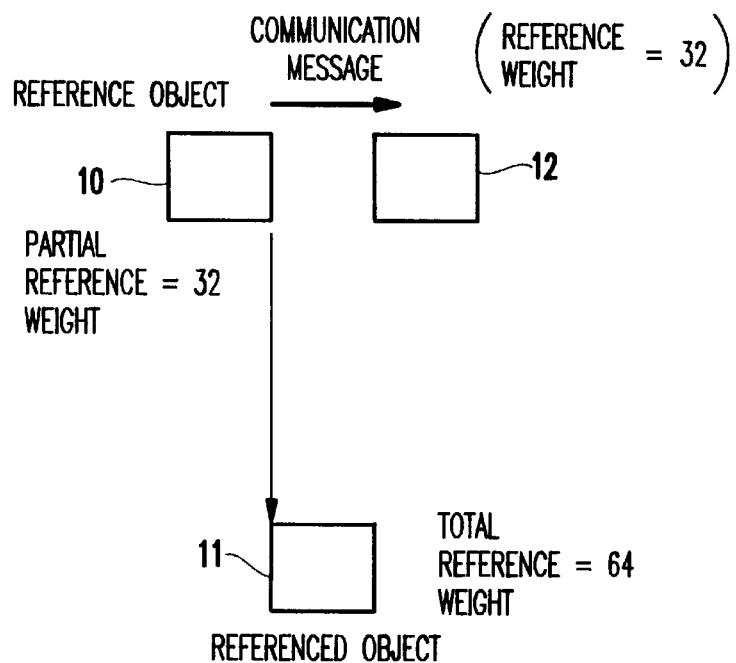
FIG. 2 shows a concrete example of the operation of an example of the prior art.
Figure 3:
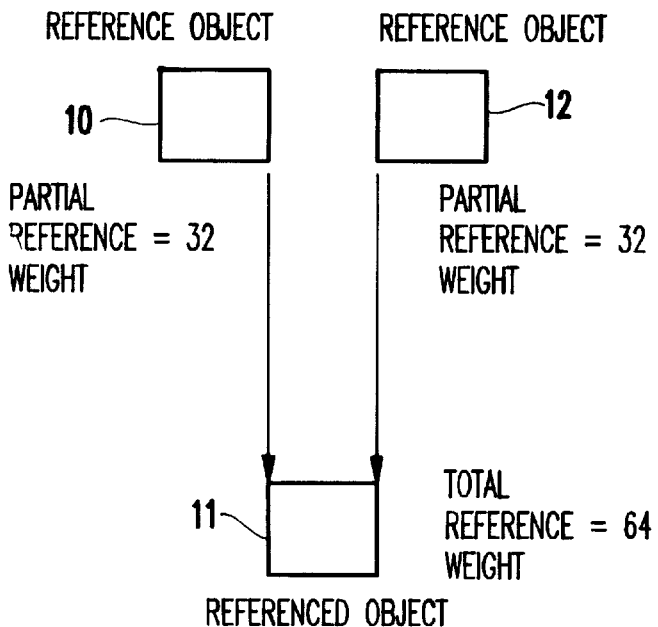
FIG. 3 shows a concrete example of the operation of an example of the prior art.
Figure 4:
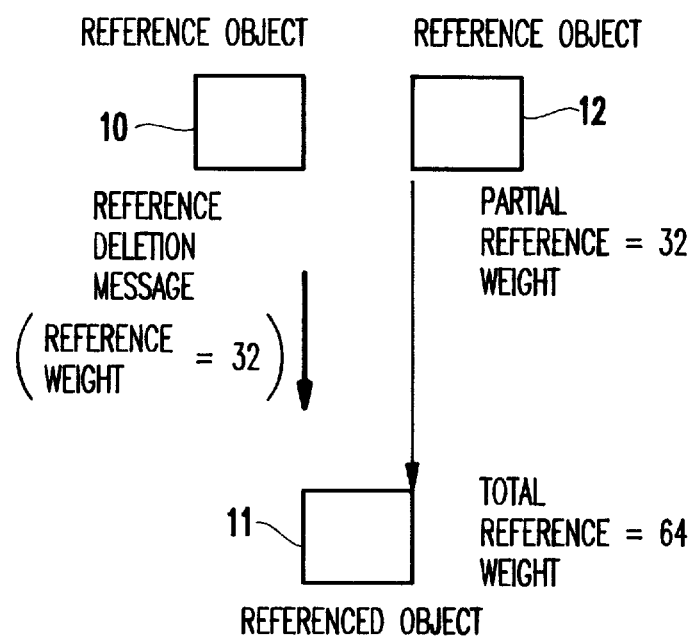
FIG. 4 shows a concrete example of the operation of an example of the prior art.
Figure 5:
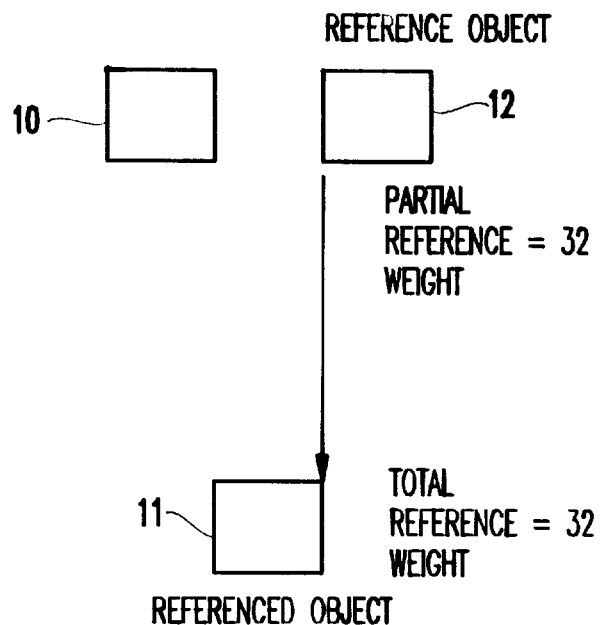
FIG. 5 shows a concrete example of the operation of an example of the prior art.
Figure 6:
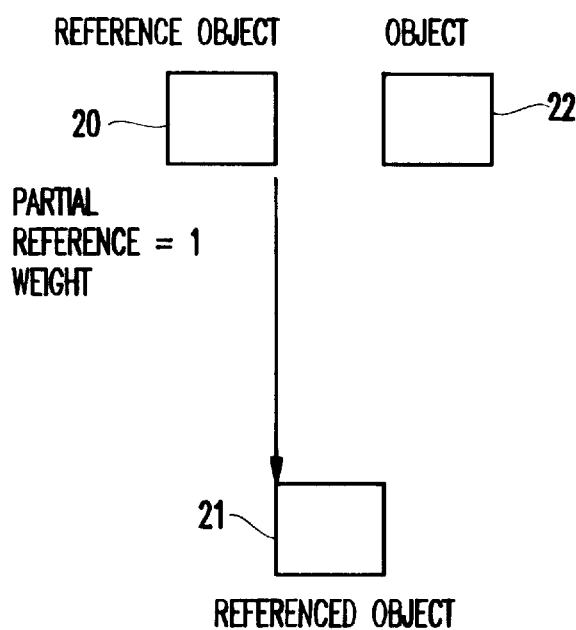
FIG. 6 shows a concrete example of the operation of an example of the prior art.
Figure 7:
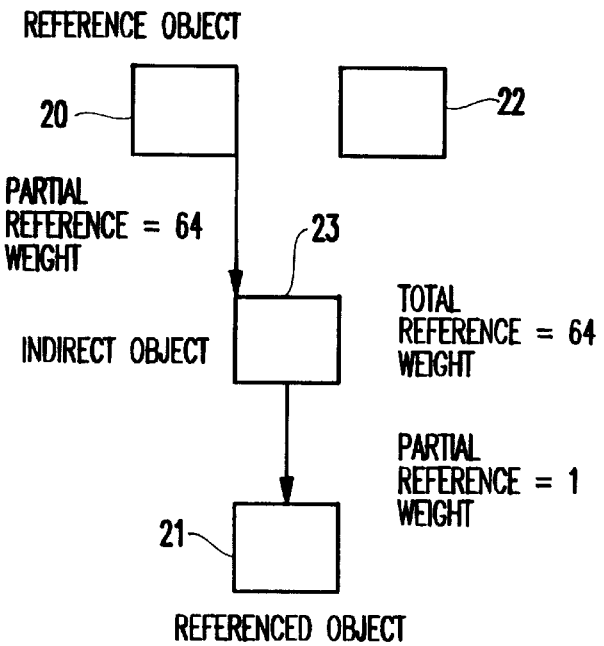
FIG. 7 shows a concrete example of the operation of an example of the prior art.
Figure 8:
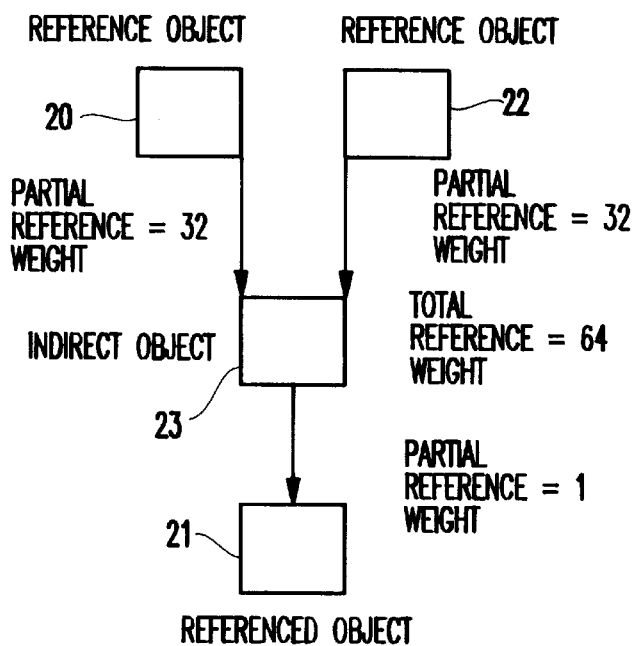
FIG. 8 shows a concrete example of the operation of an example of the prior art.
Figure 9:
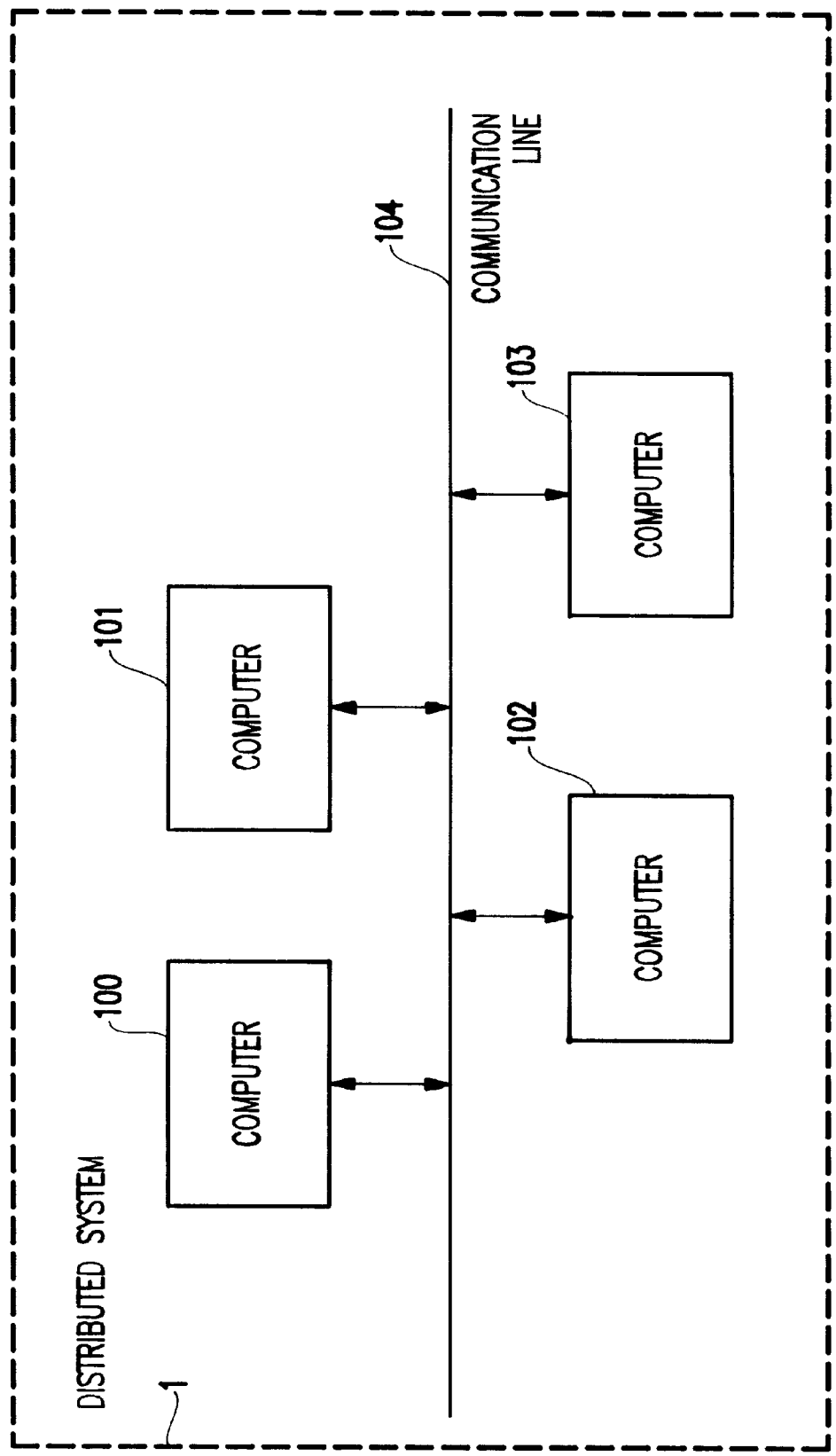
FIG. 9 is a block diagram showing the composition of a distributed system applied to the first embodiment of the present invention.

FIG. 9 is a block diagram showing the composition of a distributed system applied to this embodiment.

Referring to FIG. 9, distributed system 1 is made up of computers 100, 101, 102, and 103 residing in a distributed environment and joined as a network by way of communication line 104.

Figure 10:
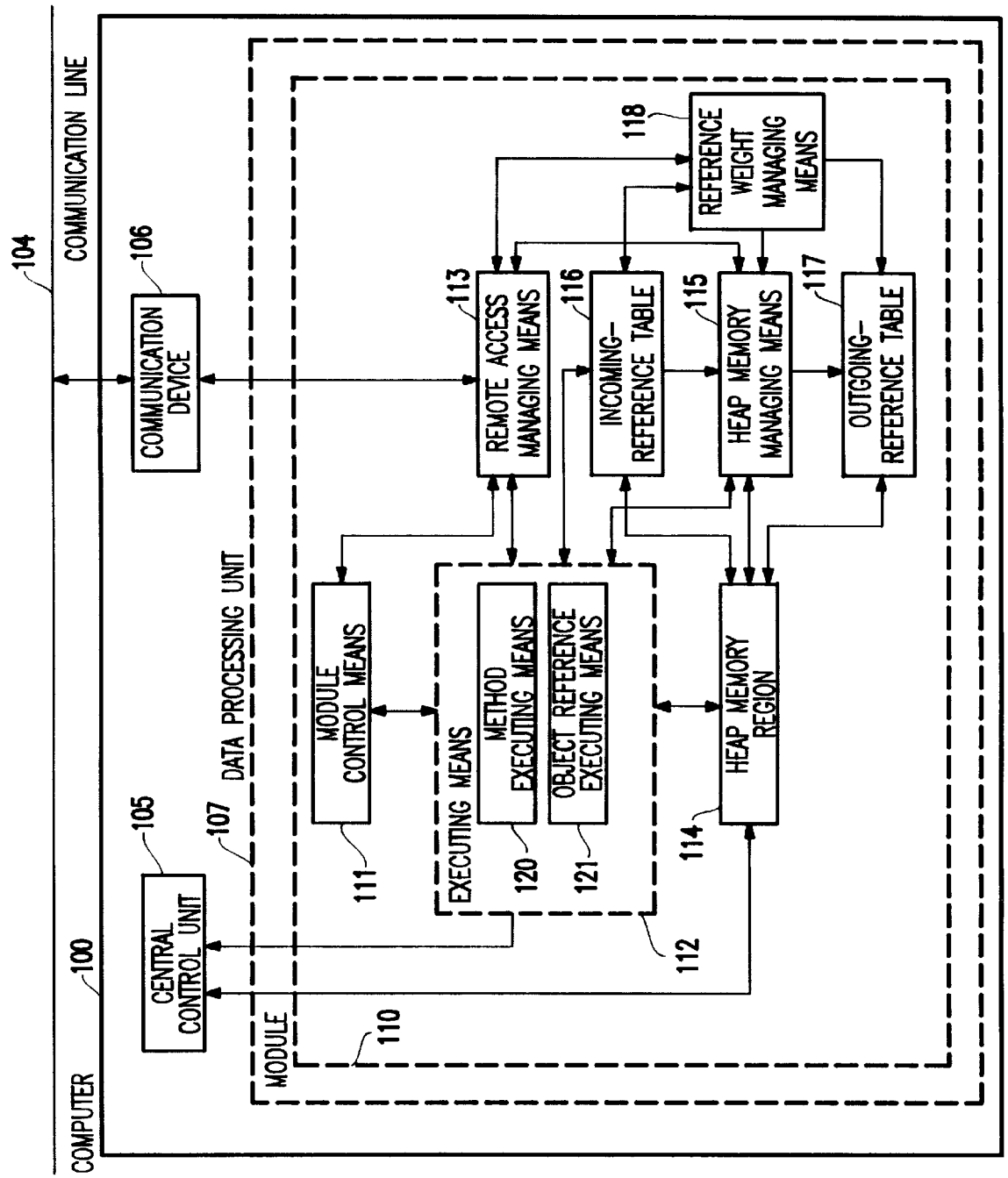
FIG. 10 is a function block diagram showing the functional composition of a computer of FIG. 9.

FIG. 10 is a function block diagram showing the functional composition of computer 100 in FIG. 9. Computers 101–103 also have the same functional composition.

As shown in FIG. 10, computer 100 is provided with central control unit. (CPU) 105 communication device 106, and module 110 that operates according to program control.

Central control unit 105 is the device that actually performs the operations executed by executing means 112.

Communication device 106 is connected to communication line 104 and transmits and receives communication messages to and from computers 101–103 on network via this communication line 104. Communication between computers is effected through the mutual use of the same communication protocol between computers. Computer 100 can reference objects residing in other computers 101–103 or can have objects residing in computer 100 referenced by other computers 101–103 through the transmission and reception of communication messages by communication device 106.

Data processing unit 107 is a device composed of at least one module 110 Data processing unit 107 may be constituted by either memory and a sub-processor provided apart from central control unit 105, or by the execution of programs in memory by central control unit 105.

Module 110 is made up of module control means 111, executing means 112, remote access managing means 113, heap memory region 114, heap memory managing means 115, incoming-reference table 116, outgoing-reference table 117 and reference weight managing means 118.

Module control means 111 effects control for bringing about sequential operation of each executing means 112 of module 110.

Executing means 112 is made up of method executing means 120 and object reference executing means 121, and the execution of each of the application programs transferred from module control means 111 is carried out in concert with central control unit 105. In cases in which executing means 112 makes execution requests to other computers 101–103, or conversely, receives execution requests from other computers 101–103, remote access managing means 113 executes operations in concert.

Method executing means 120 is a means for executing methods and operates immediately if the location for executing a method is the same module 110. If the location for executing a method is remote, method executing means 120 causes remote access managing means 113 to produce a communication message requesting method execution and transmit the communication message from communication device 106 to the module designated to execute via communication line 104.

Method executing means 120 activates object reference executing means 121 when referencing an object during such execution. Object reference executing means 121 checks to determine whether or not the object to be referenced resides within heap memory region 114. If the object resides there, object reference executing means 121 simply references the object residing within heap memory region 114. If the object does not reside there, object reference executing means 121 causes remote access managing means 113 to produce a communication message to request object reference and communicate with the module of the reference destination through communication device 106.

Remote access managing means 113 manages transmission and reception of communication messages to and from other modules. Remote access managing means 113 manages transmission and reception by adding a "reference weight" value to the messages that accords with the type of messages transmitted and received for exchanging information on all objects.

Upon receiving a request from executing means 112, remote access managing means 113 produces a communication message based on the necessary data in accordance with standards set in advance, and transfers the communication message to communication device 106. When producing a communication message, remote access managing means 113 stores information relating to an object, and in addition, sets the reference weight with the assistance of reference weight managing means 118.

When transferring a received execution request message to another module, remote access managing means 113 confers a reference weight appropriate to the requested weight contained in the received message with the assistance of reference weight managing means 118, and again produces an execution request message with this reference weight, and transfers the message.

Remote access managing means 113 also reads communication messages received by communication device 106 in accordance with standards set in advance and transfers the messages to executing means 112. Heap memory region 114 is a memory region belonging to module 110 independently from other modules, and regions (object regions) are allocated for storing objects within this region.

Heap memory managing means 115 manages heap memory region 114. Specifically, heap memory managing means 115 reserves regions in heap memory region 114 for storing objects that have become necessary through requests from executing means 112, identifies the memory regions of objects that have become unnecessary (garbage objects), and reclaims these memory regions for re-use (garbage collection).

When it is determined that an object that remote-references an object of another module is no longer necessary, heap memory managing means 115 also instructs remote access managing means 113 to generate a reference deletion message to the module of the reference destination.

Incoming-reference table 116 is a table for storing information relating to objects within module 110 that have been remote-referenced from objects within other modules. Incoming-reference table 116 may be stored within heap memory region 114, as will be described hereinafter.

Reference table 117 is a table that stores information relating to objects of a reference destination in cases in which an object within module 110 remote-references an object residing in another module. Outgoing-reference table 117 can be stored within heap memory region 114, as will be described hereinafter.

Reference weight managing means 118 manages reference weights in incoming-reference table 116 and outgoing-reference table 117 belonging to an object and is a means for preventing depletion or surplus of reference weights.

Figure 11:
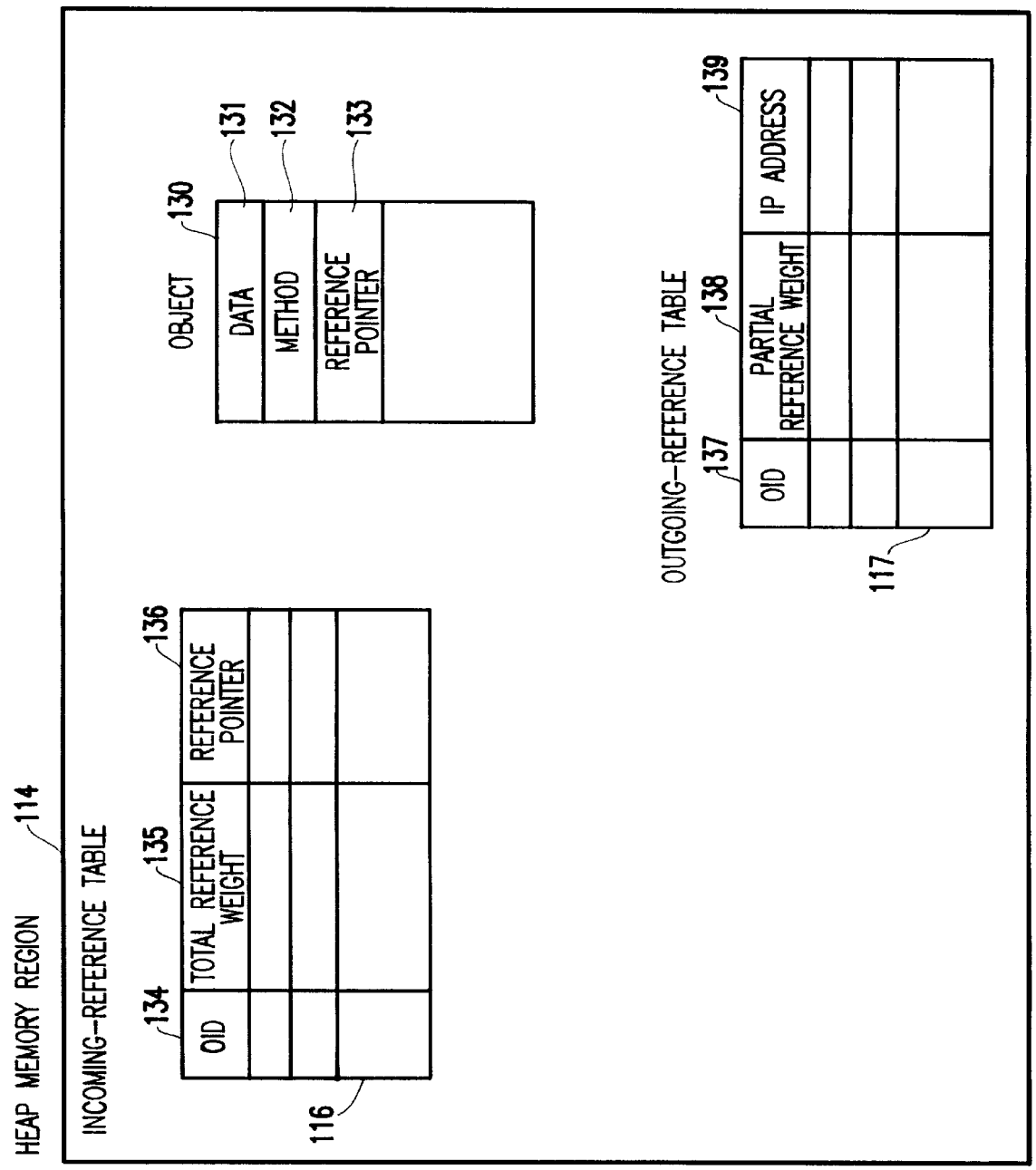
FIG. 11 presents an image of a heap memory region when a module of FIG. 10 is executed.

FIG. 11 presents an image of heap memory region 114 during execution by module 110.

A plurality of objects reside in heap memory region 114.

Object 130 is provided with data 131 and method 132, and is the minimum unit of memory region reserved within heap memory region 114. Object 130 is a unique item in distributed system 1 and is uniquely identified by object identifier OID and an IP address on the network of computer 100 in which object 130 resides.

Method 132 takes care of the execution environment factors such as stacks, local variables, and global variables, and is composed of information that enables actual execution. Method executing means 120 is generated and executed by referencing method 132. Reference pointer 133 is a pointer for indicating a region of outgoing-reference table 117.

When an object within module 110 is remote-referenced from an object within another module, incoming-reference table 116 stores information on object 130, specifically, OID 134, total reference weight 135, and reference pointer 136.

Reference table 117 is a table traced from reference pointer 133 within the region of object 130 in cases in which object 130 within module 110 remote-references an object within another module. Outgoing-reference table 117 stores OID 137 of the object that remote-references, partial reference weight 138 of the reference origin object, and network IP address 139 of the computer in which the reference origin object resides.

Total reference weight 135 is the weight particular to an object and allows management of objects that reference objects in distributed system 1.

Reference pointer 136 is a pointer that indicates the region of object 130 within heap memory region 114.

Partial reference weight 138 belongs to an object that remote-references an object within another module and is a reference weight with respect to the reference destination object, and, as with total reference weight 135, is used for managing objects in distributed system 1.

Figure 12:
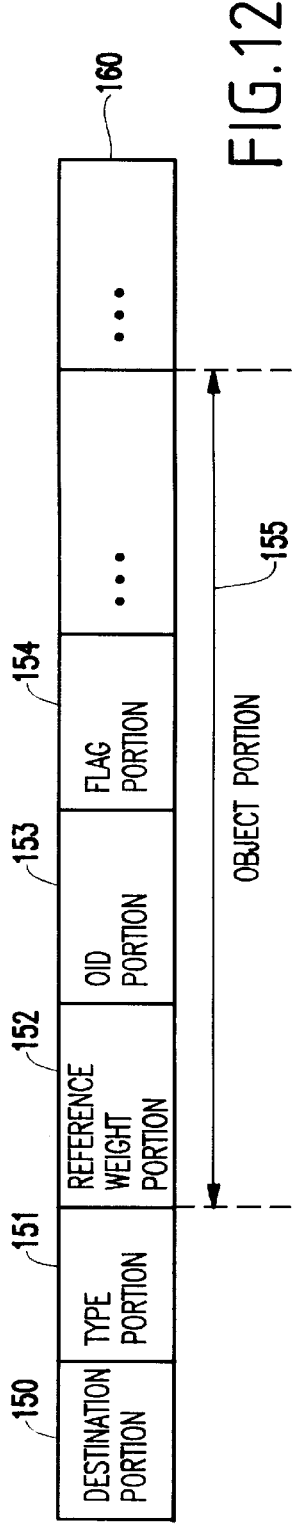
FIG. 12 shows the format of a communication message.

FIG. 12 shows the format of communication messages that flow over communication line 104 in this embodiment.

As shown in FIG. 12, communication message 160 is composed of destination portion 150, type portion 151, object portions 155, and other portions. Destination portion 150 corresponds to the header of a communication message and therefore stores the address of the transmission destination (IP address) of the message.

Type portion 151 stores type information that establishes what type of message the communication message is (for example, if the message is a reference request, a response to a method request, and so on).

Object portion 155 is a portion for storing the information of each object, and more specifically, is made up of reference weight portion 152, OID portion 153, flag portion 154, and other data.

Reference weight portion 152 stores the additional reference weight that is added to each object within communication message 160. The additional reference weight is used as object management information. The module on the receiving side of communication message 160 handles the additional reference weight by a method that depends on the type of communication message, which is determined by type portion 151 of the communication message. For example, if communication message 160 is a reference deletion message, the additional reference weight indicates the reference weight that should be subtracted from total reference weight by the object that has been requested to delete reference.

OID portion 153 stores object identifier OID.

Flag portion 154 stores a flag. A flag is an identifier for distinguishing whether the object corresponding to object portion 155 resides within the module (local) or is an object referencing an object outside the module (remote).

Object portion 155 also stores data belonging to an object, and, in the case of a remote object, stores information of the reference destination object.

Explanation is next presented regarding the operation of computer 100 in this embodiment.

In this embodiment, the operation of computers 101–103 is equivalent to that of computer 100.

Figure 13:
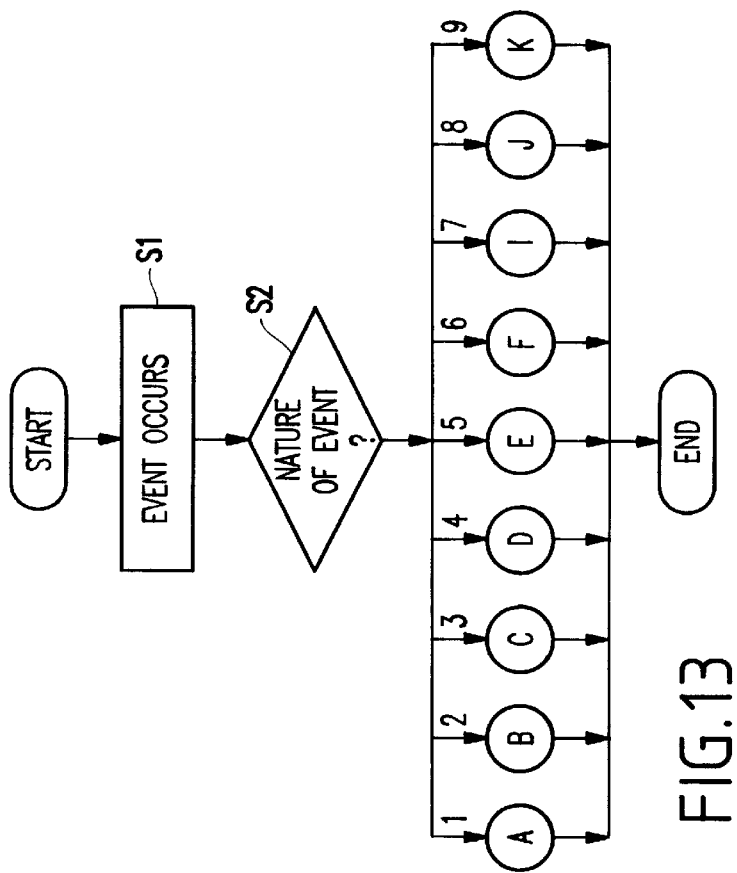
FIG. 13 is a flow chart showing operation in the first embodiment of the present invention.

FIG. 13 is a flow chart showing the operation of remote access managing means 113.

If any event should occur during execution by executing means 112 (Step S1), remote access managing means 113 determines the nature of the event (Step S2). Examples of events that may occur during execution by executing means 112 include:

Discovery of a garbage remote object by heap memory managing means 115.

Reception of a reference deletion message from another module.

Incidence of reference request to a remote object.

Reception of a message requesting reference to an object from another module.

Execution of method with respect to a remote object.

Reception of a message from another module requesting execution of a method.

Reception of a response message from another module.

Depletion of partial reference weight.

Reception of a message requesting supplementary reference weight.

According to the nature of the event determined in Step S2, remote access managing means 113 either executes or causes another means to execute each of the following processes. Explanation is presented below regarding the processes executed by remote access managing means 113 or by another means in accordance with instructions from remote access managing means 113 for each type of event that occurs.

Figure 14:
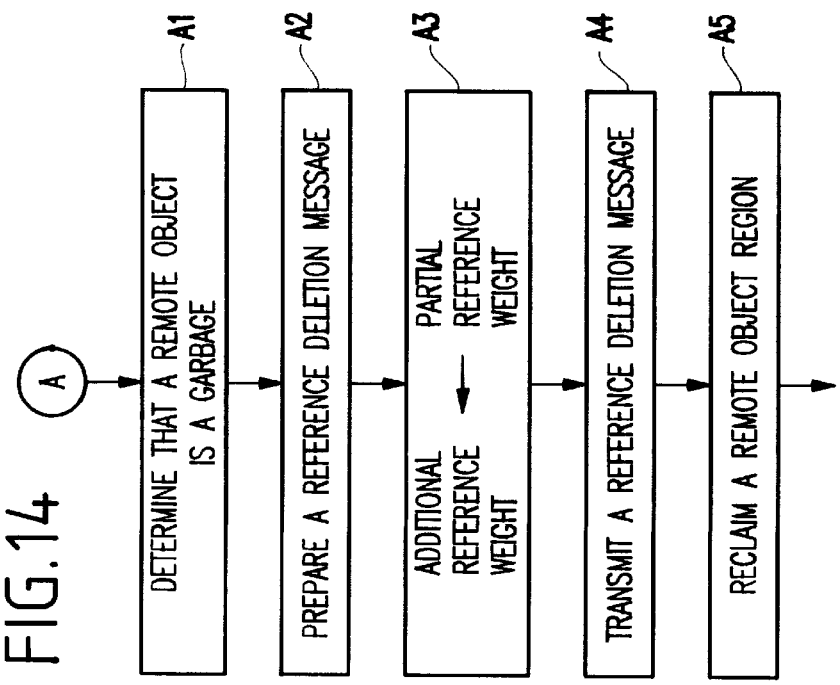
FIG. 14 is a flow chart showing operation in the first embodiment of the present invention.

FIG. 14 is a flow chart showing the processes executed for a case in which it is determined that the event that occurs is "1: Discovery of a garbage remote object by heap memory managing means 115."

During execution of a program by executing means 112 of a module, if heap memory managing means 115 determines, merely by remote-referencing an object of another module, that an object not carrying actual content (a remote object) is an unnecessary garbage object, this information is communicated to remote access managing means 113 (Step A1)

Remote access managing means 113 examines the information in the object's outgoing-reference table by way of the reference pointer of the remote object region and begins to prepare a reference deletion message to be transmitted to the module in which the reference destination object resides (Step A2).

Remote access managing means 113 also stores in this communication message information such as the OID and IP address of this outgoing-reference table 117 as information of the reference destination object of the object. Remote access managing means 113 also calls reference weight managing means 118 and determines the value of additional reference weight to be stored in the reference weight portion.

Reference weight managing means 118 communicates the value of the partial reference weight in the outgoing-reference table to remote access managing means 113, and remote access managing means 113 stores the value communicated from reference weight managing means 118 in the message as the additional reference weight (Step A3).

Remote access managing means 113 then transmits the reference deletion message created in Steps A2 and A3 to the module having the reference destination object by way of communication device 106 (Step A4).

After completing storage of the information of the remote object that is in the message, heap memory managing means 115 reclaims the remote object region within heap memory region 114 that has become unnecessary, and re-uses the regions relating to the remote object within the outgoing-reference table (Step A5).

Figure 15:
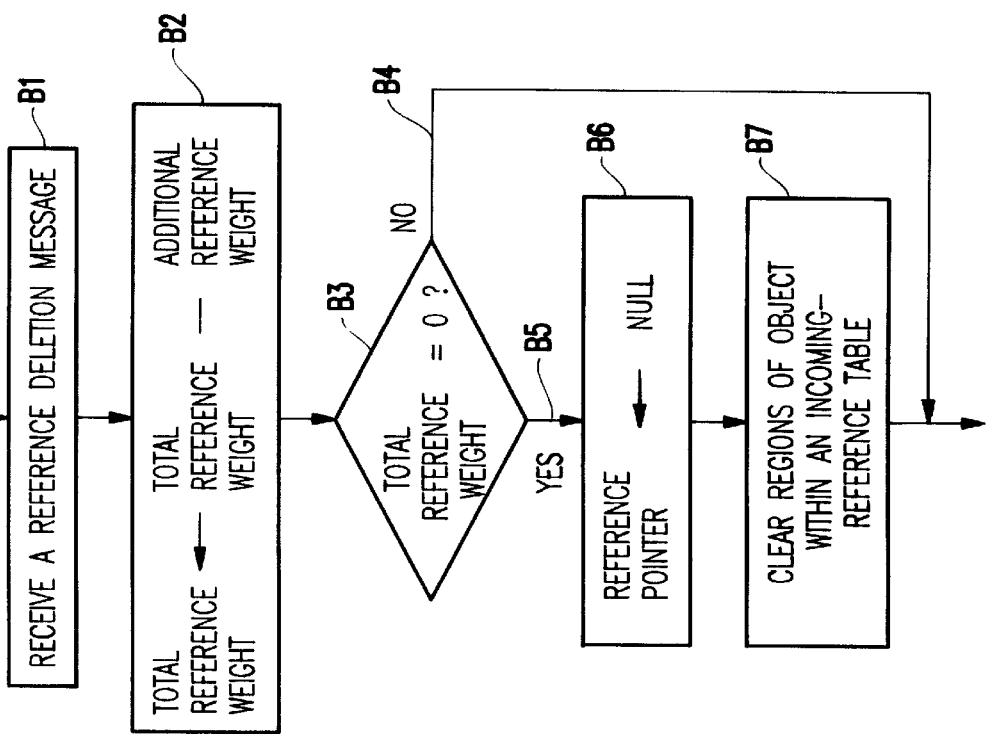
FIG. 15 is a flow chart showing operation in the first embodiment of the present invention.

FIG. 15 is a flow chart showing the processes executed when it is determined that the event that has occurred is "2: Reception of a reference deletion message from another module."

Remote access managing means 113 is activated when a module that owns a remote-referenced object receives from communication device 106 a reference deletion message for that object from a module that remote-references the object (Step B1).

Remote access managing means 113 reads the object's OID and additional reference weight that is contained in the received reference deletion message and examines the regions of incoming-reference table 116 that correspond to the object of the read OID. Remote access managing means 113 subtracts the value of the additional reference weight from the total reference weight of incoming-reference table 116 and stores the result of subtraction as the new total reference weight (Step B2).

Remote access managing means 113 further checks whether or not the total reference weight of the object is "0" (Step B3) and ends the process of this flow chart if the total reference weight is not "0."

If the total reference weight is "0" (Step B5), remote access managing means 113 presumes there are no longer any remote references from objects residing in other modules, removes the reference pointer to the object (Step B6), and clears the regions of that object within the incoming-reference table to allow re-use (Step B7). If there are no longer any local objects that reference the object, the object's regions within heap memory region 114 are then reclaimed by heap memory managing means 115.

Figure 16:
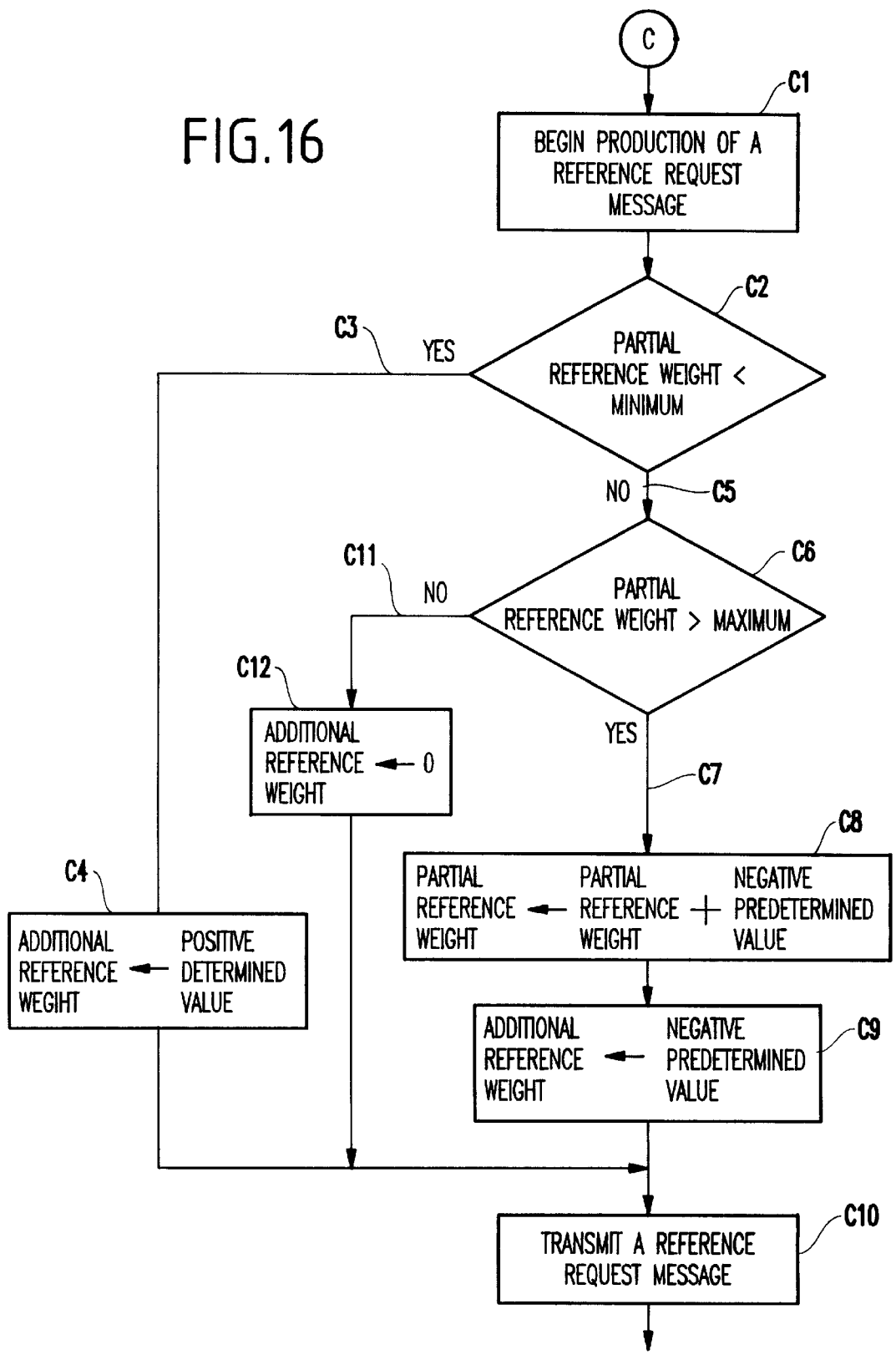
FIG. 16 is a flow chart showing operation in the first embodiment of the present invention.

FIG. 16 is a flow chart showing the processes executed in a case in which the event that occurs is determined to be "3: Incidence of reference request to a remote object."

Remote access managing means 113 is called when object reference executing means 121 of a module makes a request to reference a remote object.

Remote access managing means 113 begins production of a reference request message to the module in which resides the remote reference destination object (referred to as the "target object" in this case) that is being directly referenced by a remote object (Step C1).

Remote access managing means 113 next calls reference weight managing means 118 to determine the value of the additional reference weight to be added to the target object.

Reference weight managing means 118 controls reference weight to achieve balance of partial reference weights, returning reference weight to the reference destination if too great and requesting supplementary reference weight if too little. Reference weight managing means 118 compares the partial reference weight of the target object stored in the message with a predetermined minimum (Step C2).

If the partial reference weight is smaller than the minimum (Step C3), reference weight managing means 118 notifies a positive predetermined value to remote access managing means 113. Remote access managing means 113 stores this notified positive predetermined value as the additional reference weight (Step C4). When the additional reference weight is positive, a request for supplementary reference weight for additional reference weight is multiplexed with the reference request message to the object.

If the partial reference weight in Step C2 is greater than the minimum (Step C5), reference weight managing means 118 then compares the partial reference weight with a predetermined maximum (Step C6).

If the partial reference weight is greater than the maximum (Step C7), reference weight managing means 118 updates by adding a negative predetermined value to the partial reference weight (Step C8). Reference weight managing means 118 then notifies the negative predetermined value to remote access managing means 113 as the additional reference weight to the target object. Remote access managing means 113 stores the notified negative predetermined value in the message as the additional reference weight (Step C9). The negative additional reference weight indicates a request to return reference weight. In other words, the return of reference weight can be transmitted in a single message together with the reference request.

If, on the other hand, the partial reference weight is smaller than the maximum in Step C6 (Step C11), reference weight managing means 118 notifies "0" as the desired value of additional reference weight to remote access managing means 113. Remote access managing means 113 stores the notified "0" in the message as the additional reference weight (Step C12), and transmits to the remote reference destination of the target object (Step C10).

Figure 17:
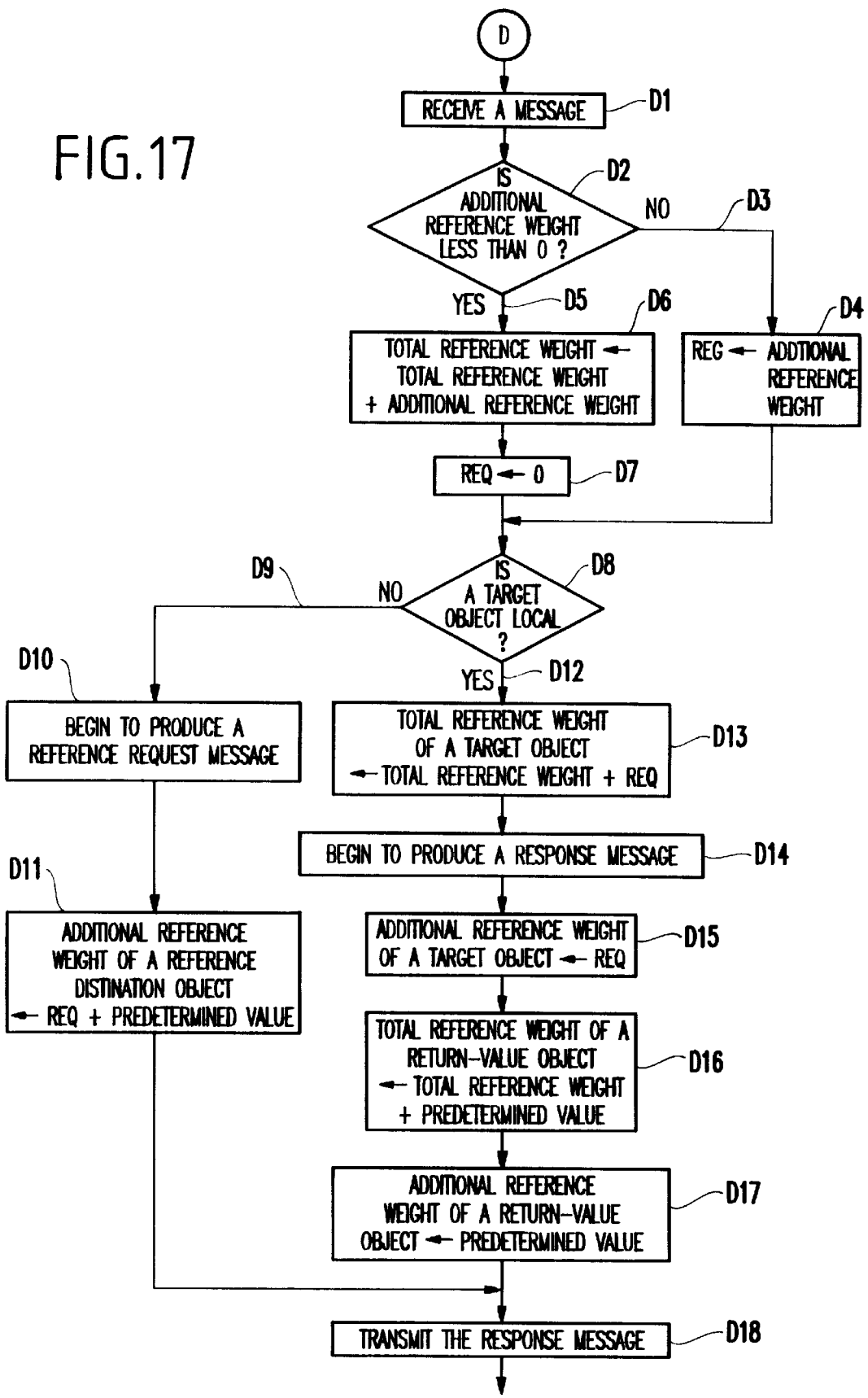
FIG. 17 is a flow chart showing operation in the first embodiment of the present invention.

FIG. 17 is a flow chart showing the processes executed in a case in which the event that occurs is determined to be "4: Reception of a message requesting reference to an object from another module."

Remote access managing means 113 is called when communication device 106 receives a message requesting reference to an object from another module. Remote access managing means 113 reads the type of message and detects that it is a reference request (Step D1).

Remote access managing means 113 then calls reference weight managing means 118, and reference weight managing means 118 examines the additional reference weight of the object for which reference is requested that has been stored in the received message (Step D2).

An additional reference weight that is greater than "0" (Step D3) means that supplementary reference weight has been requested in the amount of the additional reference weight, and reference weight managing means 118 prepares a variable "req" indicating the amount of requested supplementary reference weight to use when producing a subsequent response or reference request message to be further transmitted, and stores in this "req" the additional reference weight of the target object of the received message (Step D4).

If the additional reference weight is less than "0" (Step D5), the total reference weight of the target object is to be updated by adding the additional reference weight portion (Step D6). In other words,. reference weight is returned if the additional reference weight is less than "0". Reference weight managing means 118 then prepares variable "req" to use when producing a subsequent response message or reference request message to be further transmitted, and stores "0" in this "req" (Step D7).

Remote access managing means 113, having been informed of the requested amount of additional reference weight from reference weight managing means 118, checks whether the target object is remote or local (Step D8).

If the target object is remote (Step D9), remote access managing means 113 begins to produce a new reference request message to transmit a reference request to the remote reference destination object of the target object (Step D10). As the value of additional reference weight added to the reference destination object of the target object that is stored in the new message, remote access managing means 113 stores a value in which variable "req" is added to the predetermined value (Step D11) and transmits the reference request message (Step D18).

If the target object in Step D8 is local (Step D12), remote access managing means 113 calls reference weight managing means 118 and updates by adding the value of variable "req" to the total reference weight of the target object (Step D13). Remote access managing means 113 further calls object reference executing means 121, brings about execution of processing to find the requested reference, and then begins to produce a response message to return the results (Step D14).

Remote access managing means 113 next stores the value of variable "req" in the additional reference weight that is added together with the most recent information of the target object in the response message (Step D15).

Reference weight managing means 118 then updates the total reference weight of the reference object (referred to as the "return-value object" in this case) that is the result obtained by object reference executing means 121 for the reference request. If the return-value object is not in the incoming-reference table, reference weight managing means 118 reserves a region in the incoming-reference table, makes a new register, and then adds reference weight in the amount of the predetermined value (Step D16).

Figure 18A:
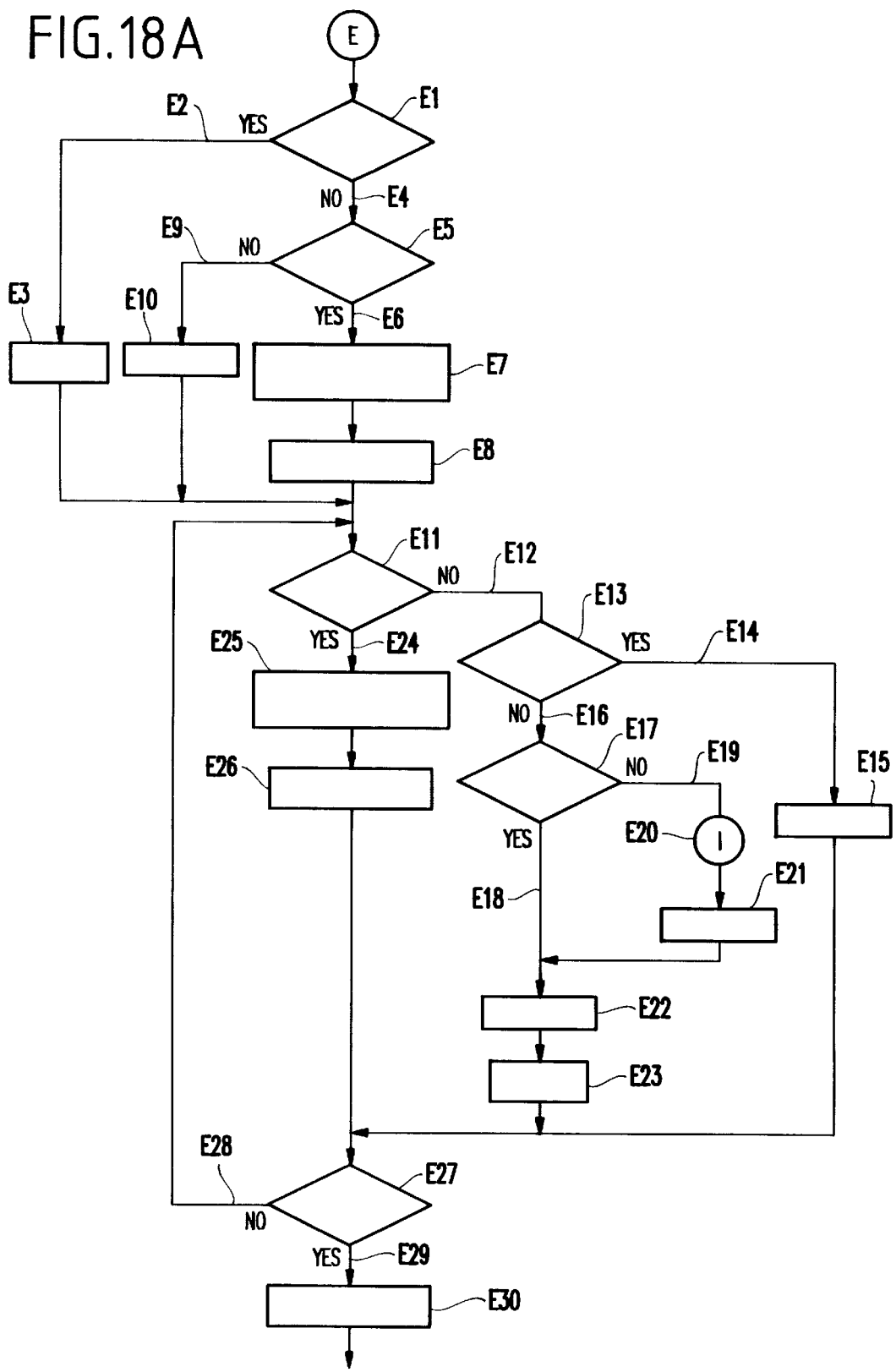
FIG. 18 is a flow chart showing operation in the first embodiment of the present invention.

Finally, remote access managing means 113 stores the predetermined value as the additional reference weight of the return-value object in the response message (Step D17), completes the response message, and transmits the message to the module in which the object that requested reference resides (Step D18). FIG. 18 is a flow chart showing the processes executed in a case in which the event that occurs is determined to be "5: Execution of method with respect to a remote object."

When method executing means 120 of a module makes a call for method execution to a remote object, remote access managing means 113 begins to produce a message requesting method execution. Remote access managing means 113 produces a message indicating a method execution request in accordance with predetermined standards.

Remote access managing means 113 and reference weight managing means 118 first execute processes to store information of the remote object that is to receive the call (hereinafter referred to as the "target object") in the execution request message. Processing for the target object that receives a method execution call is essentially the same as processing for a target object that receives a reference request, and in a broad sense, method execution can be considered as included in reference request. (The processing of Steps E1–E10 described hereinafter are substantially equivalent to the operations of a reference request message to a remote object.)

Reference weight managing means 118 checks whether or not the partial reference weight of the target object is smaller than a predetermined minimum (Step E1), and if the partial reference weight is smaller than the minimum (Step E2), remote access managing means 113 stores a positive predetermined value in the additional reference weight of the target object (Step E3).

If the partial reference weight of the target object is greater than the minimum (Step E4), reference weight managing means 118 checks whether or not the partial reference weight of the target object is greater than a predetermined maximum to return surplus partial reference weight (Step E5).

If the partial reference weight is smaller than the predetermined maximum value (Step E9), reference weight managing means 118 notifies "0" to remote access managing means 113, and remote access managing means 113 stores "0" in the additional reference weight of the target object (Step E10). If, on the other hand, the partial reference weight is greater than the predetermined maximum value (Step E6), reference weight managing means 118 notifies a negative predetermined value to remote access managing means 113, and after receiving this value, remote access managing means 113 updates by adding the negative predetermined value to the partial reference weight (Step E7) and stores the predetermined value in the additional reference weight (Step E8).

If there is an object group (hereinafter referred to as the "argument object") which is the argument of the method that is called, remote access managing means 113 then carries out processing to store information of the argument object in the execution request message. Remote access managing means 113 first checks to determine whether the argument object resides within the module (local) or resides outside the module (remote) (Step E11).

If the argument object is remote (Step E12), remote access managing means 113 checks whether the remote reference destination is the same as the reference destination of the target object (Step E13). If it is the same (Step E14), remote access managing means 113 stores "0" as the additional reference weight added to the argument object (Step E15).

If, on the other hand, the reference destinations of the argument object and target object in Step E11 are different (Step E16), remote access managing means 113 calls reference weight managing means 118 and distributes reference weight. Reference weight managing means 118 checks the value of partial reference weight of the argument object (Step E17).

If the partial reference weight is smaller than "1" (Step E19), remote access managing means 113 migrates to Step J of FIG. 23 to be described hereinafter (Step E20), produces a message requesting supplementary reference weight, transmits the message to the remote reference destination, receives the response message, and supplements the partial reference weight (Step E21).

If, on the other hand, the partial reference weight in Step E17 is greater than "1" (Step E18), reference weight managing means 118 migrates to the next process without taking any action. Reference weight managing means 118 then updates by dividing the partial reference weight (Step E22). Remote access managing means 113 stores the reference weight portion that was decreased in Step E22 as the additional reference weight of the argument object (Step E23).

If the argument object in Step E11 is local (Step E24), reference weight managing means 118 updates by adding a predetermined value to the total reference weight of the argument object (Step E25). Remote access managing means 113 stores the predetermined value as the additional reference weight of the argument object (Step E26).

Remote access managing means 113 checks whether or not storage has been completed of the additional reference weight for all argument objects in the method (Step E27).

If storage has not been completed (Step E28), the process returns to Step E11 and the same process is repeated. If storage has been completed (Step E29), the method execution request message is completed and transmitted (Step E30).

Figure 19:
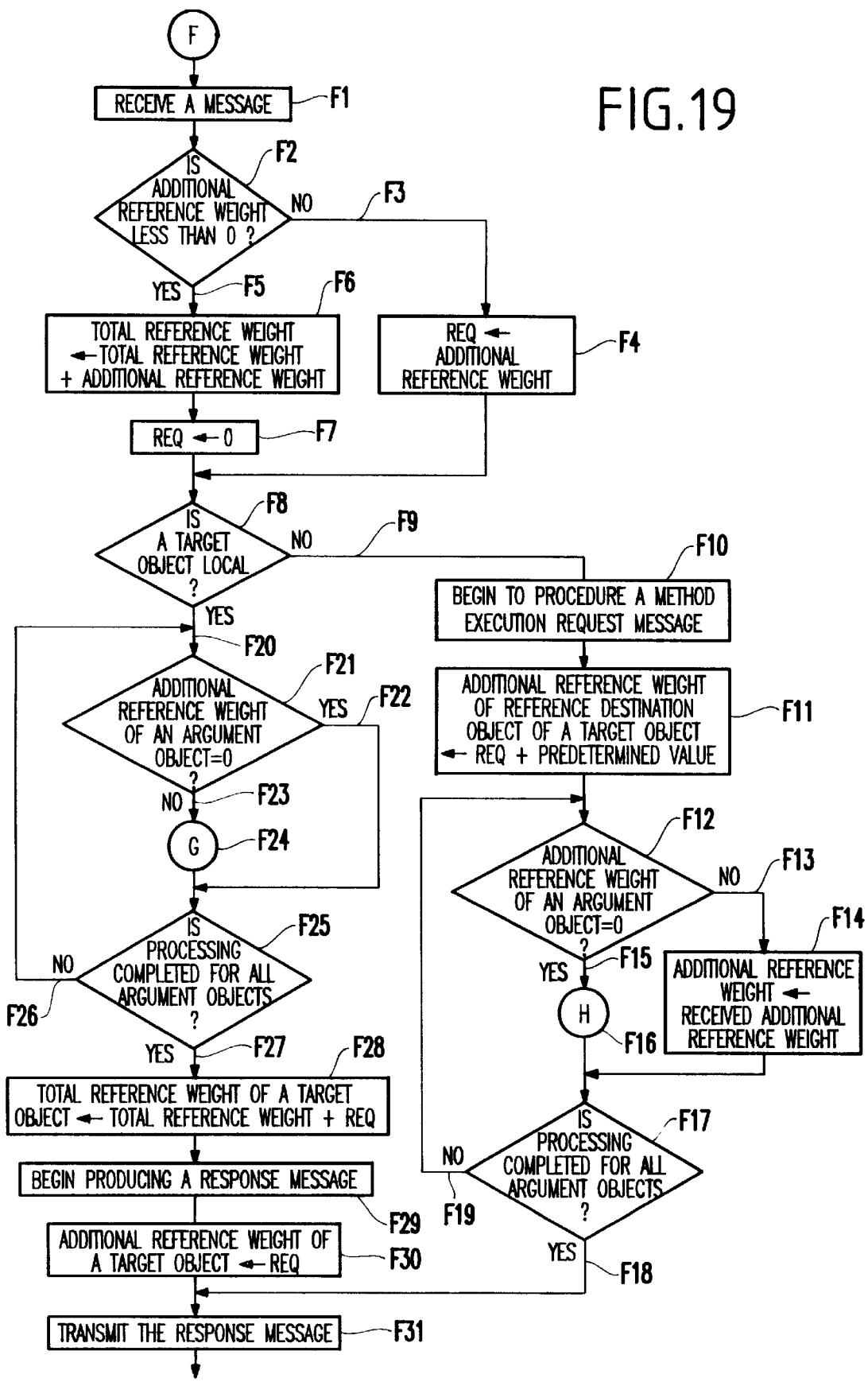
FIG. 19 is a flow chart showing operation in the first embodiment of the present invention.

FIG. 19 is a flow chart showing the processes executed in a case in which the event that occurs is determined to be "6: Reception of a message from another module requesting execution of a method." Processing for a target object that has been called for method execution is essentially the same as processing for a target object that has received a reference request.

Remote access managing means 113 is first called when communication device 106 receives a message from another module and reads the information contained in the message (Step F1).

Remote access managing means 113 examines the value of the additional reference weight of the object of the called method (hereinafter referred to as the "target object") that is stored in the received message (Step F2).

If the additional reference weight is less than "0" (Step F5), remote access managing means 113 calls reference weight managing means 118 and updates by adding the additional reference weight to the total reference weight of the target object (Step F6). Reference weight managing means 118 then prepares a variable "req" indicating the requested amount of reference weight to carry out subsequent processing of reference weight relating to the target object, and stores "0" in this variable "req" (Step F7).

If, on the other hand, the additional reference weight of the target object in Step F2 is greater than "0" (Step F3), remote access managing means 113 receives a request for supplementary reference weight, prepares a variable "req" indicating the requested amount of reference weight, and stores the additional reference weight (Step F4).

Remote access managing means 113 next checks whether or not the target object is local (Step F8).

If the target object is remote (Step F9), remote access managing means 113 begins to produce a method request message to transfer another method request to the remote reference destination object of the target object (Step F10).

Remote access managing means 113 stores the sum of the value of variable "req" and a predetermined value as the additional reference weight to be added to the reference destination object of the target object in the method execution request message (Step F11). This variable "req" indicates the reference weight requested by the received method execution request message.

Remote access managing means 113 also carries out processing to store information of the argument object, which is to be the method argument, in the method execution request message to be transmitted. At this time, remote access managing means 113 examines the value of additional reference weight of the argument object in the received message (Step F12).

If the value of the additional reference weight is not "0" (Step F13), remote access managing means 113 stores the additional reference weight of the argument object in the received message in the additional reference weight of the argument object (Step F14).

Figure 21:
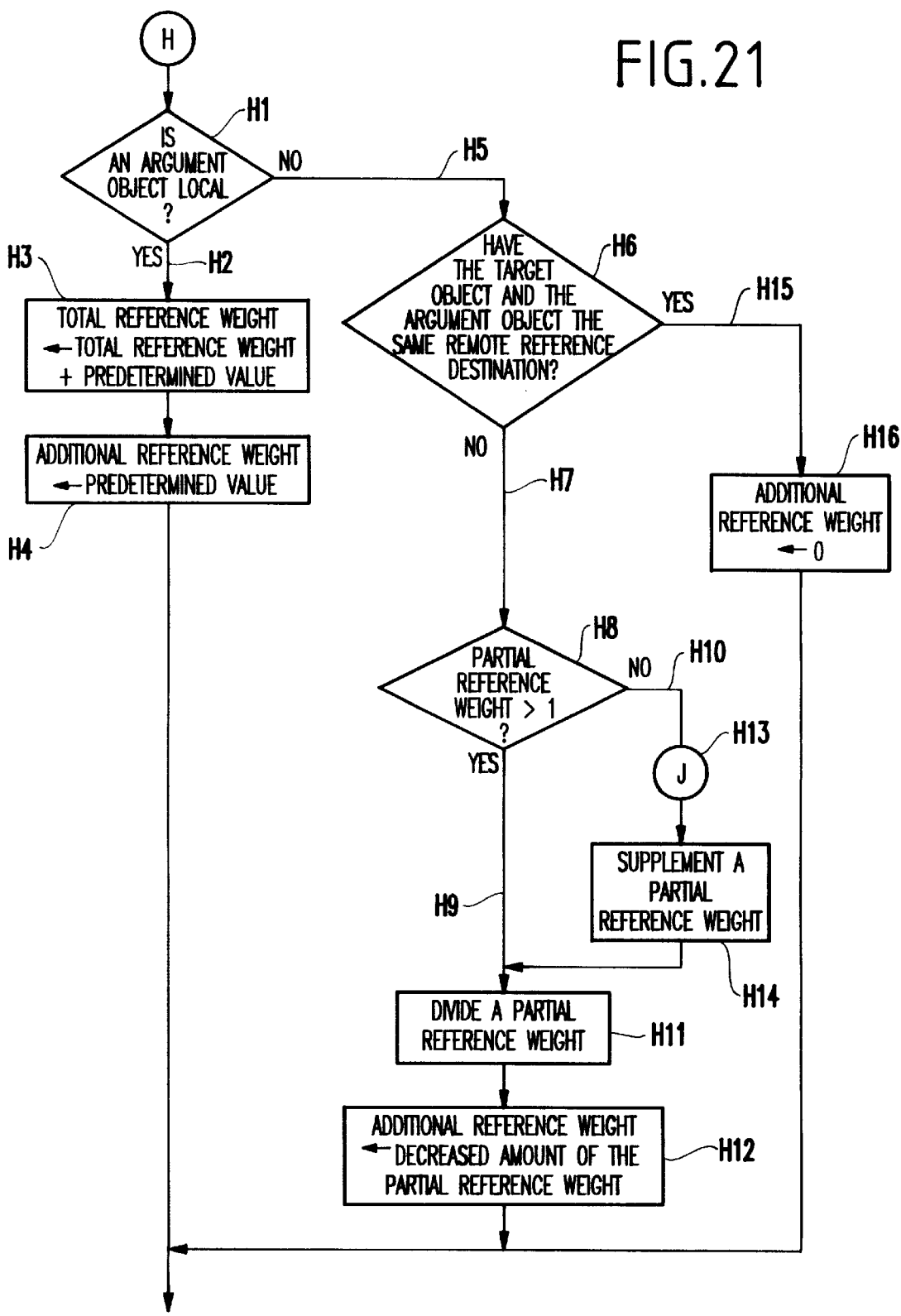
FIG. 21 is a flow chart showing operation in the first embodiment of the present invention.

If, on the other hand, the value of additional reference weight of the argument object in the received message is equal to "0" (Step F15), remote access managing means 113 migrates to the process shown in Step H of FIG. 21.

Remote access managing means 113 checks whether or not the argument object is local (Step H1 in FIG. 21). If the argument object is local (Step H2), remote access managing means 113 calls reference weight managing means 118, brings about updating by adding a predetermined value to the total reference weight of the argument object (Step H3), and adds a predetermined value to the additional reference weight of the argument object in the method request message to be transferred (Step H4).

If the argument object in Step H1 is remote (Step H5), remote access managing means 113 checks whether or not the target object and the argument object have the same remote reference destination (Step H6). If they have the same remote reference destination (Step H15), remote access managing means 113 stores "0" in the additional reference weight of the argument object (Step H16).

If, however, the remote reference destination of the argument object differs from that of the target object (Step H7), remote access managing means 113 calls reference weight managing means 118 and brings about execution of a process to distribute reference weight.

Reference weight managing means 118 checks whether the partial reference weight of the argument object is greater than "1" (Step H8). If the partial reference weight is less than "1" (Step H10), remote access managing means 113 produces and transmits a message requesting supplementary reference weight to the remote reference destination (Step H13 and Step J in FIG. 23). remote access managing means 113 then receives a response message and supplements the partial reference weight (Step H14).

If the partial reference weight in Step H8 is greater than "1" (Step H9), reference weight managing means 118 migrates the process to Step H11 and divides the partial reference weight (Step H11), and remote access managing means 113 stores the thus decreased amount of the partial reference weight in the additional reference weight of the argument object (Step H12).

After setting the additional reference weight of the argument object as described above, remote access managing means 113 checks whether or not processing is completed for all argument objects (Step F17).

If processing is not completed, remote access managing means 113 returns to Step F12 and repeats until processing of all argument objects is completed (Step F19). If processing of all argument objects is completed (Step F18), remote access managing means 113 transmits the produced method execution request message to the module of the target object's remote reference destination (Step F31).

If the target object of the method in Step F8 is local (Step F20), execution of the method is started within this module by method executing means 120, whereupon the reference weight of the argument object, which is to be the method argument, is updated.

Figure 20:
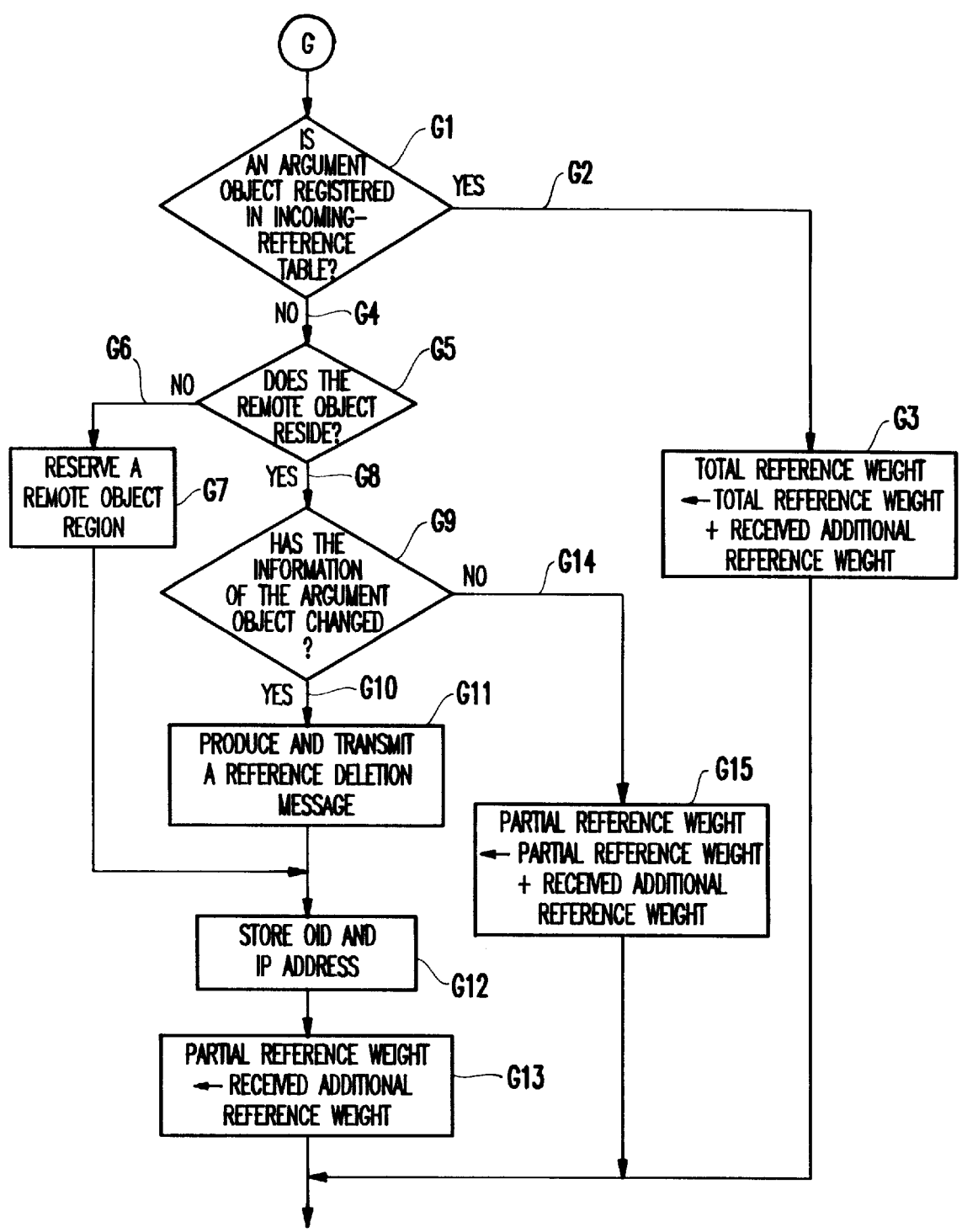
FIG. 20 is a flow chart showing operation in the first embodiment of the present invention.

Remote access managing means 113 checks the additional reference weight of the argument object (Step F21). If the additional reference weight is "0" (Step F22), remote access managing means 113 migrates to the process of Step F25. If the additional reference weight is not "0" (Step F23), remote access managing means 113 migrates to the process of Step G (FIG. 20) in order to update the partial reference weight of the argument object.

In Step G, remote access managing means 113 first checks whether or not the argument object is registered in incoming-reference table 116 (Step G1).

If the argument object is registered (Step G2), remote access managing means 113 calls reference weight managing means 118 and brings about updating by subtracting the value of additional reference weight from the total reference weight of the argument object (Step G3). In this way, a remote-referenced object is prevented from remote-referencing itself.

If, on the other hand, the argument object in Step G1 is not registered in incoming-reference table 116 (Step G4), remote access managing means 113 checks whether or not the remote object that remote-references the argument object resides within heap memory region 114 (Step G5).

If the argument object is not present (Step G6), remote access managing means 113 calls heap memory managing means 115, newly reserves a remote object region, and creates a remote object (Step G7). Remote access managing means 113 further sets the values of the OID and IP address of the argument object (Step G12), calls reference weight managing means 118, and stores the received additional reference weight in the partial reference weight (Step G13).

If, on the other hand, the argument object in Step G5 is already present as a remote (Step G8), remote access managing means 113 checks whether or not the reference destination information of the argument object has changed (Step G9).

If there has been no change (Step G14), reference weight managing means 118 updates by adding the additional reference weight of the argument object in the received message to the partial reference weight of the argument object (Step G15). On the other hand, if the reference destination information of the argument object has changed (Step G10), produces and transmits a reference deletion message to the reference destination held by the remote object (Step G11). Reference weight managing means 118 next stores the OID and IP address (Step G12), and stores the partial reference weight as the argument object's additional reference weight in the received message (Step G13).

Remote access managing means 113 checks whether or not processing from Step F21 to Step F24 has been completed for all argument objects (Step F25). If processing is not completed (Step F26), processing is repeated until completed for all argument objects.

If all processing is completed (Step F27), reference weight managing means 118 updates by adding the value of variable "req" to the total reference. weight of the target object information (Step F28). Remote access managing means 113 then begins producing the response message storing the result of executing the method (Step F29), and stores the value of variable "req" as the additional reference weight of the target object (Step F30). Remote access managing means 113 then completes production of the message and transmits the response message (Step F31).

Figure 22:
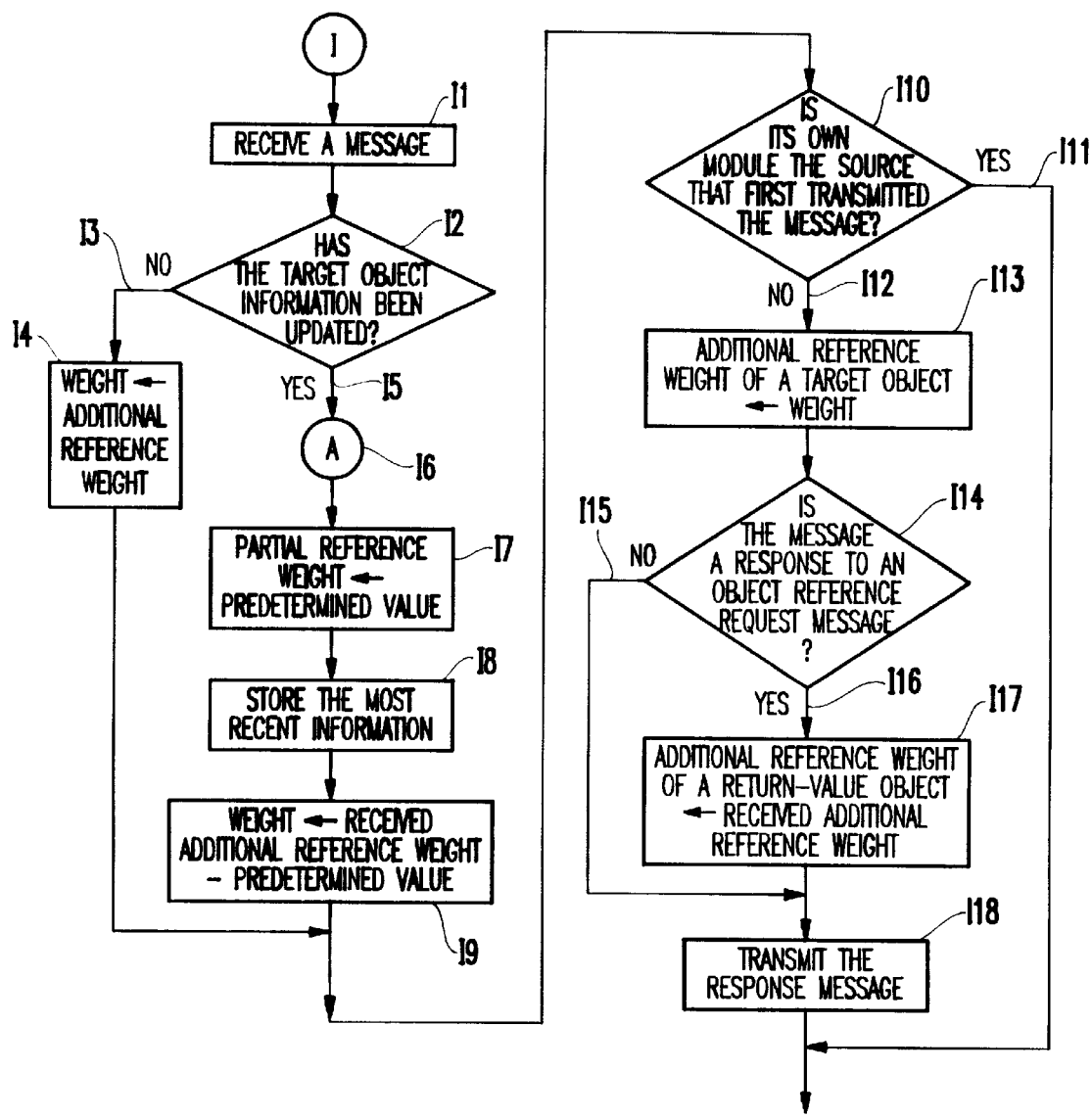
FIG. 22 is a flow chart showing operation in the first embodiment of the present invention.

FIG. 22 is a flow chart showing the processes executed in a case in which the event that occurs is determined to be "7: Reception of a response message from another module."

When communication device 106 receives a message, remote access managing means 113 reads the type stored in the message and verifies that the message is a response (Step I1). Remote access managing means 113 then compares the most recent information of the object that transmitted the original message of the response message (in this case referred to as the "target object") that is stored within the message with the target object information within the module and checks whether or not the information is the same (Step I2).

If the information has not been updated (Step I3), remote access managing means 113 does not need to update the target object information in its own module. Remote access managing means 113 prepares a variable "weight" that is used for storing the additional reference weight of the target object when subsequently transferring yet another response message, and stores in this variable "weight" the additional reference weight that was added to the target object in the received message (Step I4).

If, on the other hand, the target object in Step I2 has been updated (Step I5), the information of the remote reference destination held by remote access managing means 113 has become invalid, and remote access managing means 113 therefore migrates to Step A in FIG. 14, produces a reference deletion message, and transmits the message (Step I6).

Remote access managing means 113 then calls reference weight managing means 118, stores a predetermined value as the new partial reference weight to the partial reference weight of the target object (Step I7), and stores the most recent information such as the IP address of the target object (Step I8). Remote access managing means 113 also prepares a variable "weight" for subsequent processing and stores in this variable "weight" a value obtained by subtracting the predetermined value from the additional reference weight of the target object (Step I9).

Remote access managing means 113 then checks whether or not its own module is the source that first transmitted the message (Step I10). If the module it resides in is the request originator (Step I11), there is no need to transfer the response beyond that module, and processing ends.

On the other hand, if the request originator is not the module in which it resides, and if it further transferred the received request message, remote access managing means 113 will eventually return a response message back to the partner module that transmitted the request message. Remote access managing means 113 begins to produce a message for transferring such a response (Step I12).

Remote access managing means 113 stores the value of variable "weight" that was reserved in the previous process as the additional reference weight of the target object in the response message (Step I13).

Remote access managing means 113 then checks the type of message (Step I14), and if the message is other than a response to an object reference request message (Step I15), ends production at this point and transmits the message (Step I18).

On the other hand, if the message is a reference request message (Step I16), remote access managing means 113 stores the reference as a return value (the object of this reference destination is referred to as a "return-value object") in the message, stores the value of the additional reference weight of the return-value object in the received response message without change as the additional reference weight of the return-value object (Step I17), and transmits the produced response message (Step I18).

Figure 23:
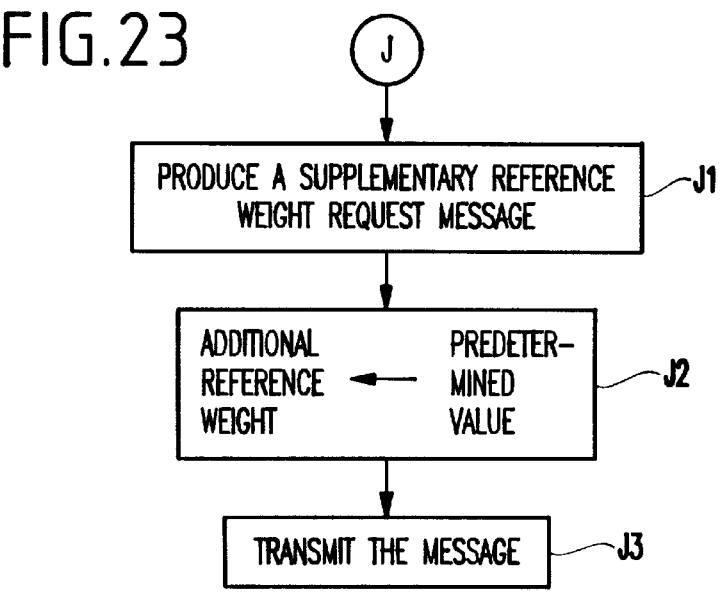
FIG. 23 is a flow chart showing operation in the first embodiment of the present invention.

FIG. 23 is a flow chart showing the processes executed in a case in which the event that occurs is determined to be "8: Depletion of partial reference weight."

If reference weight managing means 118 cannot divide reference weight because the value of the partial reference weight of an object that distributes remote reference is less than 1, remote access managing means 113 begins production of a message to the remote reference destination of the remote object to request supplementary reference weight (Step J1).

Remote access managing means 113 stores a predetermined value as the additional reference weight to the reference destination object information of the remote object that is stored in the supplementary reference weight request message (Step J2) and transmits the produced message (Step J3).

Figure 24:
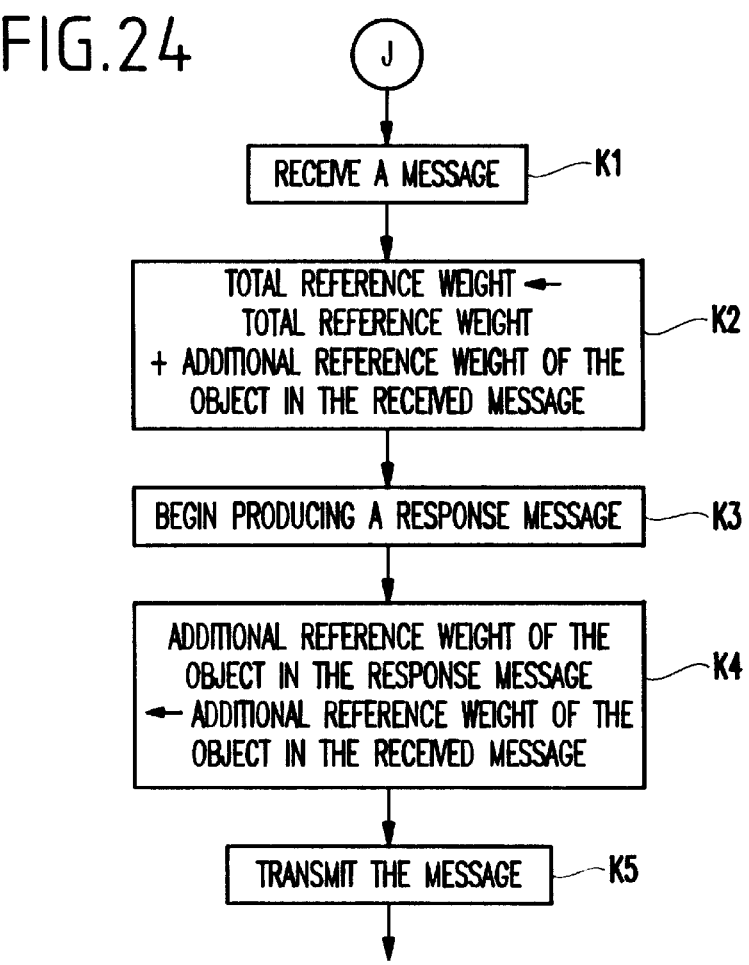
FIG. 24 is a flow chart showing operation in the first embodiment of the present invention.

FIG. 24 is a flow chart showing the processes executed in a case in which the event that occurs is determined to be "9: Reception of a message requesting supplementary reference weight."

When communication device 106 receives a message, remote access managing means 113 reads the message and verifies that it is a request for supplementary reference weight (Step K1).

Reference weight managing means 118 then updates by increasing the total reference weight of the object requesting reference weight by the additional reference weight of the object in the received message (Step K2).

Remote access managing means 113 next begins producing a response message to the supplementary reference weight request (Step K3), stores without alteration the value of the object's additional reference weight in the received message to the object's additional reference weight that is stored in this message (Step K4), and transmits the produced message (Step K5).

Explanation is next presented based on a concrete example with reference to FIGS. 25–38 regarding the operation in distributed system 1 according to this embodiment.

It is assumed that module 180 receives a reference request message from module 170 and returns information of object 181.

Module 180 reserves regions relating to object 181 in incoming-reference table 182, and stores object 181 in OID 183, a predetermined value of the reference weight (in this case "8") in total reference weight 184, and the memory address of object 181 in a heap memory region in reference pointer 185.

Figure 25:
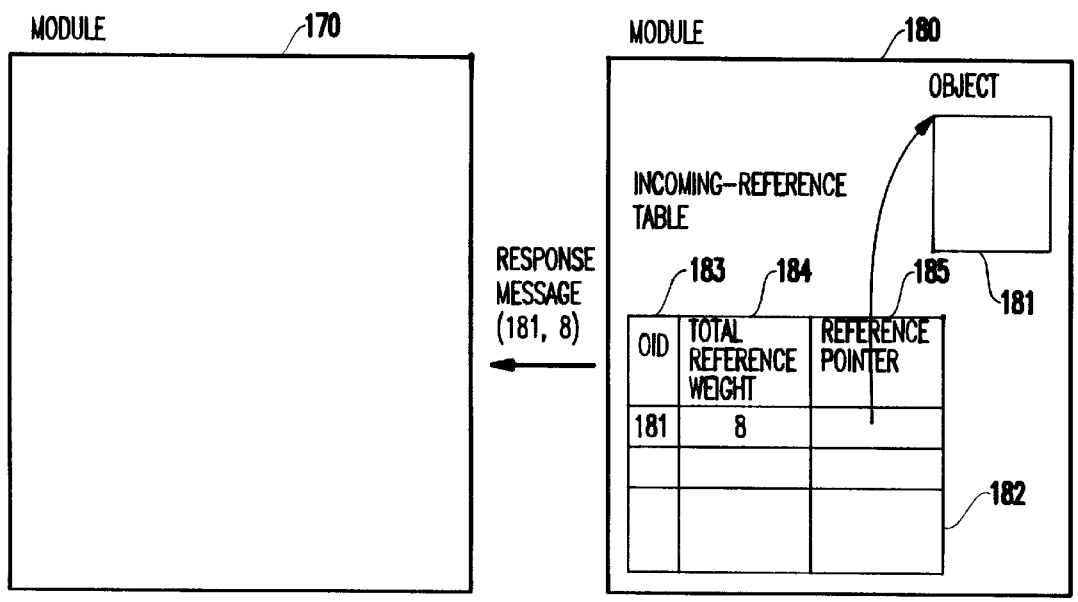
FIG. 25 illustrates a concrete example of the operation in the first embodiment of the present invention.

Module 180 then stores the OID of object 181, the IP address of module 180, and reference weight "8" as the additional reference weight in the response message, and transmits the message to module 170 (FIG. 25).

Figure 26:
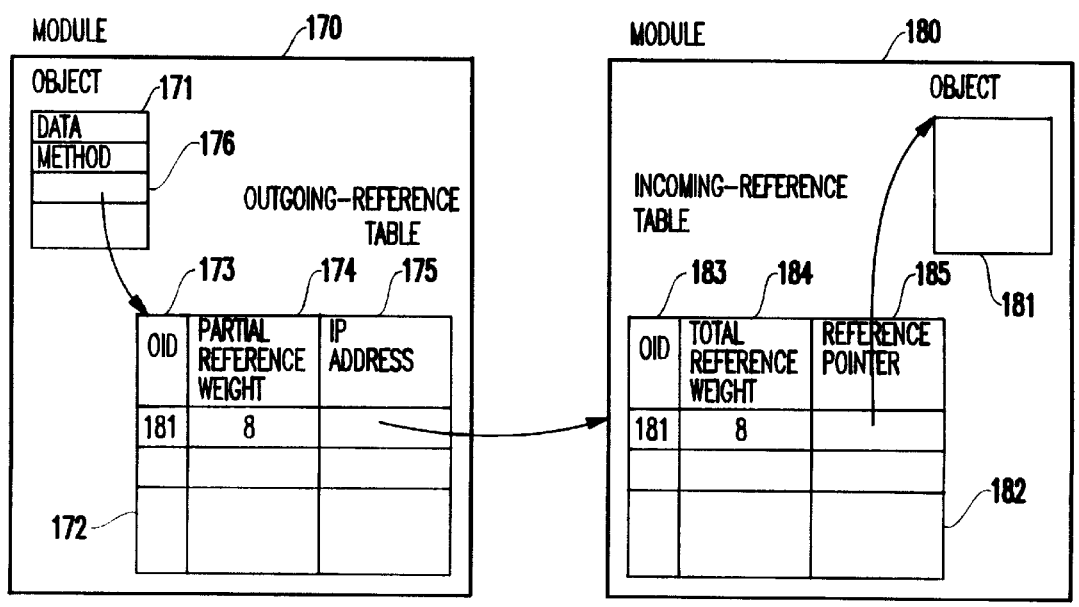
FIG. 26 illustrates a concrete example of the operation in the first embodiment of the present invention.

After receiving the response message, module 170 first reserves remote object 171 in a heap memory region. Next, based on the received response message, module 170 reserves a region for object 171 in outgoing-reference table 172 and stores object "181" in OID 173, the IP address of the computer of module 180 in IP address 175, and additional reference weight "8" that was received in partial reference weight 174. Module 170 then stores the memory address of the region of reference table 172 of object 171 into reference pointer 176 of object 171, and creates a remote reference to object 181 (FIG. 26).

Later, it is assumed that, from the state shown in FIG. 26, another module 190 transmits to module 170 a request to execute a method, and module 170 includes information of object 171 in a response message and returns a response.

Figure 27:
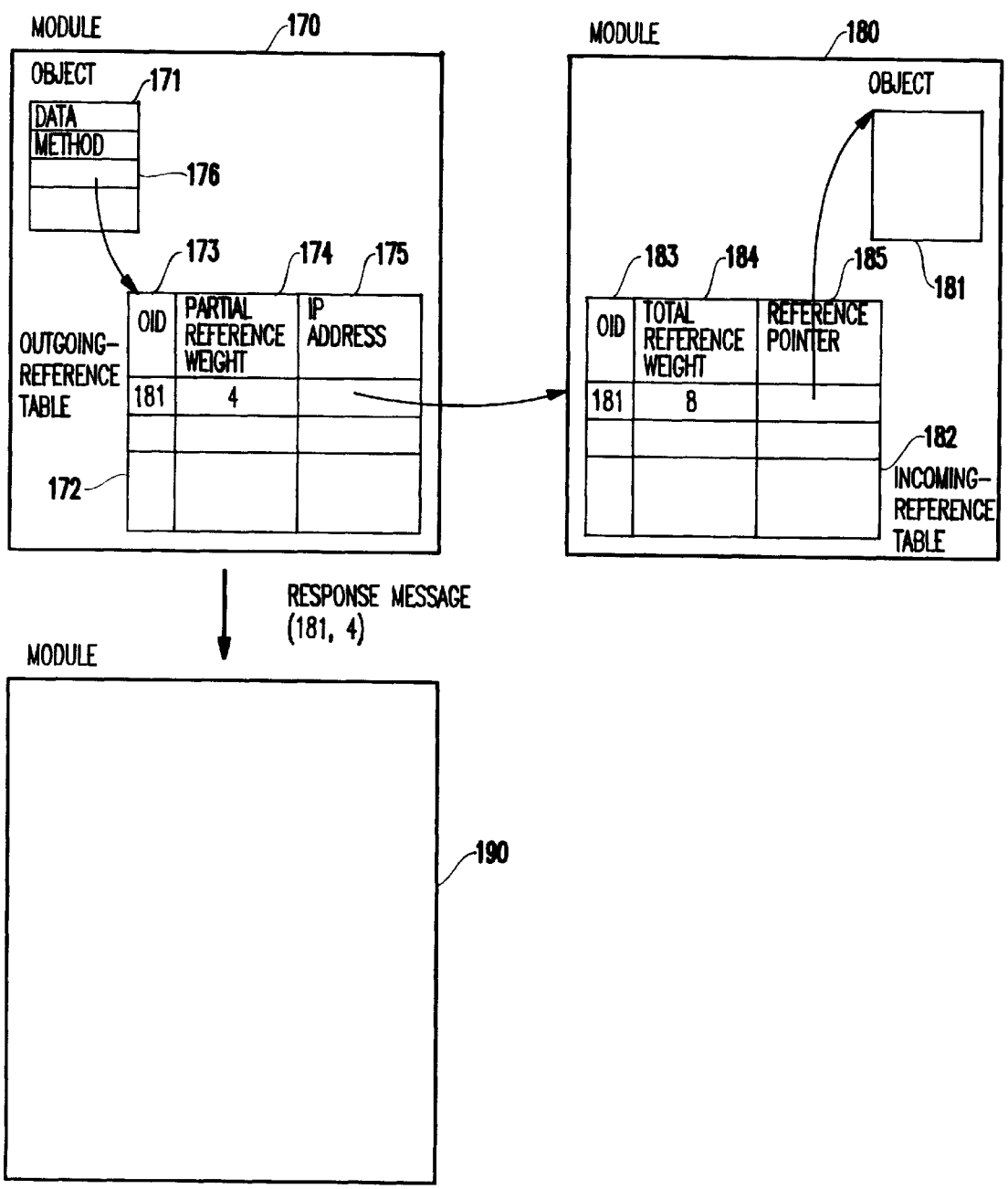
FIG. 27 illustrates a concrete example of the operation in the first embodiment of the present invention.

Module 170 executes the method and stores the value "181" of OID 173 of object 171 in the message. Module 170 then decreases partial reference weight 174 by half, stores "4" as the new partial reference weight 174, produces a response message with the remaining reference weight of "4" as the additional reference weight, and transmits the response message to module 190 (FIG. 27).

Figure 28:
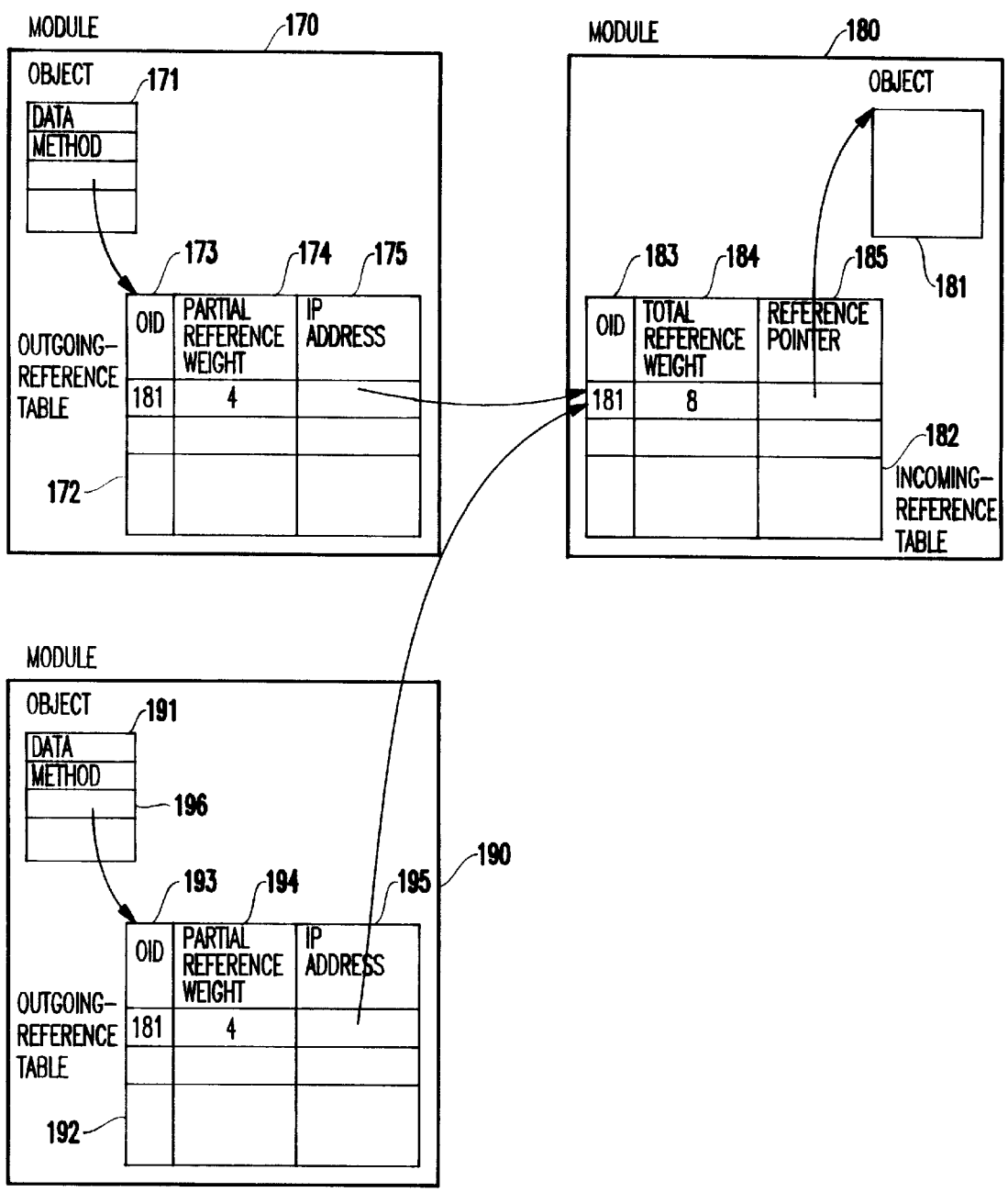
FIG. 28 illustrates a concrete example of the operation in the first embodiment of the present invention.

After receiving the response message, module 190 reserves remote object 191 in the heap memory region and reserves a region for object 191 in its own outgoing-reference table 192. From the information relating to object 181 included in the received response message, module 190 then stores object 181 in OID 193, the received additional reference weight "4" in partial reference weight 194, and the IP address of module 180 in IP address 195. Module 170 thus allocates to object 191 of module 190 the reference weight it holds relating to object 181 of module 180 (FIG. 28).

Object 181 is remote-referenced from two remote objects 171 and 191, but the sum of the partial reference weights belonging to objects 171 and 191 is equal to the total reference weight belonging to object 181, and all remote-references of object 181 are managed by total reference weight 184.

Figure 29:
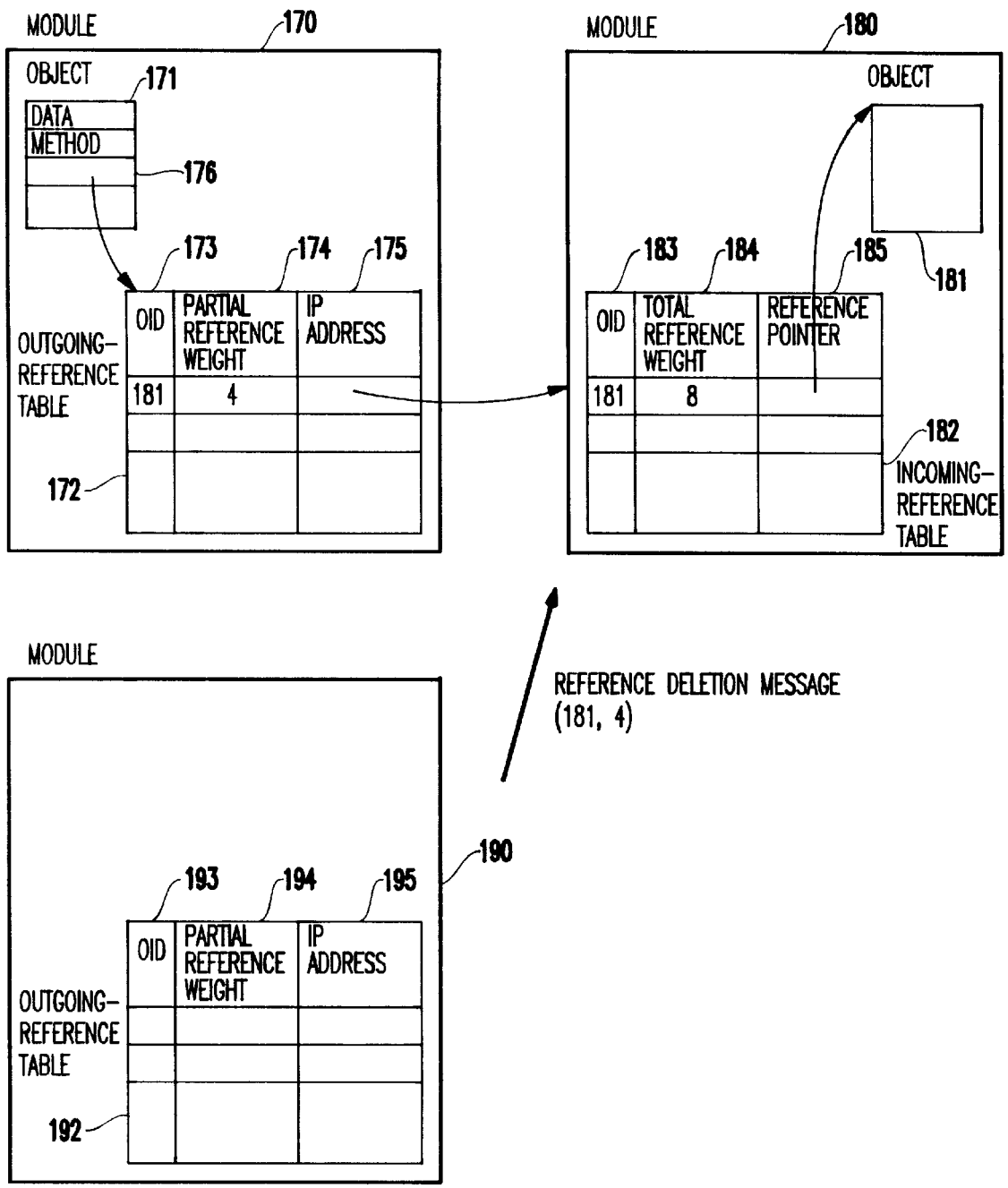
FIG. 29 illustrates a concrete example of the operation in the first embodiment of the present invention.

If the heap memory managing means of module 190 subsequently determines object 191 to be a garbage object, the remote access managing means of module 190 stores the value "4" of partial reference weight 194 and the value "181" of OID 193 in a reference deletion message to module 180, which is the reference destination of object 191, and transmits the message. The heap memory managing means of module 190 then reclaims the region of object 191 and clears the region of object 191 in outgoing-reference table 192 (FIG. 29).

After receiving a message to delete a reference, the remote access managing means of module 180 checks the OID of the received message, subtracts "4" from the value of total reference weight 184 in incoming-reference table 182, making the total reference weight "4" (FIG. 30).

Figure 31:
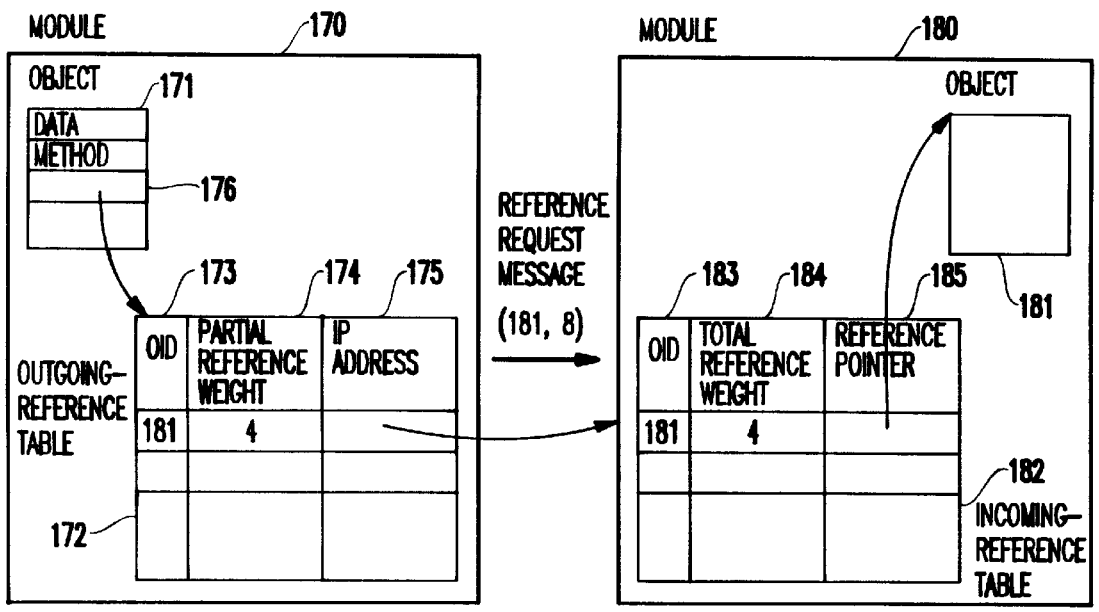
FIG. 31 illustrates a concrete example of the operation in the first embodiment of the present invention.

It is further assumed that during execution of a method, module 170 transmits a message requesting reference to object 181 by way of object 171. If the minimum of partial reference weight in Step C2 of FIG. 16 is assumed to be "5" in this case, the reference weight managing means of module 170 transmits a message to module 180 requesting reference with a predetermined value (assumed to be "8" in this case) stored in the additional reference weight of object 181 (FIG. 31).

Figure 32:
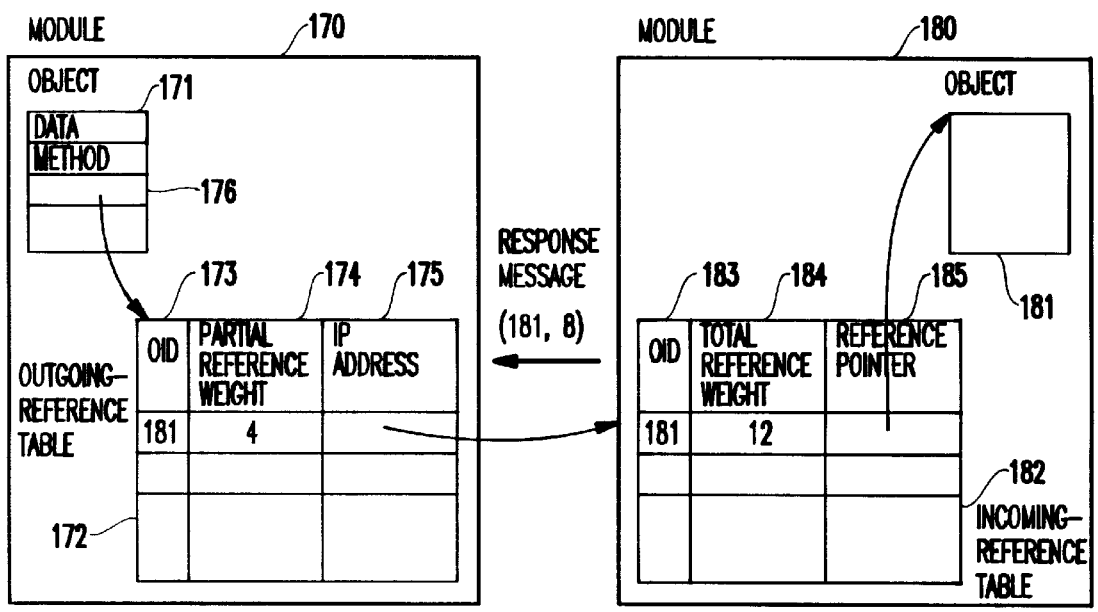
FIG. 32 illustrates a concrete example of the operation in the first embodiment of the present invention.

Upon receiving the reference request message from module 170, module 180 verifies that the region of object 181 resides in incoming-reference table 182, adds the additional reference weight "8" contained in the received message to total reference weight 184, and stores the new value "12." Module 180 then stores the requested reference weight portion "8" as the additional reference weight in the response message to the reference request message and returns the message (FIG. 32).

Figure 33:
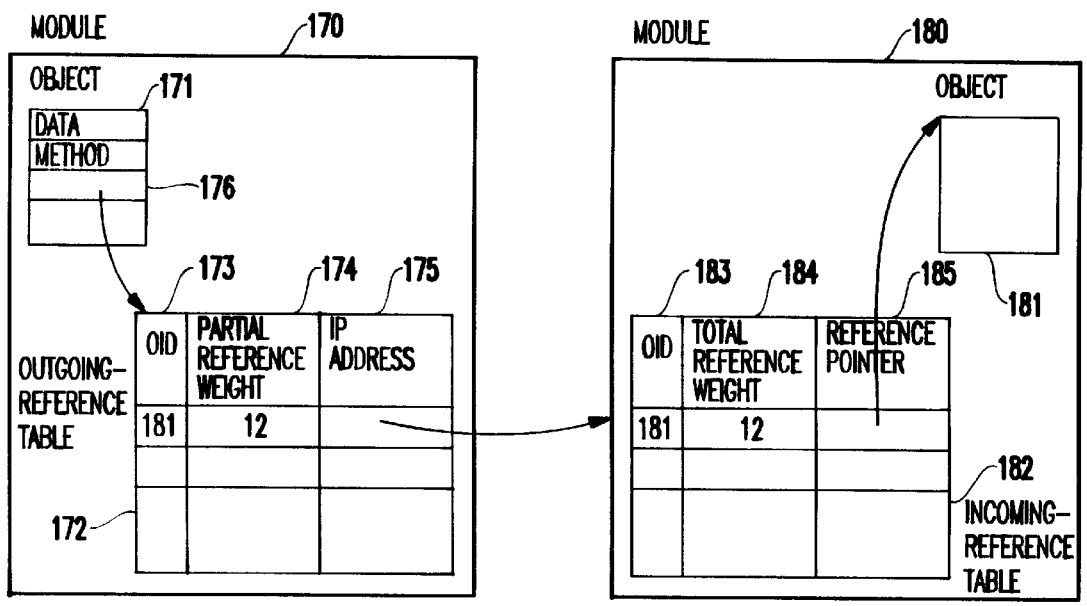
FIG. 33 illustrates a concrete example of the operation in the first embodiment of the present invention.

Upon receiving the response message, module 170 adds the additional reference weight "8" of the response message to its own partial reference weight 174 to update the partial reference weight to "12" (FIG. 33).

In this case, the maximum of the partial reference weight set in advance by the reference weight managing means (Step C6 in FIG. 16) is "40," and the negative predetermined value stored in the additional reference weight at that time is assumed to be "−20."

Figure 34:
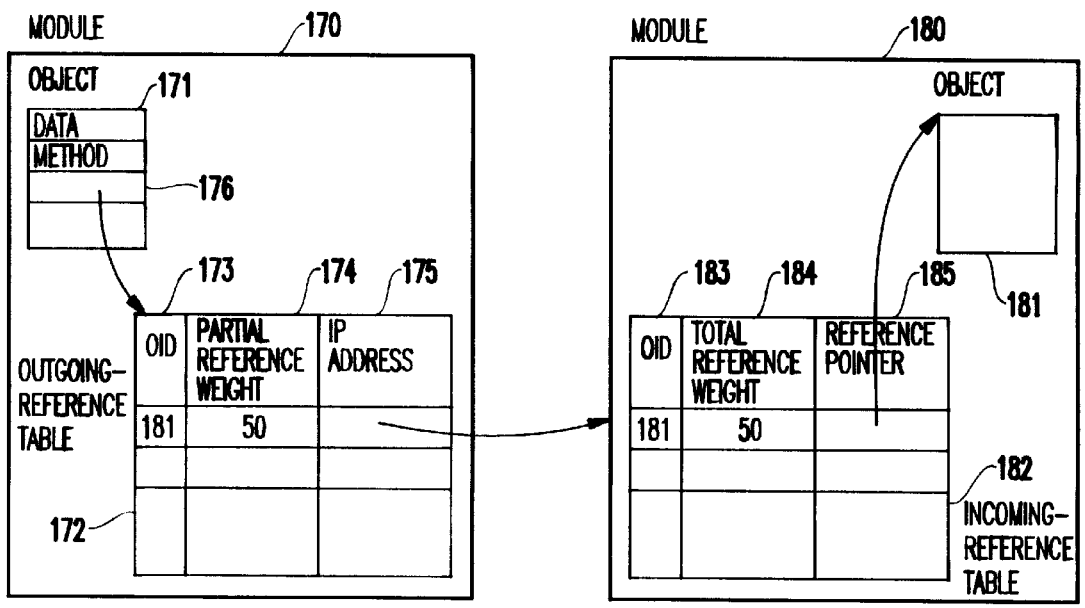
FIG. 34 illustrates a concrete example of the operation in the first embodiment of the present invention.

A case is next considered in which the partial reference weight of object 171 and the total reference weight of object 181 subsequently increase, each becoming "50," following which object 171 transmits a reference request message to module 180 (FIG. 34).

Figure 35:
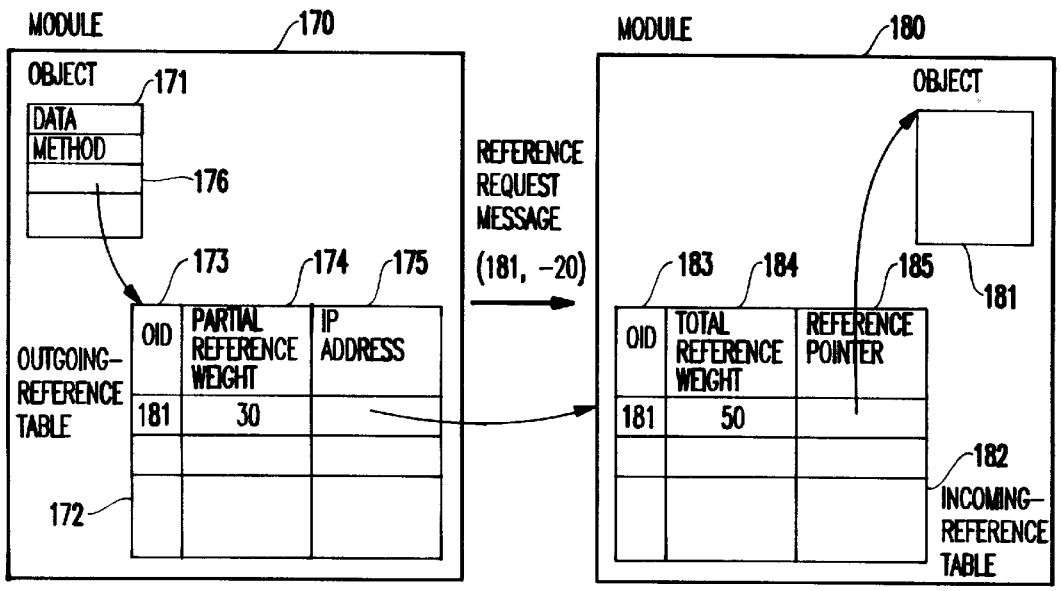
FIG. 35 illustrates a concrete example of the operation in the first embodiment of the present invention.

Because the partial reference weight of object 171 has exceeded the maximum, the reference weight managing means of module 170 stores "−20" as the additional reference weight in a reference request message and transmits the message to module 180 (FIG. 35).

Figure 36:
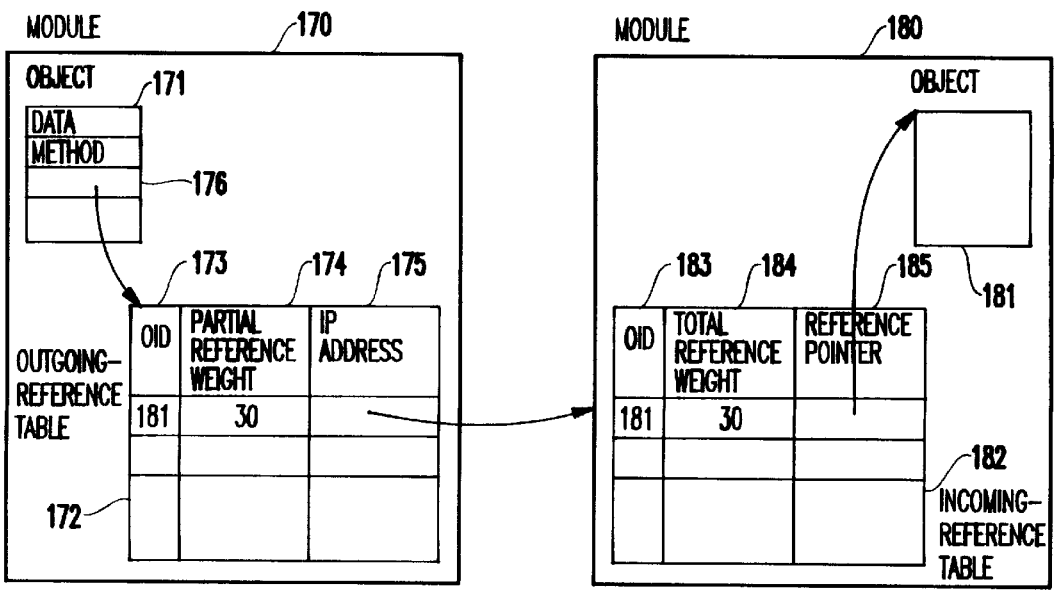
FIG. 36 illustrates a concrete example of the operation in the first embodiment of the present invention.

Upon receiving the message, module 180 adds the received additional reference weight to total reference weight 184. In other words, module 180 subtracts reference weight "20" from the value "50" of total reference weight 184, making the total reference weight "30" (FIG. 36).

Figure 37:
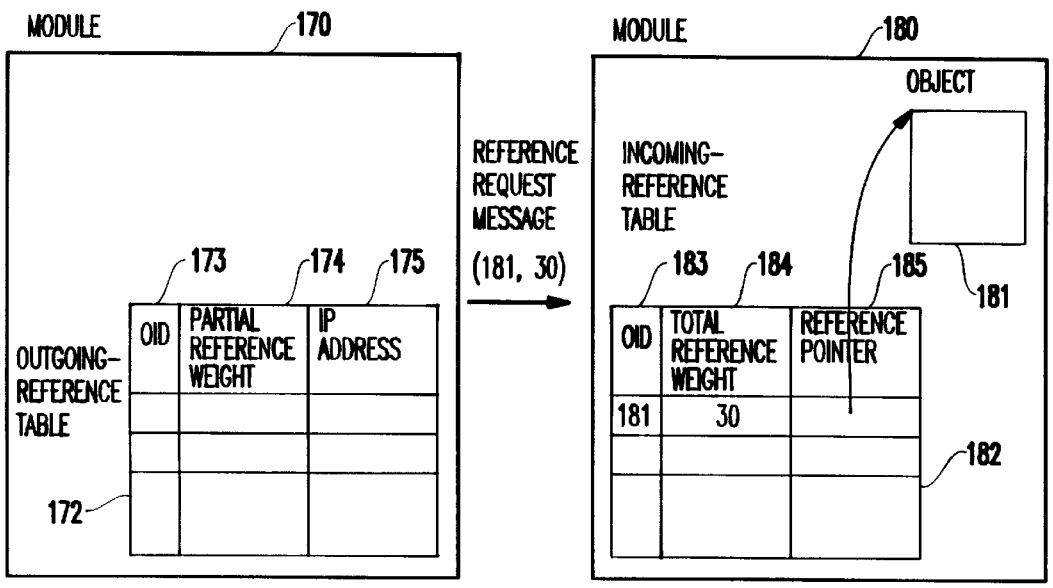
FIG. 37 illustrates a concrete example of the operation in the first embodiment of the present invention.

When the heap memory managing means of module 170 subsequently determines object 171 to be a garbage object, it sends a reference deletion message to module 180. Object 171 is reclaimed by the heap memory managing means and the region of object 171 in outgoing-reference table 172 is also cleared (FIG. 37).

Figure 38:
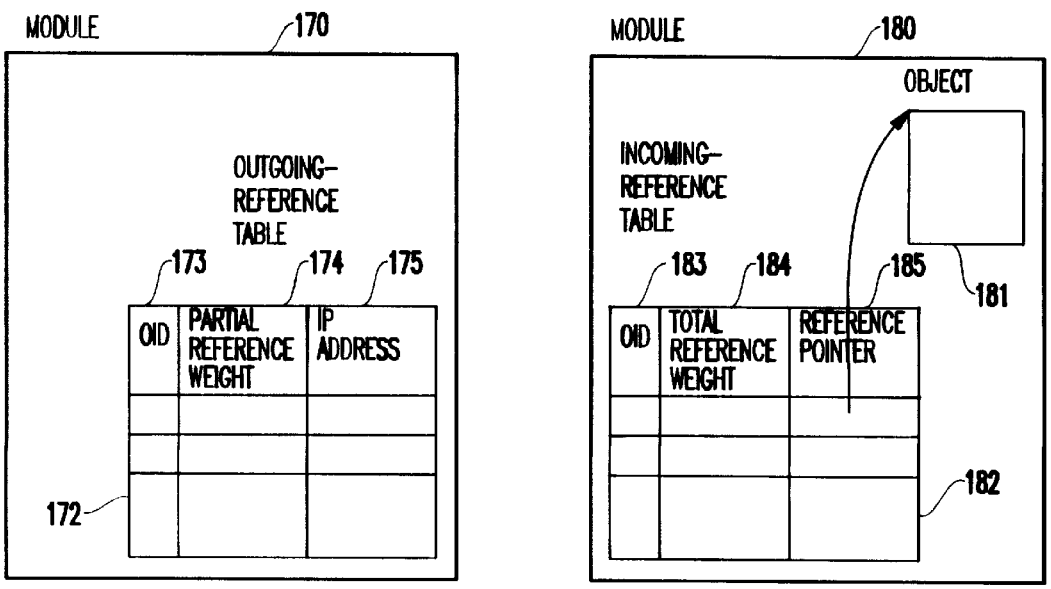
FIG. 38 illustrates a concrete example of the operation in the first embodiment of the present invention.

Upon receiving the reference deletion message, module 180 subtracts "30" from total reference weight 184 in incoming-reference table 182 in accordance with the OID in the received message. The region of object 181 in outgoing-reference table 182 is cleared because total reference weight 184 has become "0." If it is also not subsequently referenced from another object within module 180, the region of object 181 is reclaimed by the heap memory managing means (FIG. 38).

Explanation is next presented regarding the effect of this embodiment.

In this embodiment, reference weight managing means 118 dynamically determines, in accordance with the value of the partial reference weight of the object, the additional reference weight that is added during exchange of information of an object. In cases in which partial reference weight nears depletion, a request for supplementary reference weight can therefore be added to a reference request message or method request message, the requested reference weight can be received from the response message, and the reference weight thus increased.

The possibility of depletion of partial reference weight is therefore lessened, and reference can be distributed. In addition, excessive communication is not generated for the purpose of increasing weight. Similarly, in cases in which partial reference weight is increased excessively, reference weight can be returned by setting a negative value to the additional reference weight, thereby preventing excessive increase of the total reference weight.

Along with these merits, the chance of creating an indirect object can also be reduced.

In addition, the reference destination of an object can be constantly updated to the most recent information by simply including an additional reference weight along with the object's information in reference request messages and method request messages transmitted to obtain information of an object that is to be remote-referenced. Moreover, excess communication is not generated to update a reference destination. These factors reduce intermediation by modules, i.e., multistage communication through indirect remote-referencing or message transfer.

In addition, unnecessary communication connections to the modules can also be reduced, the execution speed increased, and load on the network reduced.

Finally, excess memory regions existing only for transferring references can also be decreased.

Second Embodiment

Although the structure of the distributed system in this embodiment is essentially the same as that of the first embodiment shown in FIG. 9, the structure of each computer that makes up the distributed system differs from that of the first embodiment.

Figure 39:
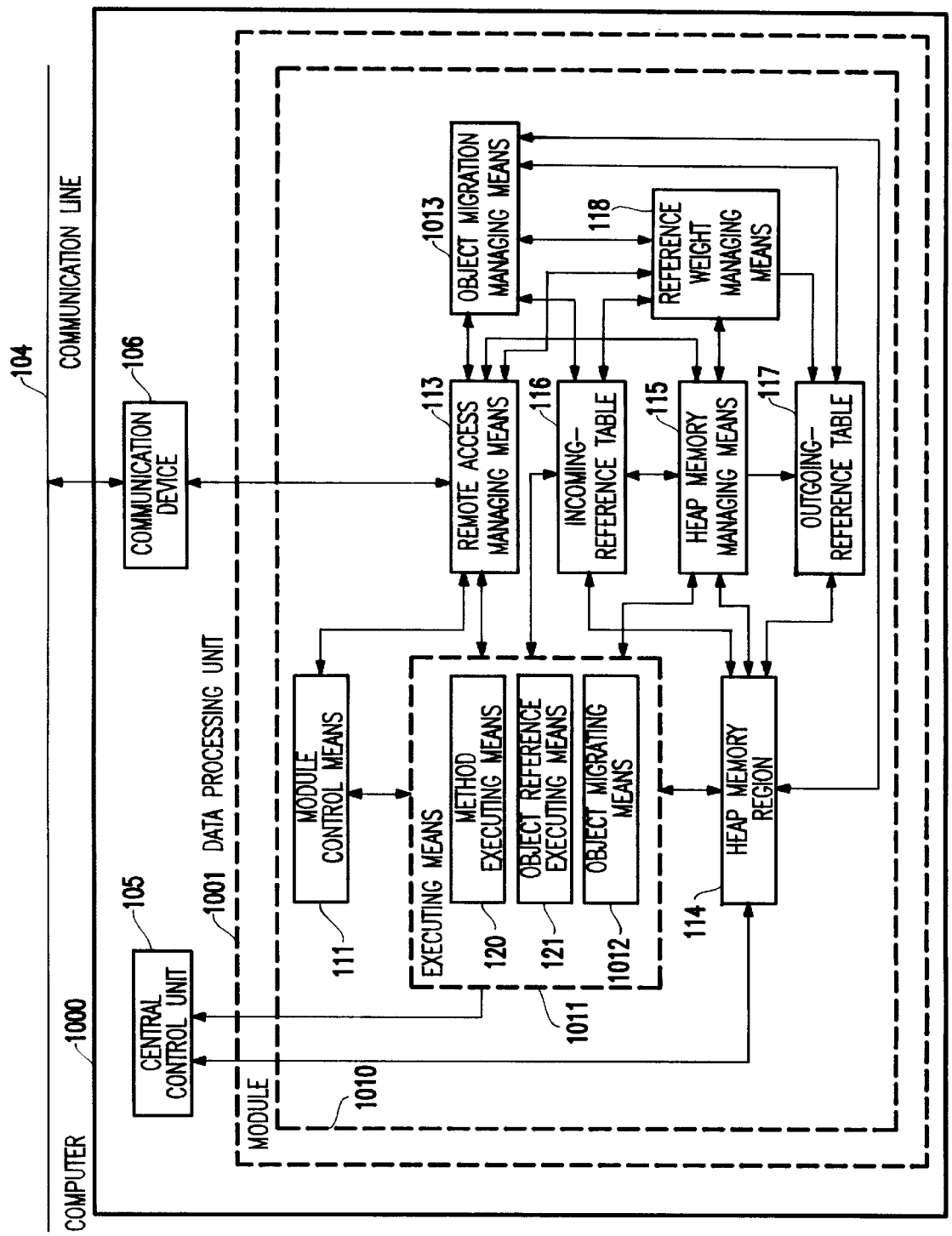
FIG. 39 is a function block diagram showing the functional composition of a computer according to the second embodiment of the present invention.

FIG. 39 is a function block diagram showing the functional structure of computer 1000 according to this embodiment.

In As shown in FIG. 39, in computer 1000 according to this embodiment, executing means 1011 of module 1010 is further provided with object migrating means 1012 added to executing means of the first embodiment shown in FIG. 10. In addition, module 1010 is further provided with object migration managing means 1013 in addition to the components of the module of the first embodiment.

In the following explanation, "object migration" refers to a technique of changing execution environment, in which an object region residing within a module is itself stored in a communication message and transmitted to a different module.

Object migrating means 1012 is a means for receiving the instructions of module control means 111, commanding remote access managing means 113 to store information of an object in a message, and migrating the object.

Object migration managing means 1013 receives the instructions of remote access managing means 113 and is active immediately before and immediately after the object migrates. Immediately before object migration, object migration managing means 1013 changes the data and method of the object to a format for storage in a communication message and communicates with remote access managing means 113. Immediately after object migration, object migration managing means 1013, based on the object information stored in the received message, reserves and rebuilds an object region in heap memory region 114 to enable access without conflict from another object to the migrated object.

An object in the migration origin module is changed to a remote object after the actual content of the object has migrated, and this object remains in the migration origin module but holds a remote reference to the object created in the migration destination module, and, upon being accessed from, for example, an executing means, performs the role of transferring the access to the object having actual content. Such a remote object is therefore referred to hereinafter as a "relay object." An object created in the module of the migration destination is remote-referenced from the relay object.

When an object migrates in, object migration managing means 1013 checks whether a relay object of the migrated object exists in the module in which it resides, and if a relay object exists, integrates the two object regions of the relay object and migrated object, making them one object, and preventing unnecessary consumption of memory regions.

Explanation is next presented regarding the operation of this embodiment with reference to FIGS. 40–46.

Figure 40:
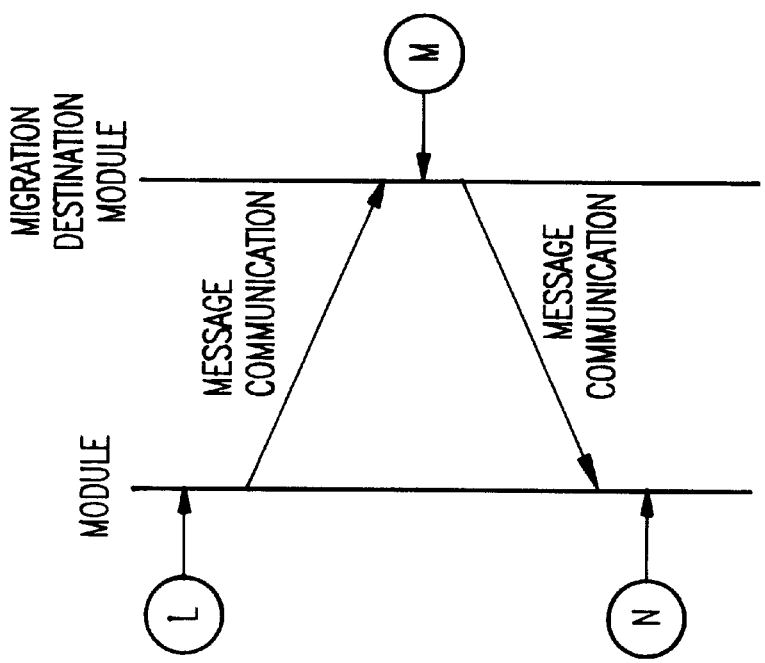
FIG. 40 is a sequence chart showing the operation in the second embodiment of the present invention.

FIG. 40 shows the series of procedures for object migration.

Figure 41:
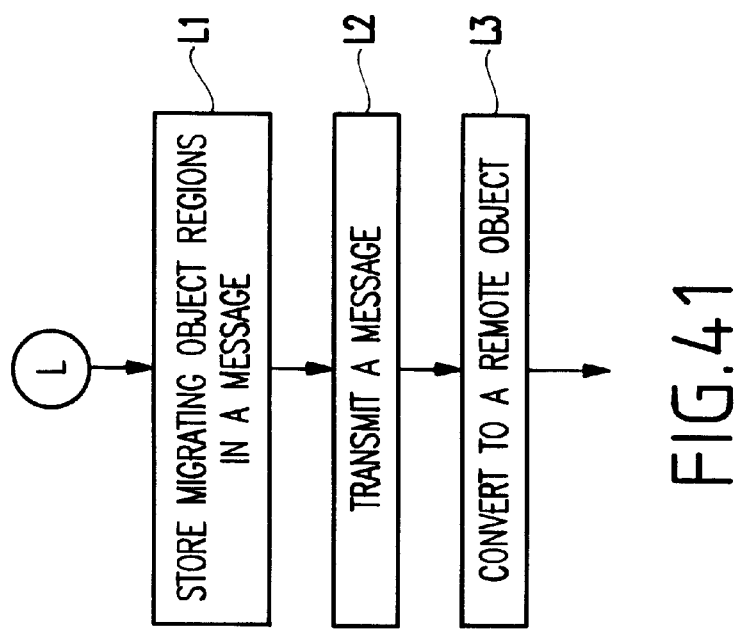
FIG. 41 is a flow chart showing the operation in Step L of FIG. 40.

In FIG. 44, when object 1101 residing within module 1100 is instructed to migrate to module 1110 by object migrating means 1012, object migration managing means 1013 first reads information relating to object 1101 from the heap memory region, converts the information to a state that can be stored in a message, and communicates it to remote access managing means 113. Remote access managing means 113 receives the information and stores it in a message (FIG. 40 and Step L1 in FIG. 41). After completing production of the object migration message, remote access managing means 113 transmits the message to the migration destination module (Step L2 in FIG. 41). Remote access managing means 113 then converts object 1101 to a remote object, and leaves it in module 1100 as a relay object (Step L3).

Figure 42:
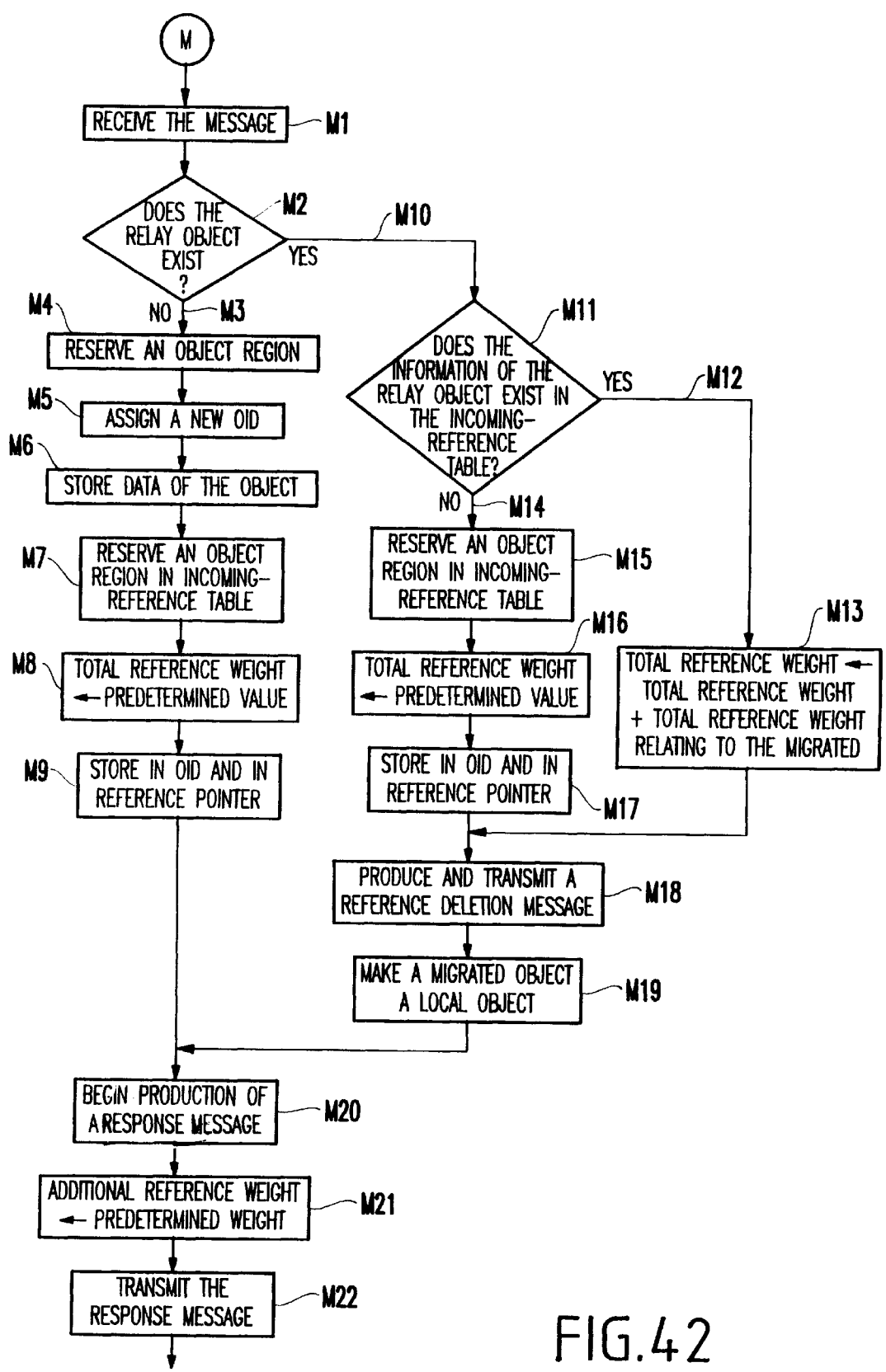
FIG. 42 is a flow chart showing the operation in Step M of FIG. 40.
Figure 45:
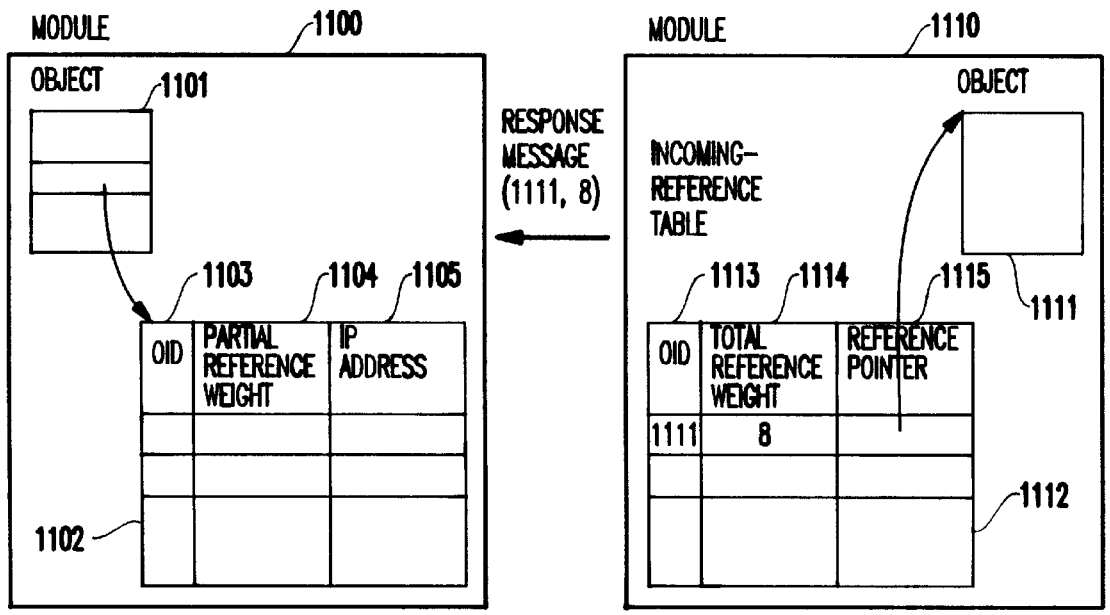
FIG. 45 is for explaining the operation in the second embodiment of the present invention.

In FIG. 45, module 1110 receives the object migration message from module 1100 (FIG. 40 and Step M1 in FIG. 42). Object migration managing means 1013 next checks whether or not the relay object of object 1101 exists within module 1110 (Step M2), and if not (Step M3), reserves an object region within module 1110 (Step M4), assigns a new OID (Step M5), and makes this object 1111 (Step M6). To enable remote reference from relay object 1101, object migration managing means 1013 reserves a region corresponding to object 1111 in incoming-reference table 1112 (Step M7), stores object 1111 in OID 1113, a predetermined value (in this case, "8") in total reference weight 1114, and the memory address of object 1111 in reference pointer 1115 (Step M9), thereby completing migration of the object.

If, on the other hand, the relay object does exist within module 1110 (Step M10), object migration managing means 1013 begins processing to integrate the relay object with the migrated object information stored in the received message. Object migration managing means 1013 first checks whether or not information of the relay object exists in the incoming-reference table (Step M11), and if so, reference weight managing means 118 adds the value of the total reference weight held in the migrated object to the total reference weight of the relay object in the incoming-reference table (Step M13). If, on the other hand, no information of the relay object exists in the incoming-reference table, object migration managing means 1013 reserves a new object region (Step M15), and reference weight managing means 118 then stores a predetermined value (in this case "8" in FIG. 45) in total reference weight (Step M16), and stores an OID and reference pointer (Step M17).

Upon completion of integration of the incoming-reference table information of the migrated object and the relay object, remote access managing means 113 checks the outgoing-reference table of the relay object, produces a reference deletion message to the remote reference destination, and transmits the message (Step M18). remote access managing means 113 then makes the migrated object a local object after storing the migrated object information (Step M19), thereby completing object migration.

When object migration has been completed, remote access managing means 113 of module 1110, which received the migrated object, begins production of a response message to module 1100, which is the transmission origin of the object migration message, reporting completion of migration (Step M20). Remote access managing means 113 stores the predetermined value "8" as the additional reference weight of the migrated object that is stored in this response message (Step M21) and returns the message to module 1100 (Step M22 and FIG. 45).

Figure 46:
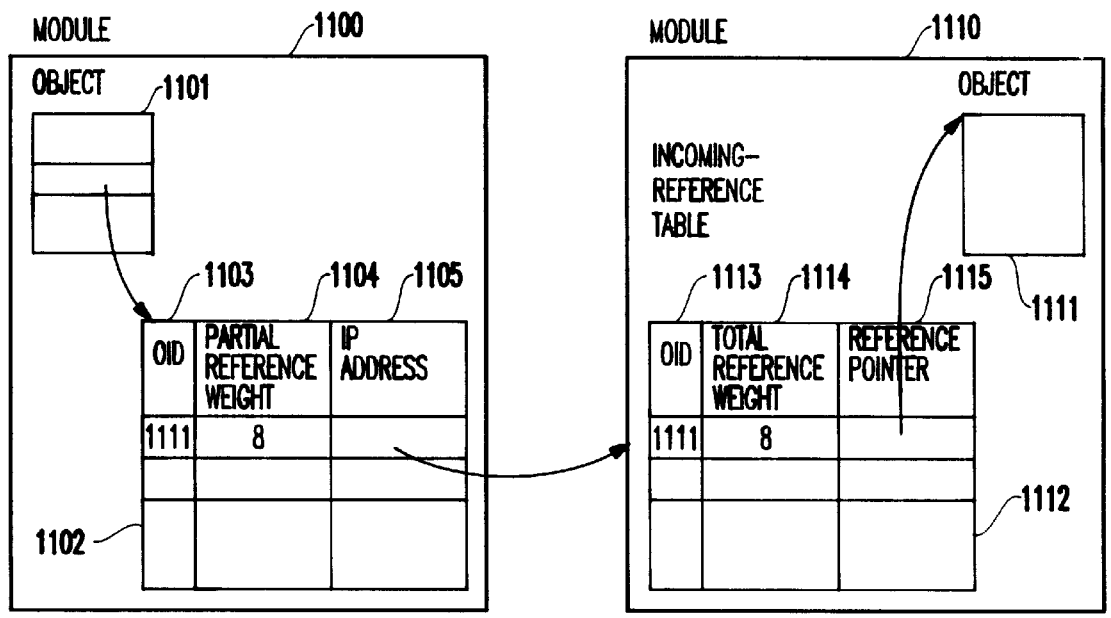
FIG. 46 is for explaining the operation in the second embodiment of the present invention.

In FIG. 46, remote access managing means 113 of module 1100 receives the response message for object migration from module 1110 (FIG. 40 and Step N1 in FIG. 43). Reference weight managing means 118 stores the additional reference weight "8" of migrated object 1111 in the received message as partial reference weight 1104 of relay object 1101, and in addition, stores object 1111 in OID 1103, and the IP address of the computer of module 1110 in the IP address. With the completion of these processes, access from other objects to object 1101 is finally possible (FIG. 46).

In this type of "object migration," the object before migration (object 1101 in the above-described example) continues to hold the object identifier OID in the module in which it originally resided but does not hold the actual content of data originally belonging to the object, instead performing the role of a relay. object having remote reference to the object after migration (object 1111 in the above-described example). When the relay object is accessed for a reference request or method execution request from another object, this request is transferred to the remote reference destination.

The object following migration (object 1111 in the above-described example) takes a module different from the relay object as the execution environment and has a different OID, inherits data that originally belonged to the relay object, and is remote- referenced by the relay object.

Explanation is next presented based on a first concrete example with reference to FIGS. 47–57 regarding the operation of distributed system 1 according to this embodiment.

Explanation is first presented regarding the assumptions in the first concrete example. Object 1210 in module 1200 is migrated successively to module 1201 and module 1202, thereby creating objects 1211 and 1212, respectively. A case is then considered in which object 1213, which originally referenced object 1210 in module 1200, requests reference to object 1210.

Figure 47:
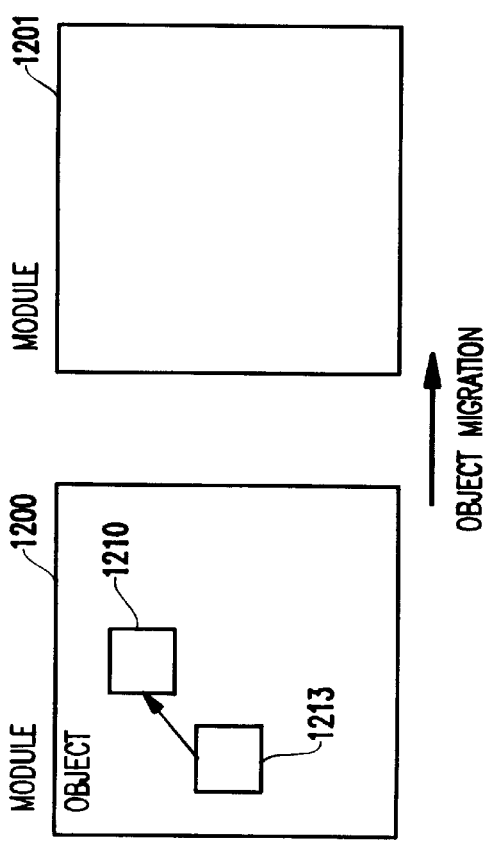
FIG. 47 is for explaining a first concrete example of the operation in the second embodiment of the present invention.
Figure 48:
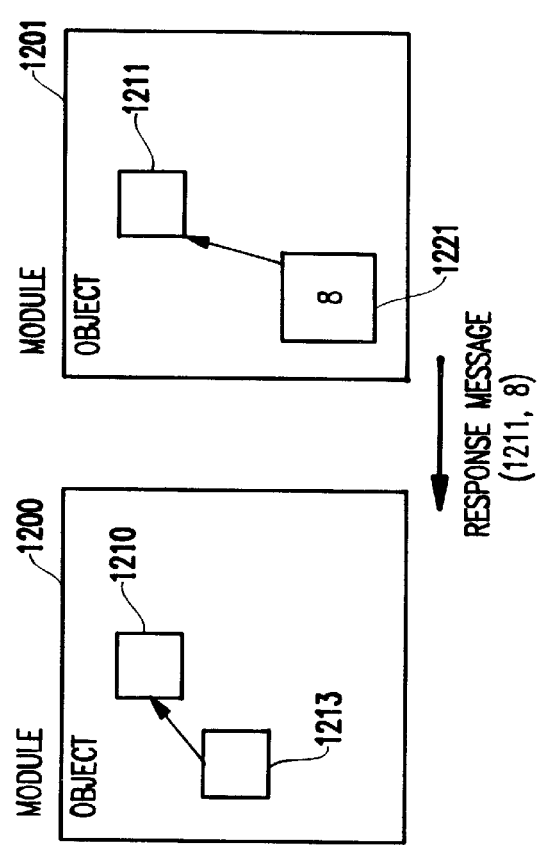
FIG. 48 is for explaining a first concrete example of the operation in the second embodiment of the present invention.

Object 1210 migrates from module 1200 to module 1201 (FIG. 47). Object migration managing means 1013 of module 1201 thus creates object 1211, sets a predetermined value (in this case set to "8") to total reference weight 1221 in the incoming-reference table, and transmits a response message to module 1200 (FIG. 48).

Module 1200 receives the response message from module 1201, remote reference is created from object 1210 to object 1211, and reference weight "8" is stored to partial reference weight 1220. Object 1210 thus becomes the relay object. Object 1211 then migrates from module 1201 to module 1202 (FIG. 49).

As with the above-described procedures, by means of an object migration message from module 1201 to module 1202 and a response message from module 1202 to module 1201, object 1212 is created in module 1202, remote reference is created from object 1211 to object 1212, and object 1211 becomes the relay object (FIG. 50).

It is next assumed that, from the state in FIG. 50, object 1213 requests reference to object 1210 in module 1200. The reference request message is transmitted to module 1201 because object 1210 is the relay object (FIG. 51). (At this time, additional reference weight 1230 is made "0" by reference weight managing means 118.)

Upon receiving the reference request message from module 1200, however, module 1201 transmits the reference request message to module 1202 because object 1211 is again a relay object (FIG. 52). A value "4" obtained by adding the predetermined value (in this case, "4") to the value "0" of additional reference weight 1230 in the received message is transferred as the additional reference weight 1231 in this reference request message.

Upon reception of the reference request message from module 1201, module 1202 adds the received additional reference weight "4" to the total reference weight 1225 of object 1212 since object 1212 is local, thereby obtaining "12". Module 1202 then stores the return value for the reference request, the information of object 1212, and moreover, the additional reference weight "4" in the response message, and replies to module 1201 (FIG. 53).

Module 1201 receives the response message from module 1202, detects that the reference destination of object 1211 has not been updated, and does not update partial reference weight 1222 of its own outgoing-reference table. Module 1201 then stores the return value of the response message, the received information of object 1212, and the additional reference weight without alteration, and replies to module 1200 (FIG. 54).

Module 1200 receives the response message from module 1201. Object 1210 verifies that object 1211 of the reference destination differs from the reference destination information of the received message, updates the reference destination, and stores the received additional reference weight in a new partial reference weight 1220. Object 1210 can thus update the reference destination from object 1211 to object 1212. Module 1200 then transmits to module 1201 a reference deletion request message to original remote reference destination object 1211 (FIG. 55).

Upon receiving the reference deletion request message from module 1200, module 1201 subtracts the received additional reference weight from total reference weight 1221 of object 1211 to update total reference weight 1221 to "0." If object 1211 is not referenced from another object within the heap memory in this case, the heap memory managing means inside module 1201 subsequently determines that object 1211 is a garbage object, whereupon reference to object 1212, which is the reference destination of object 1211, is removed, and a reference deletion message to object 1212 is transmitted to module 1202 (FIG. 56).

Upon receiving the reference deletion request message, module 1202 subtracts the value of the received additional reference weight from total reference weight 1225 of object 1212 to obtain "4" (FIG. 57).

As described above, despite the migration of object 1210, remote reference is extended to objects 1211 and 1212 of the migration destination and managed through the use of reference weight.

Object 1213, which originally referenced object 1210, can successively track the migration destination despite migration of object 1210 between modules and thus execute requests without conflicts.

Relay object 1211 established by the migration of an object can be reclaimed when it becomes unnecessary.

Explanation is next presented based on a second concrete example with reference to FIGS. 58–64 regarding the operation in distributed system 1 according to this embodiment.

In this example as well, it is assumed that the conditions are the same as in the first concrete example.

Object 1311 of module 1301 is remote-referenced by object 1310 residing in module 1300 (FIG. 58).

In this case, object 1311 migrates to module 1302, and object 1311 becomes a relay object that remote-references object 1312 of module 1302 (FIG. 59).

A case is considered in which object 1312 then migrates to module 1301. The object migration managing means verifies that relay object 1311 of object 1312 that has migrated to module 1301 resides in module 1301 and integrates the two objects (FIG. 60).

A predetermined reference weight value (in this case, "8") is first added to total reference weight 1321 to obtain "16." This total reference weight 1321 manages the remote reference from object 1310 and relay object 1312. A reference deletion request message including the value "8" of partial reference weight 1322 is then transmitted to reference destination object 1312 of object 1311. Object 1311 is then converted to a local object (FIG. 61).

In this case, object 1311 is no longer a relay object, migrated object 1312 is integrated with object 1311, and object 1312 within module 1302 becomes the relay object to object 1311.

Upon receiving the reference deletion message, relay object 1312 subtracts "8" from total reference weight 1323 to obtain "0." With a total reference weight of "0," relay object 1312 becomes unnecessary in module 1302 as well, and is reclaimed by heap memory managing means 115 (FIG. 62). Remote access managing means 113 within module 1302 then transmits to module 1301, which is the reference destination, a reference deletion message in which partial reference weight 1324 is stored for object 1311 (FIG. 63).

Upon receiving the reference deletion message from module 1302, module 1301 subtracts "8" from total reference weight 1321 (FIG. 64). By such cooperation between modules, the memory region of relay object 1312 is reclaimed and the same state as FIG. 58 is realized.

Explanation is next presented regarding the effect of this embodiment.

In the present embodiment, although an object migrates and changes its execution environment, a relay object maintains reference to the object at its migration destination, thereby enabling management of objects without conflicts through the use of reference weight by the same method as in the first embodiment. This method also functions effectively in a distributed system that permits migration of objects.

When an object migrates, the actual content of the object is transferred to the module of the migration destination and leaves only a relay object behind, thereby allowing data regions that were referenced by the object within the original module to be reclaimed and allowing effective use of memory regions.

The memory region of a relay object that maintains reference to the object in the migration destination can also be reclaimed through management of reference weight if the relay object becomes unnecessary, thereby allowing effective use of memory resources.

Because this embodiment can be realized by the same type of device as for the first embodiment, this embodiment maintains the same effects as the first. embodiment and installation of this embodiment does not require extra changes.

Third Embodiment

Although the structure of the distributed system in this embodiment is essentially equivalent to that of the first embodiment shown in FIG. 9, the composition of each computer making up the distributed system is different from that of the first embodiment.

Figure 65:
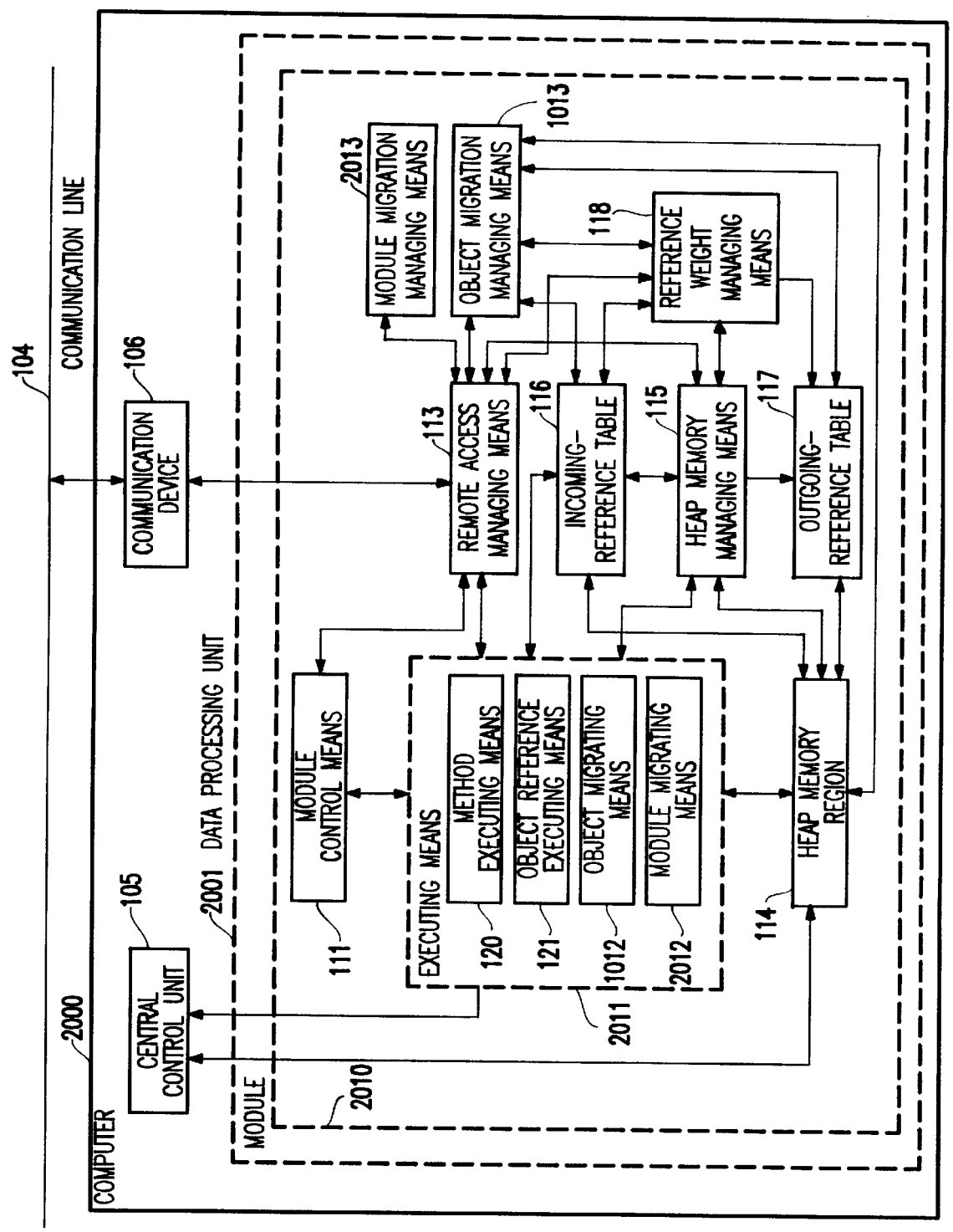
FIG. 65 is a function block diagram showing the functional composition of a computer according to the third embodiment of the present invention.

FIG. 65 is a function block diagram showing the functional composition of computer 2000 according to this embodiment.

As shown in FIG. 65, in computer 2000 according to this embodiment, executing means 2011 of module 2010 is further provided with module migrating means 2012 in addition to the components of the second embodiment shown in FIG. 39. In addition, module 2010 is further provided with module migration managing means 2013 in addition to the components of the second embodiment.

"Module migration" in the following explanation refers to the technique of storing a module in a communication message and transmitting it to a different execution environment. In contrast to object migration in the above-described second embodiment in which only a single object migrates, module migration involves the ability to change the execution environment and migrate all information, such as management information including all object information, outgoing-reference tables, and incoming-reference tables residing within a module and information necessary for module execution such as executing means and remote access managing means, and to resume execution in the environment after module migration.

Module migrating means 2012 is a means for receiving a command from module control means 111 and migrating a module, at which time, module migrating means 2012 instructs heap memory managing means 115 to reclaim unnecessary memory regions, and for then instructing remote access managing means 113 to store in a communication message the entire set of information necessary for the module's continued execution.

Module migration managing means 2013 receives commands from remote access managing means 113 and is active immediately before and immediately after a module migrates. Immediately before module migration, module migration managing means 2013 communicates to remote access managing means 113 only that information that is necessary for the module's continued execution, i.e., module executing means, managing means, incoming-reference tables, outgoing-reference tables, and objects in the memory region within a module. Immediately after module migration, module migration managing means 2013 arranges information without conflicts that is in the module migration message that is read in by remote access managing means 113 in data processing unit 2001 such that the module can resume execution.

In a case in which an object that is remote-referenced from another module resides in a migrated module, the module of migration origin becomes a module that remains inside the data processing unit in which the module resided, i.e., a relay module. A relay module has at least one relay object that holds remote reference to a migrated object that resides in a migration destination module, the relay module itself being reclaimed when no relay object remains. A relay module receives a reference request or method request message to a relay object from another module, and performs the role of transferring the message to the reference destination of the relay object but does not itself execute a method.

In module migration, object migration is accompanied by information of the different means and management information for module execution, and the object migration that accompanies module migration in this embodiment differs from object migration in the second embodiment in that objects are not limited to those having actual content but include relay objects as well.

Detailed explanation is next presented regarding the operation of this embodiment with reference to FIGS. 66–72.

Figure 66:
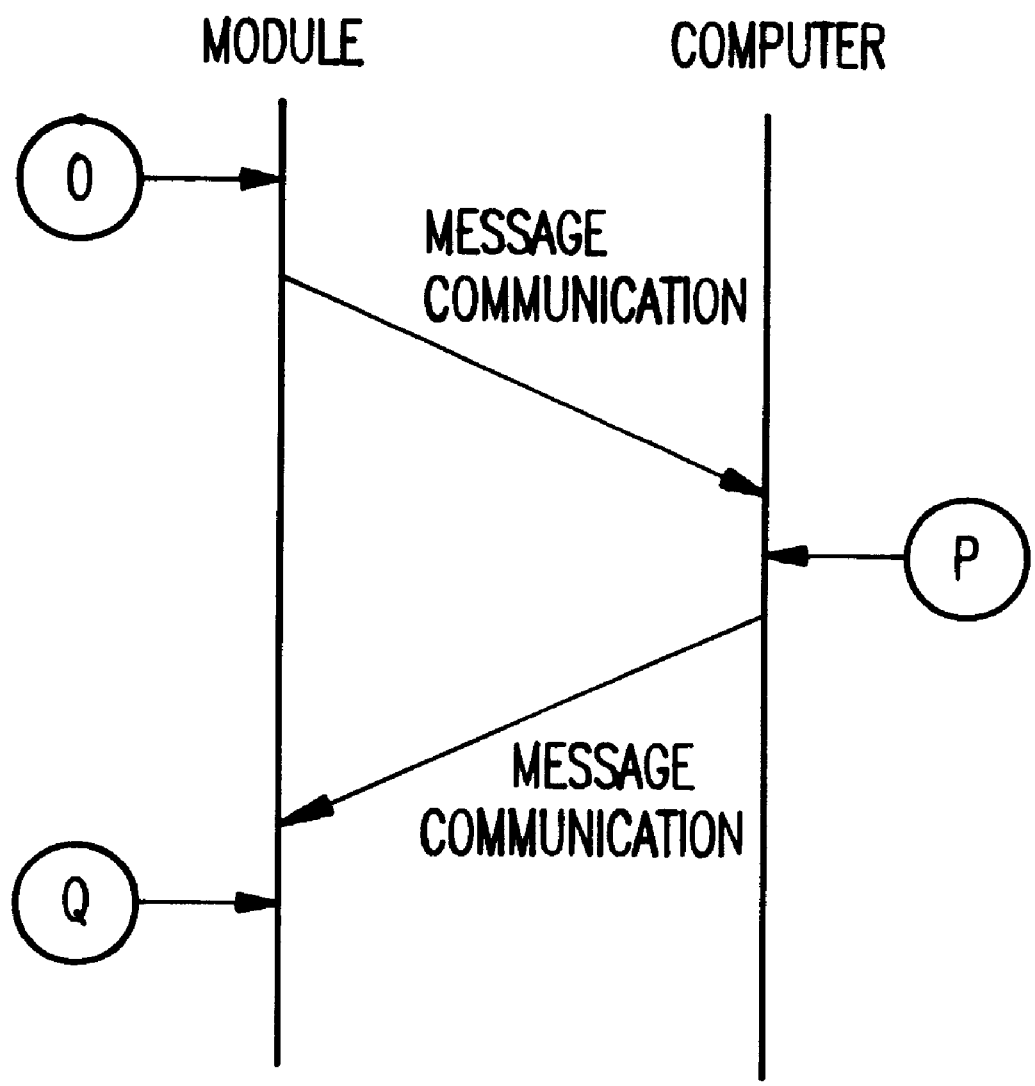
FIG. 66 is a sequence chart showing the operation in the third embodiment of the present invention.

FIG. 66 shows the series of procedures during module migration.

FIG. 67 shows the procedures when creating a module migration message. When a module is instructed to migrate to a different computer environment, module migrating means 2012 first prohibits access from another means to all data regions in the module, instructs heap memory managing means 115 to reclaim unnecessary objects in heap memory region 114, and requests remote access managing means 113 to store information necessary for module execution in a message.

In FIG. 67, remote access managing means 113, together with object migration managing means 1013, stores information relating to each object in the module that is necessary for continued module execution (FIG. 66 and Step O1 of FIG. 67).

Remote access managing means 113 first checks whether or not the object is remote (Step O2). If the object is local (Step O3), processing migrates to Step O6, and if remote (Step O4), remote access managing means 113 stores the value the partial reference weight of the object as the additional reference weight of the object (Step O5).

Object migration managing means 1013 next checks the incoming-reference table, and checks whether or not the object is being referenced from another module (Step O6). If the object is registered in the incoming-reference table (Step O7), makes the object a remote object, i.e., a relay object, so as to enable an object that already remote-references the object from another module to continue to access the object that carries actual content (Step O8). If, on the other hand, the object in Step O6 is not registered in the incoming-reference table (Step O9), there is no need to create a relay object, and processing therefore migrates to Step O10.

Object migration managing means 1013 checks whether or not the processes from Step O1 to Step O9 have been completed for all objects within a migrated module (Step O10), and if not completed (Step O11), repeats the operations. If, on the other hand, the processes have been completed for all objects (Step O12), module migration managing means 2013 notifies remote access managing means 113 of all information that is necessary for continued module execution other than objects of the module (executing means, managing means, incoming-reference table, outgoing-reference table), and after receiving this information, remote access managing means 113 stores the set of information in a communication message (Step O13) and transmits the message to the migration destination computer (Step O14).

Figure 68A:
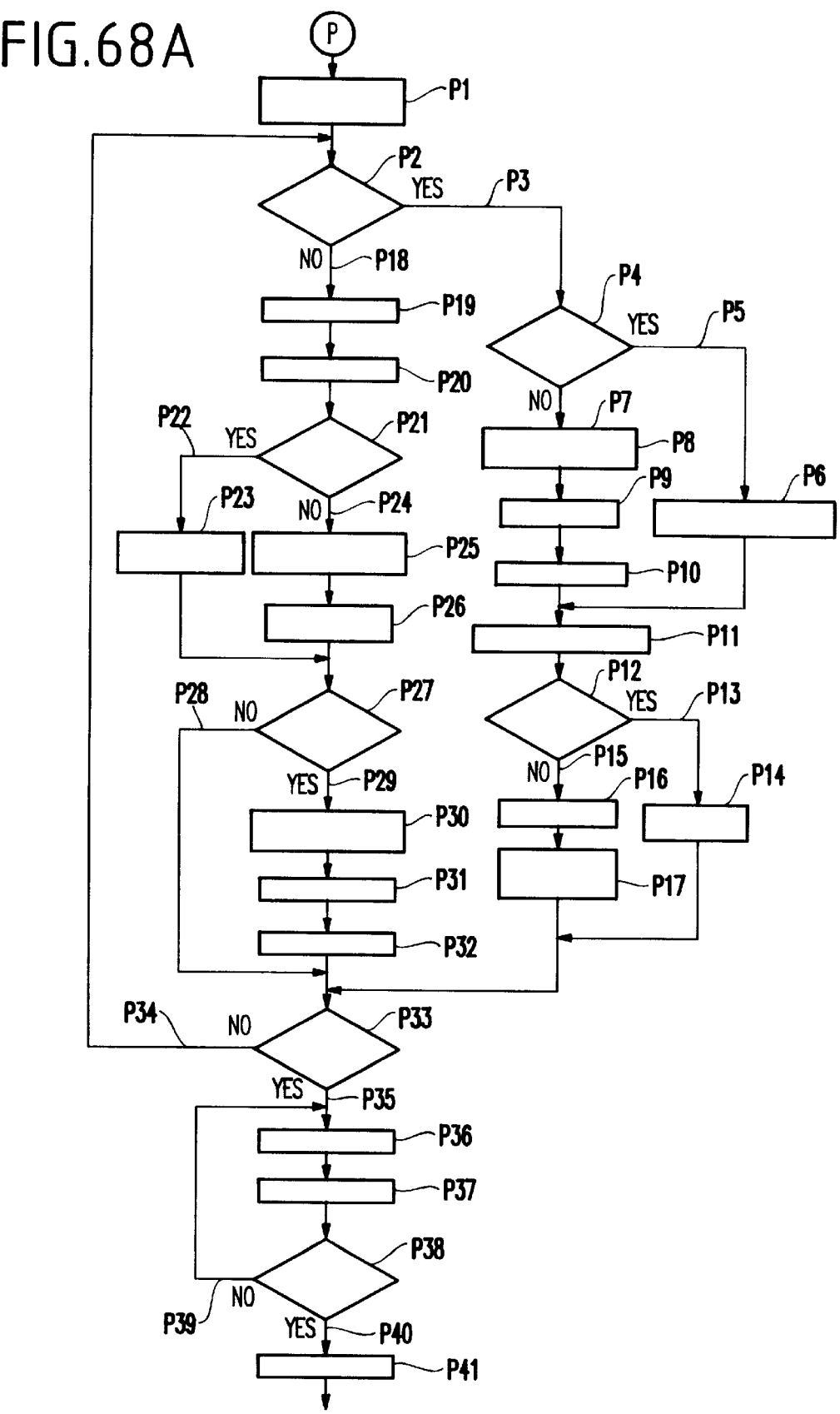
FIG. 68 is a flow chart showing the operation in Step P of FIG. 66.

FIG. 68 shows the procedures executed upon receiving the module migration message. Communication device 106 of computer 2000 receives the module migration message, and if there is no relay module corresponding to the migrated module, reserves regions of the migrated module in data processing unit 2001 and activates remote access managing means 113 of the migrated module. Remote access managing means 113 activates module migration managing means 2013, reserves regions of information of the migrated module other than objects (executing means, managing means, incoming-reference table, outgoing-reference table), and arranges the information without conflicts such that the module can continue execution (Step P1 in FIG. 68).

Object migration managing means 1013 integrates migrated objects with relay objects residing in data processing unit 2001 in which it resides that correspond with the migrated objects. For this purpose, object migration managing means 1013 first checks whether or not relay modules exist that correspond to the migrated module, and moreover, whether relay objects exist that correspond to migrated objects (Step P2). If a relay module exists, and if a relay object also exists in these regions (Step P3), object migration managing means 1013 begins integrating the regions of the migrated object and the relay object from Step P4.

In Step P4, object migration managing means 1013 uses the incoming-reference table to check whether or not each relay object within the module is being remote-referenced from another module. If the relay object is registered in the incoming-reference table (Step P5), object migration managing means 1013 updates by adding the value of the total reference weight relating to the migrated object to the total reference weight of the relay object (Step P6). If, on the other hand, there is no information of the relay object in the incoming-reference table (Step P7), object migration managing means 1013 reserves a region for the migrated object in the incoming-reference table (Step P8). Object migration managing means 1013 further stores a predetermined value in the total reference weight (Step P9), stores a reference pointer and OID, and makes settings to allow remote reference from another module (Step P10). Remote access managing means 113 next produces and transmits a reference deletion message for the remote reference destination having relay objects that have become unnecessary (Step P11). In this way, unnecessary relay objects can be successively reclaimed.

Object migration managing means 1013 checks whether or not the migrated object is local (Step P12), and if the migrated object is local (Step P13), changes integrated relay objects from remote to local (Step P14). If the migrated object is not local (Step P15), object migration managing means 1013 updates the outgoing-reference table of the relay object, and makes the reference destination the reference destination of the migrated object (Step P16). In addition, object migration managing means 1013 stores the partial reference weight held by the migrated object as the partial reference weight in the incoming-reference table (Step P17). The integration of the relay objects and the migrated objects is completed by the processes from Step P4, and processing migrates to Step P33.

In Step P2, if there is no a relay module or relay object (Step P18), object migration managing means 1013 newly reserves regions for migrated objects in the module in which it resides (Step P19), and assigns OID (Step P20). Object migration managing means 1013 next checks whether or not a migrated object is a local object within the migrated module (Step P21), and if the migrated object is local (Step P22), stores the data of the migrated object in the newly assigned object regions (Step P23). If, on the other hand, the migrated object is remote (Step P24), object migration managing means 1013 reserves a region for the migrated object in the outgoing-reference table region within the module for setting the reference destination information of the remote object (Step P25), and stores without change OID, IP address, and partial reference weight, which are the reference destination information of a migrated object in a migration message (Step P26).

Object migration managing means 1013 next checks whether or not a migrated object is being remote-referenced from another module (Step P27), and if no object is being remote-referenced (Step P28), migrates the process to Step 33. If a migrated object being remote-referenced (Step P29), object migration managing means 1013 reserves a region for the migrated object in the incoming-reference table in the module (Step P30) and stores a predetermined value as the total reference weight (Step P31). In addition, object migration managing means 1013 makes settings to enable access from another module by storing OID and a reference pointer to the object region in the regions in the incoming-reference table for the migrated object (Step P32).

Object migration managing means 1013 checks whether or not the above-described operations have been completed for all objects within the migrated module (Step P33), and if not completed, continues repeating the processes (Step P34).

If the operations have been completed (Step P35), remote access managing means 113 begins producing a response message (Step P36). Information for objects that are remote-referenced from another module is stored in a response message for module migration. Remote access managing means 113 stores a predetermined value in the response message as the additional reference weight of such objects (Step P37). Remote access managing means 113 checks whether or not storage of additional reference weight has been completed for all objects (Step P38), and repeats the process if not completed (Step P39). When processing has been completed for all objects (Step P40), remote access managing means 113 transmits the response message (Step P41).

Figure 69:
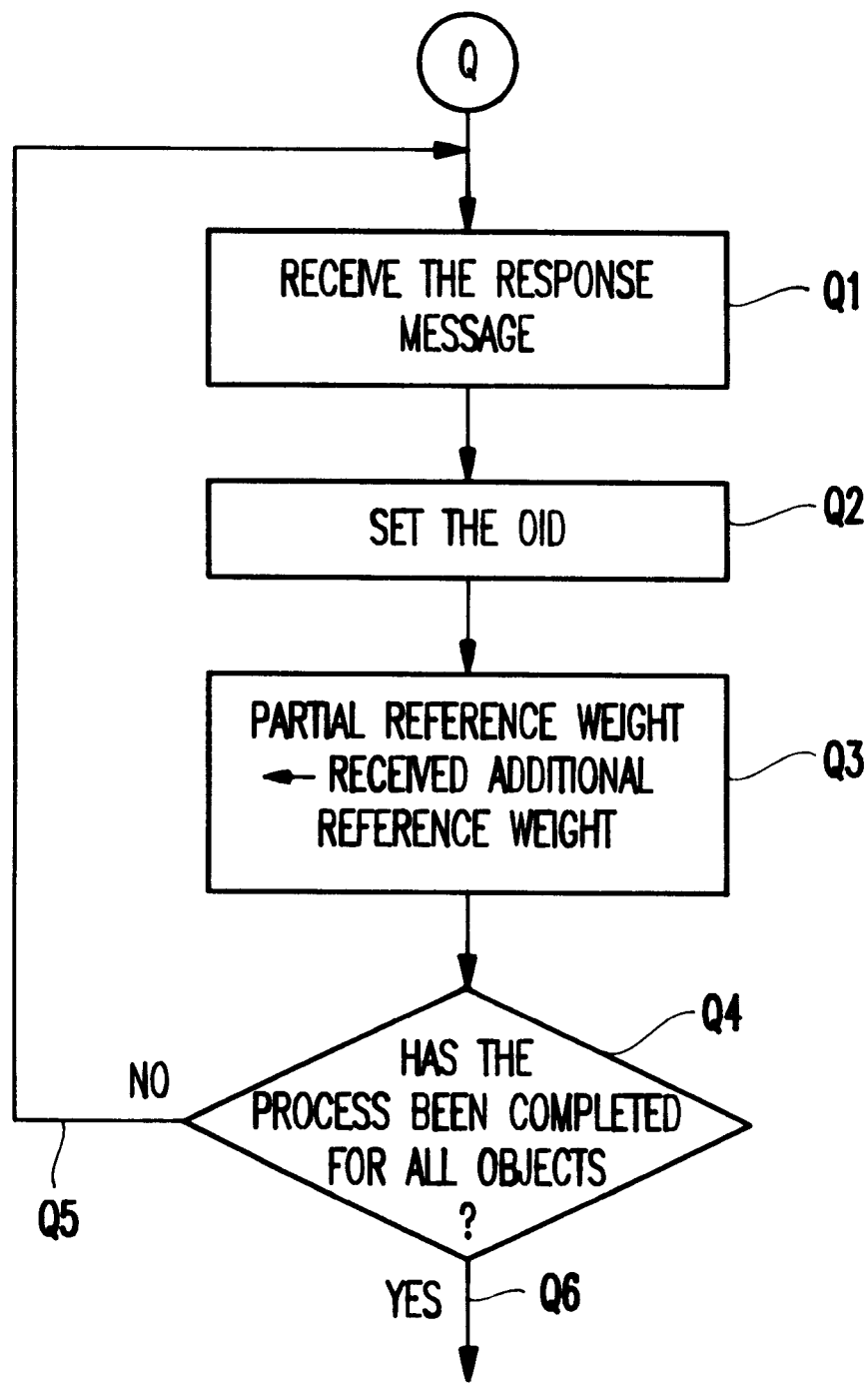
FIG. 69 is a flow chart showing the operation in Step Q of FIG. 66.

FIG. 69 shows the procedures executed upon reception of a response message relating to module migration. Remote access managing means 113 of the module receives and reads the response message (Step Q1). Remote access managing means 113 sets the OID of each item of object information in the received message in regions corresponding to each object in the outgoing-reference table of the module in which remote access managing means 113 resides (Step Q2), and stores the additional reference weight of the objects in partial reference weight (Step Q3). Remote access managing means 113 then checks whether or not the process has been completed for all objects stored in the received message (Step Q4), and if not completed (Step Q5), repeats the process. If the process has been completed (Step Q6), remote access managing means 113 permits access to each object and completes the reception process of the response message.

The operation in distributed system 1 according to this embodiment is next explained regarding a concrete example with reference to FIGS. 70–86.

Figure 70:
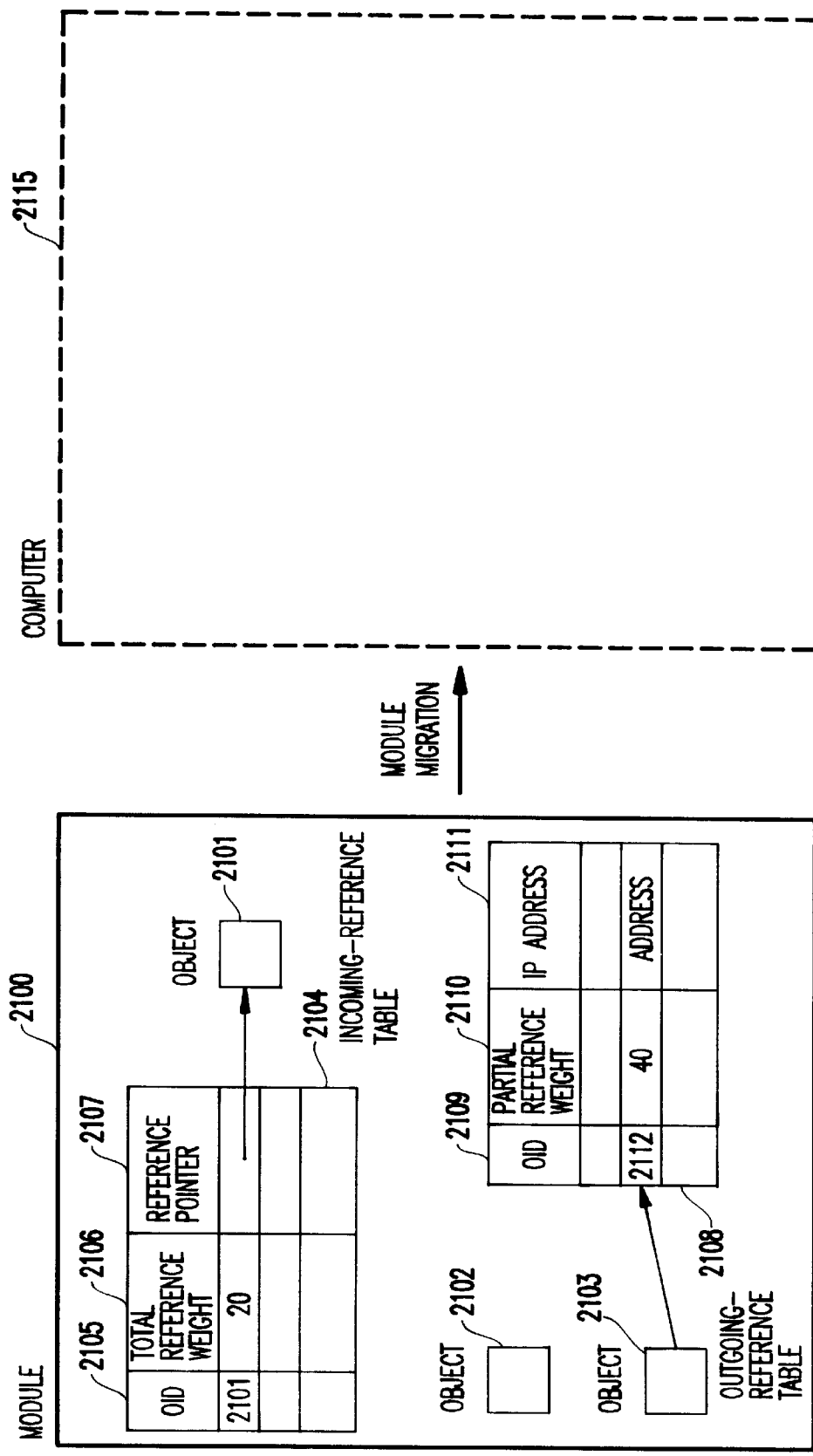
FIG. 70 is for explaining the operation according to the third embodiment of the present invention.
Figure 71:
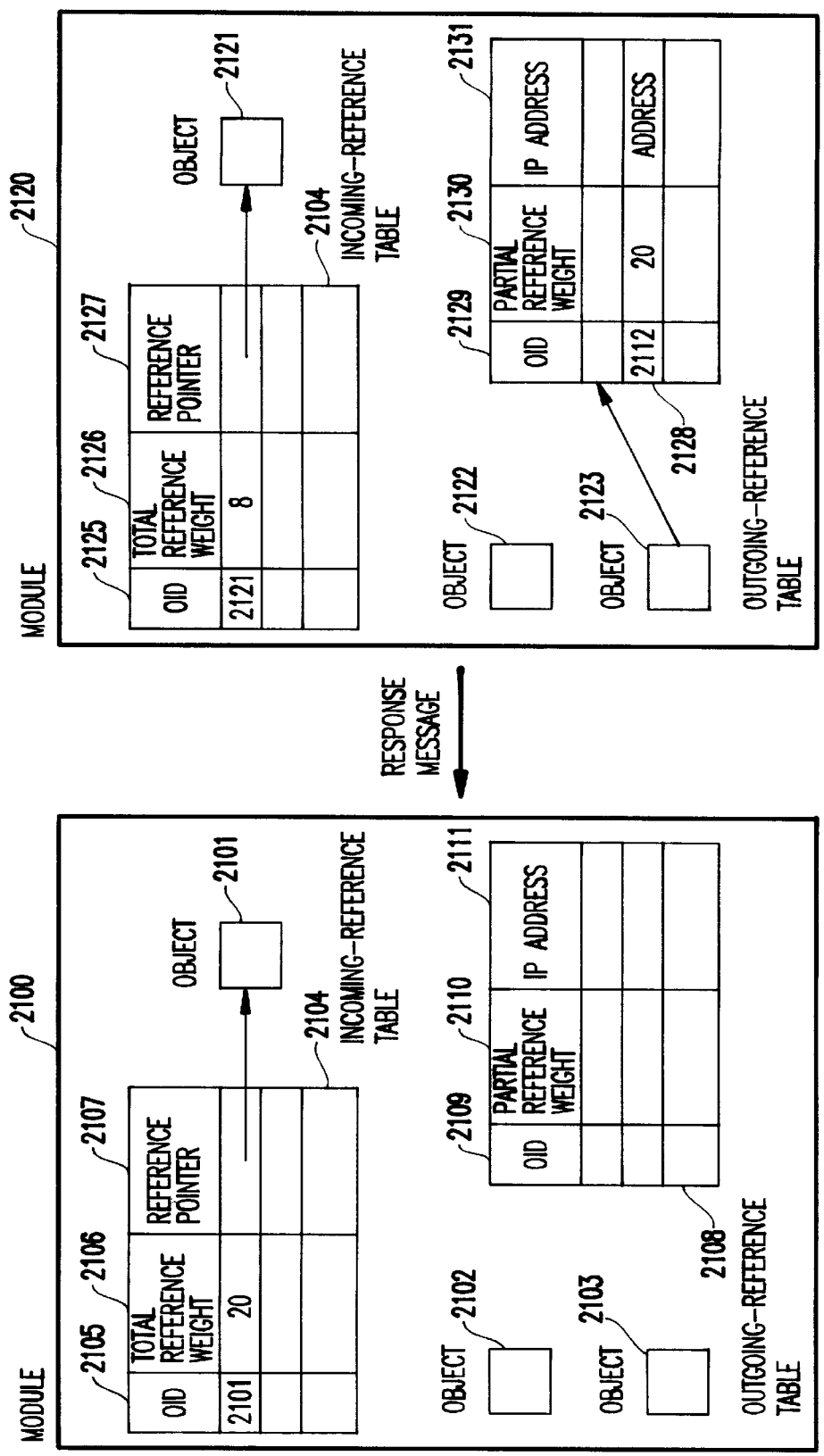
FIG. 71 is for explaining the operation according to the third embodiment of the present invention.
Figure 72:
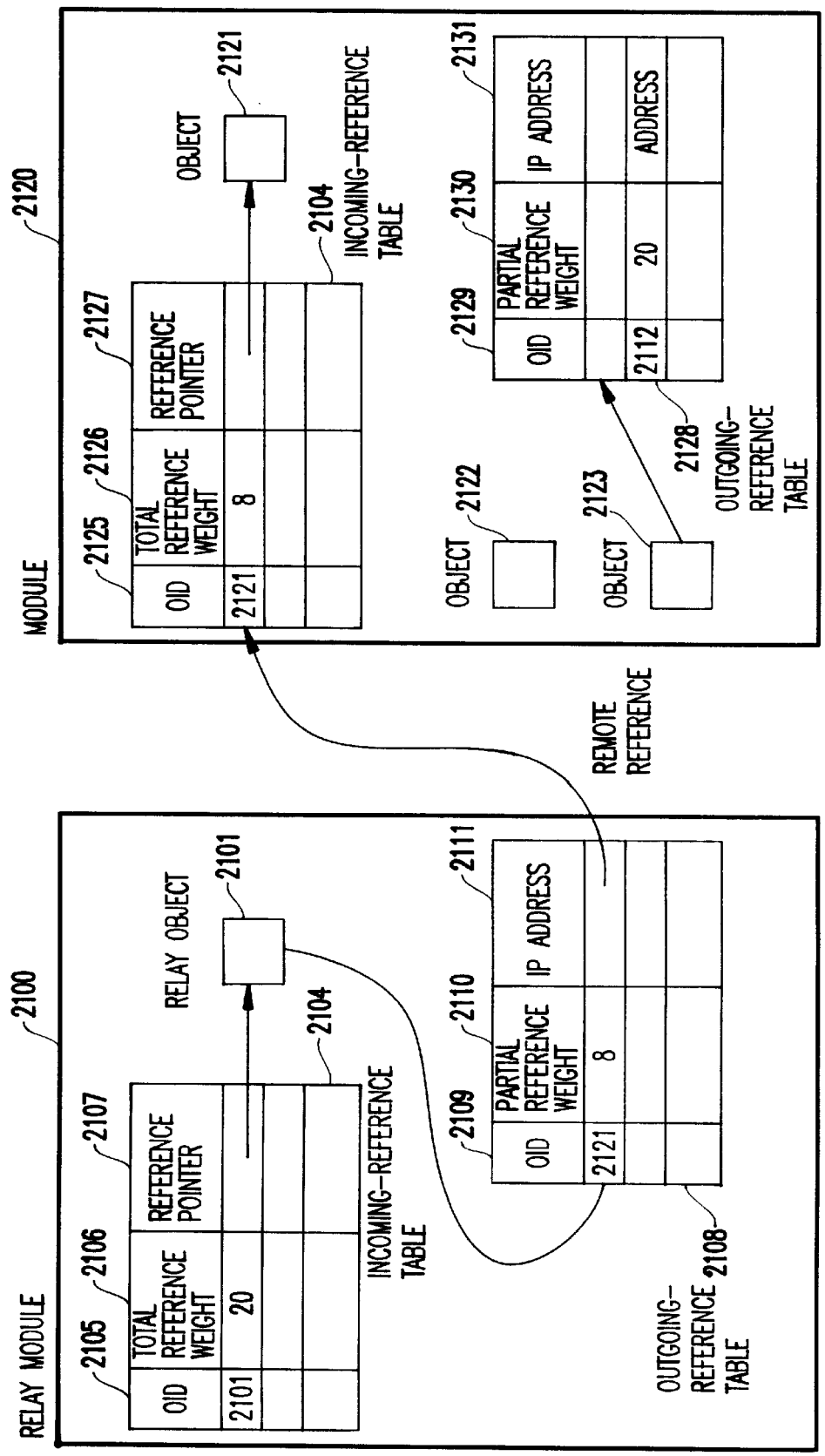
FIG. 72 is for explaining the operation according to the third embodiment of the present invention.

FIGS. 70–72 show an example of the operations for module migration. FIG. 70 shows the state immediately preceding migration of module 2100 to computer 2115. Inside module 2100 are the executing means, managing means, incoming-reference table 2104, and outgoing-reference table 2108 necessary for module execution, as well as three objects 2101, 2102, 2103 residing in heap memory region 114.

Object 2101 is remote-referenced from another module, and various types of information are stored in incoming-reference table 2104, i.e., "object 2101" in OID 2105, "20" in total reference weight 2106, and the memory address of object 2101 in reference pointer 2107.

Object 2102 is a local object but is not remote-referenced from other modules.

Object 2103 is a remote object, and outgoing-reference table 2108 holds reference destination information for object 2103. Specifically, reference table 2108 holds object 2112 as OID 2109, "40" as partial reference weight 2110, and "address" (indicating the IP address of a computer other than module 2100) as IP address 2111 (FIG. 70). From this state, the module migration managing means, object migration managing means, and remote access managing means of module 2100 create a module migration message in which is stored the information within the module that is necessary for continued module execution, and this message is transmitted to computer 2115 in which relay objects of module 2100 do not exist. At this point, a partial reference weight of "40" is stored in the additional reference weight relating to object 2103.

FIG. 71 shows the state in which module 2100 migrates to computer 2115, module 2120 is newly created within the data processing unit of computer 2115, and a response message is returned to module 2100.

The module migration managing means of the migrated module is called by the communication device of computer 2115, and the module migration managing means reserves regions for newly created module 2120. The module migration managing means also arranges within module 2120 the incoming-reference table, outgoing-reference table, managing means, and executing means that are necessary for resumption of module execution. In addition, the object migration managing means reserves and stores each object region within the module.

Following module migration, object 2101 becomes object 2121 within module 2120, and to enable remote reference from relay object 2101, object 2121 is stored as OID 2125, a predetermined value (in this case "8") is stored as total reference weight 2126, and the memory address of object 2121 is stored as reference pointer 2127 in the regions for object 2121 in incoming-reference table 2124.

Following module migration, object 2102 becomes local object 2122 within module 2120. Following module migration, object 2103 becomes remote object 2123 within module 2120.

In the response message, the predetermined value "8" of the total reference weight is stored as the additional reference weight of object 2121 together with the information of object 2121, and the message is transmitted to module 2100.

FIG. 72 shows the state in which module 2100 receives the response message for module migration from module 2120 and module migration is completed. Regions are reserved for object 2101 in outgoing-reference table 2108, and object 2121 is stored as OID 2109, the additional reference weight "8" of object 2121 in the received message is stored as partial reference weight 2110, and the IP address of module 2120 is stored as IP address 2111. In addition, object 2101 newly stores the reference pointer in the outgoing-reference table 2108, and becomes the relay object having remote reference to object 2121. Objects 2102 and 2103 are reclaimed by the heap memory managing means of module 2100 after completion of migration. Module 2100 becomes the relay module that owns relay object 2101, and if relay object 2101 is reclaimed, memory region in module 2100 is also reclaimed.

Operations including module migration in distributed system 1 according to this embodiment are next explained based on a concrete example with reference to FIGS. 73–86.

FIG. 73 shows migration to another computer environment by module 2500, which owns object 2510 that receives remote reference from another module and that holds "10" as its total reference weight 2524.

Following migration, module 2500 becomes relay module 2500, and becomes module 2501 in the computer environment of the migration destination.

If it is assumed that the predetermined value of total reference weight in this case is "8," object 2510 becomes a relay object and stores "8" in partial reference weight 2520, while object 2511 stores "8" in total reference weight 2521 (FIG. 74).

Figure 75:
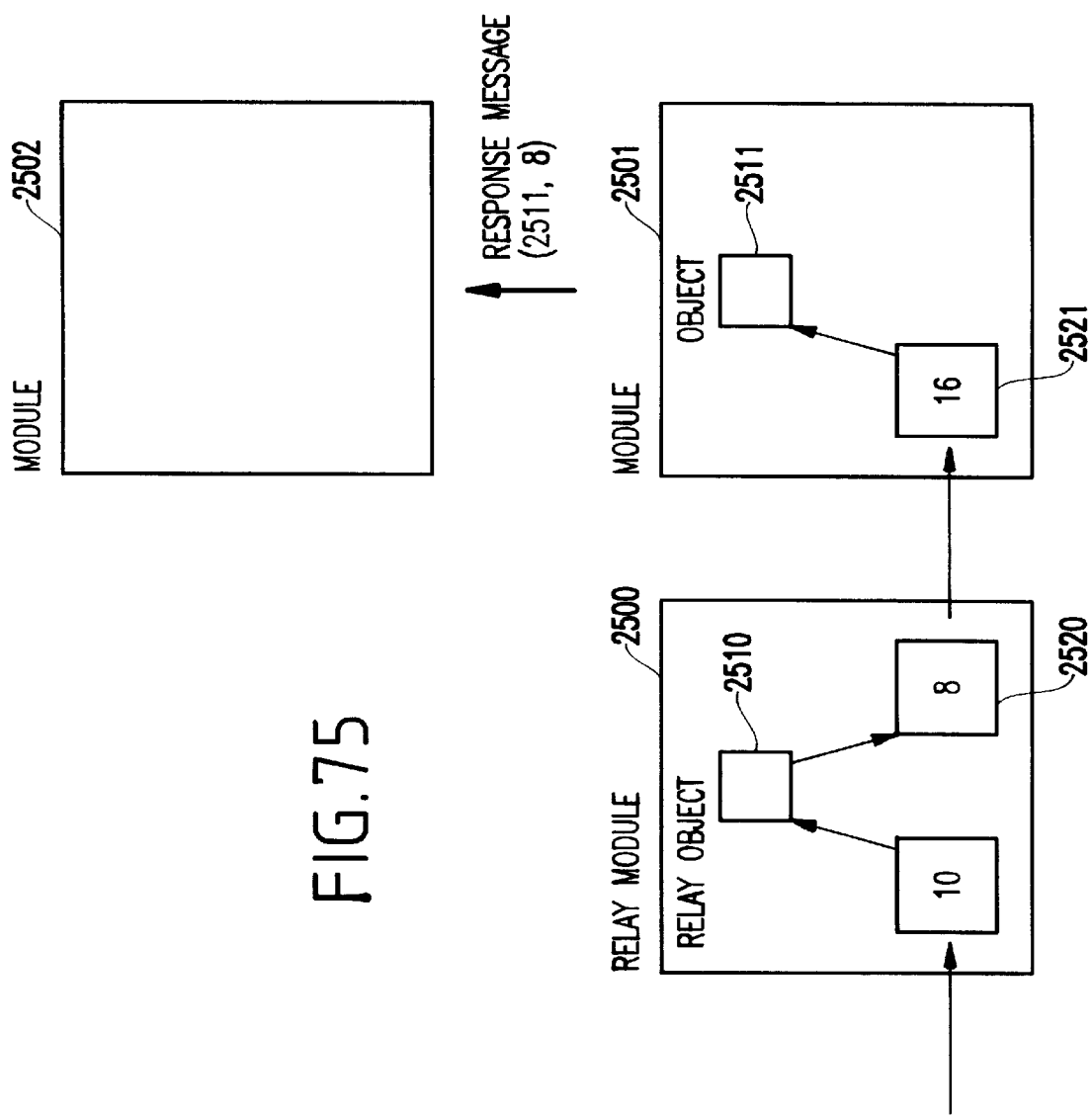
FIG. 75 is for explaining a concrete example of the operation in the third embodiment of the present invention.

If module 2501 subsequently returns information of object 2511 as the return value of a reference request message from another module 2502, it stores "8" in the additional reference weight of the information for object 2511 in the response message, and transmits the response to module 2502 (FIG. 75).

Figure 76:
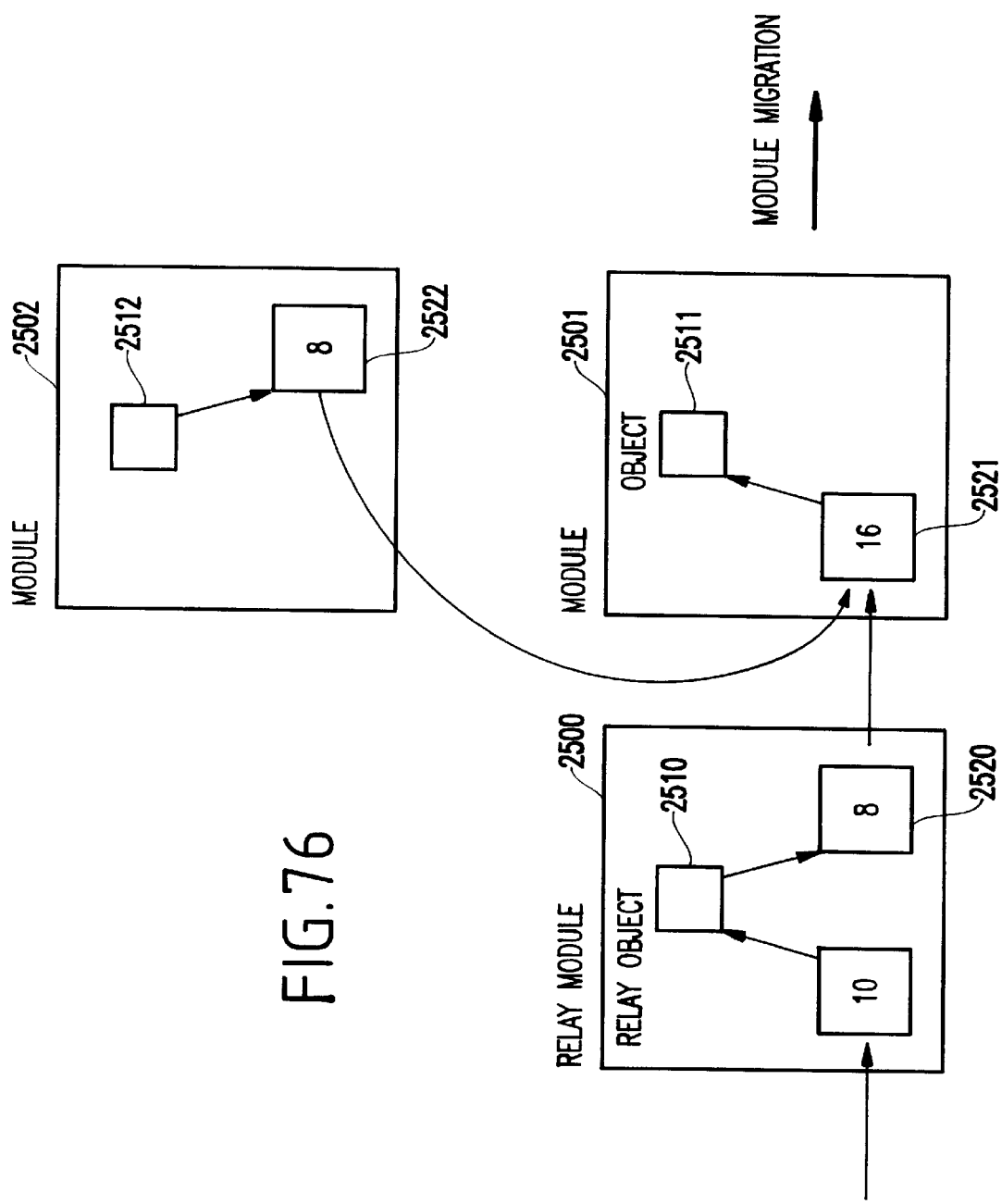
FIG. 76 is for explaining a concrete example of the operation in the third embodiment of the present invention.

Upon receiving the response message, module 2502 stores the received additional reference weight "8" in its own partial reference weight 2522. Object 2511 receives remote reference from both object 2510 and object 2512, and holds "16" in total reference weight 2521. At this point, module 2501 migrates (FIG. 76).

Figure 77:
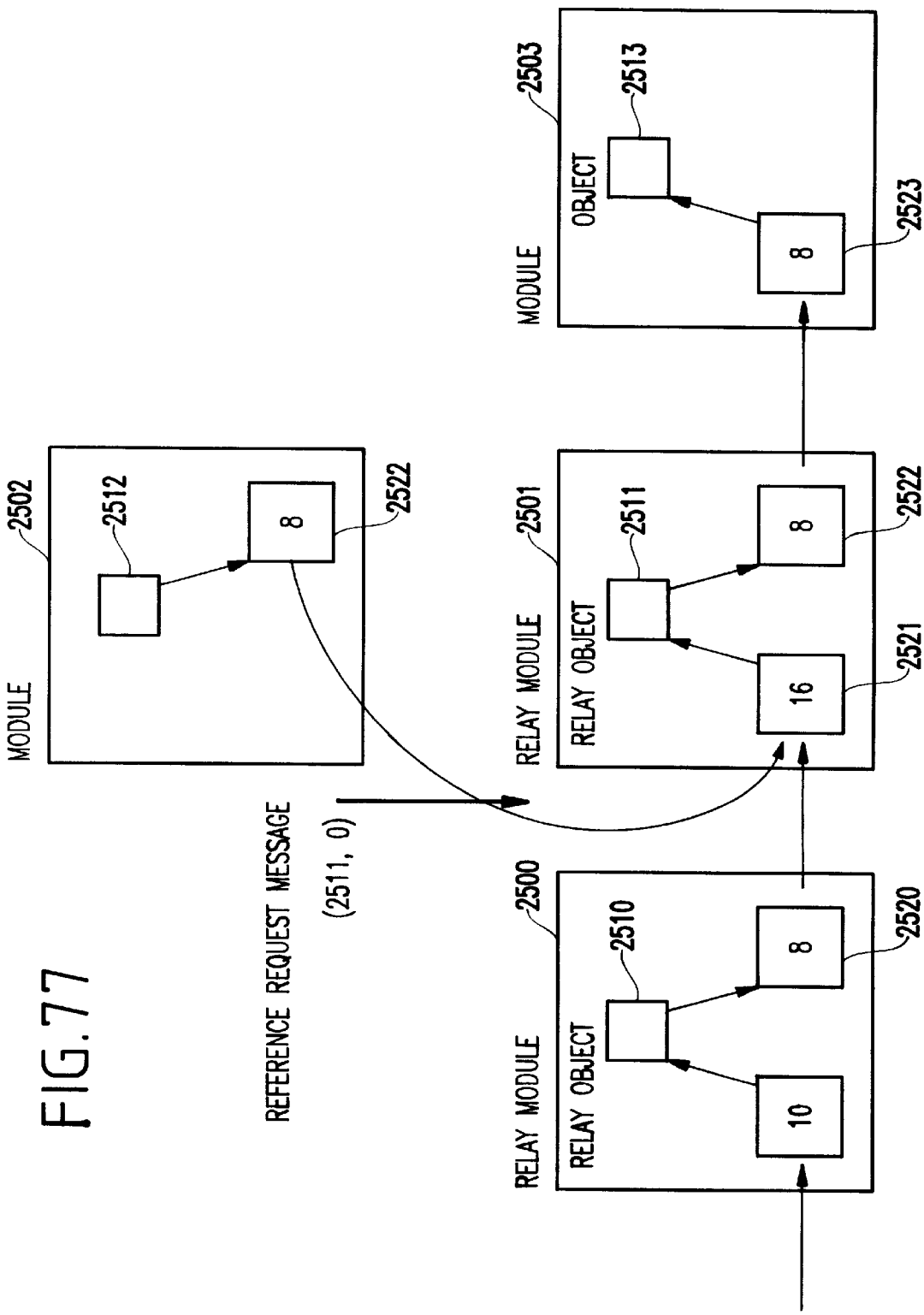
FIG. 77 is for explaining a concrete example of the operation in the third embodiment of the present invention.

After migration, module 2501 becomes a relay module, and its actual content becomes module 2503. Object 2511 becomes a relay object that remote-references object 2513 in module 2503 and holds "8" as partial reference weight 2522. Object 2513 is remote-referenced from object 2511 and holds "8" as total reference weight 2523. At this point, a case is considered in which object 2512 of module 2502 transmits a reference request message to reference destination object 2511. Reference weight managing means sets additional reference weight to "0" (FIG. 77).

Figure 78:
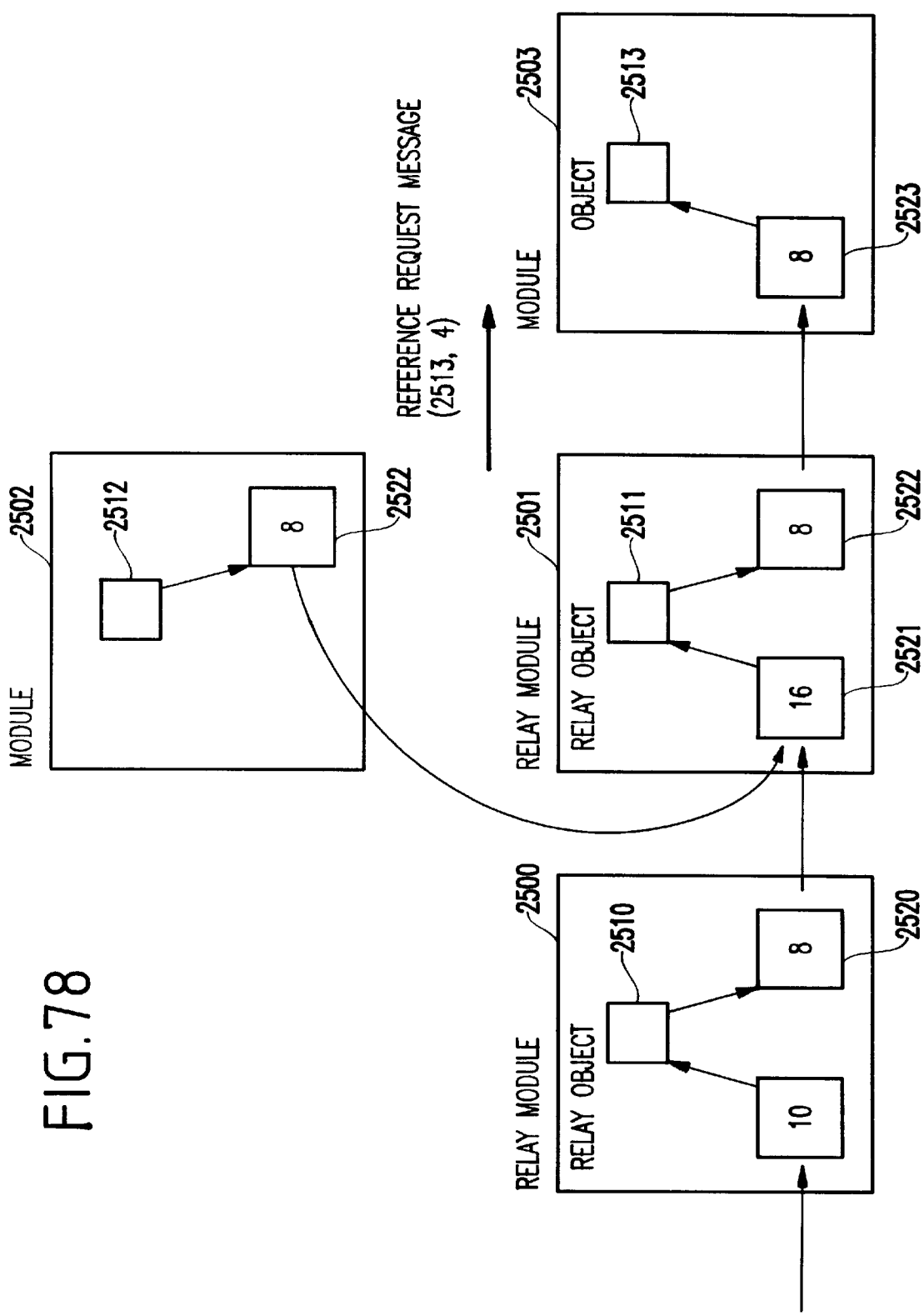
FIG. 78 is for explaining a concrete example of the operation in the third embodiment of the present invention.

Module 2501 is a relay module and therefore transfers the reference request message that it receives from module 2502 on to reference destination module 2503 of relay object 2511. It is here assumed that the reference weight managing means adds exactly "4" to the additional reference weight (FIG. 78).

Figure 79:
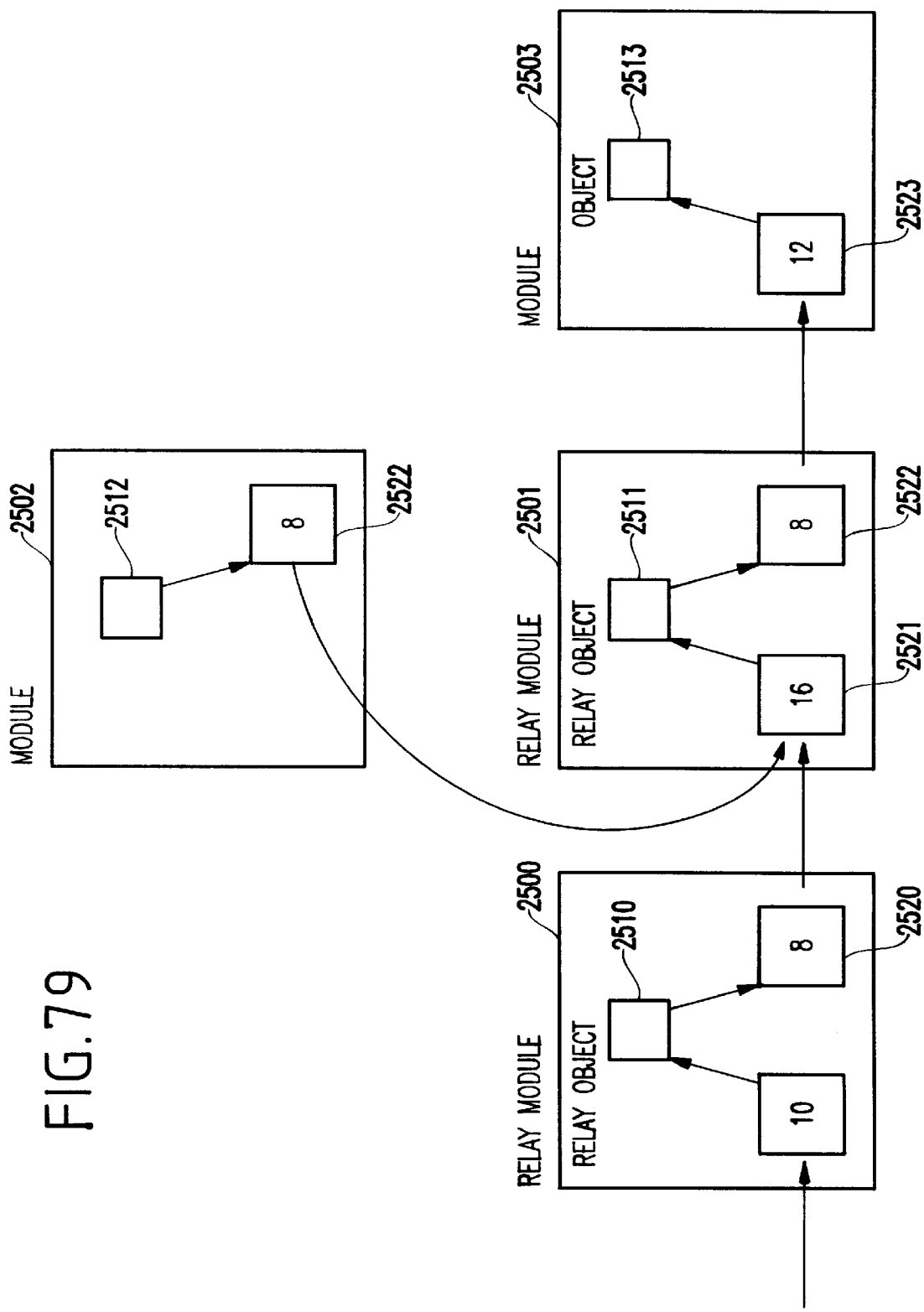
FIG. 79 is for explaining a concrete example of the operation in the third embodiment of the present invention.

Upon receiving the reference request message from relay module 2501, module 2503 increases the value of total reference weight 2523 of object 2513 by the received additional reference weight "4" to make total reference weight 2523 "12" (FIG. 79).

Figure 80:
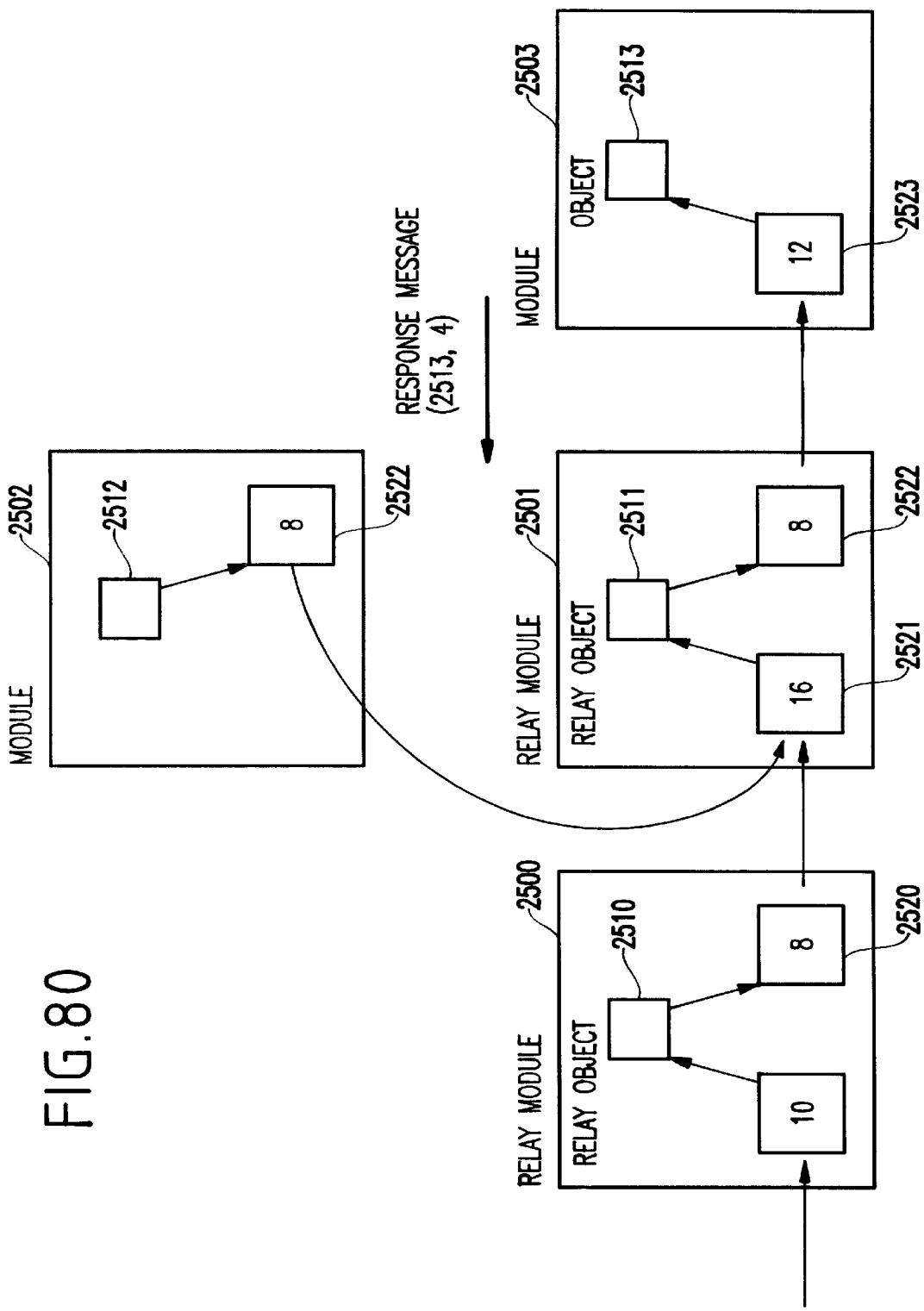
FIG. 80 is for explaining a concrete example of the operation in the third embodiment of the present invention.

Module 2503 then transmits a response message to module 2501 that transmitted the reference request message. At this point, the additional reference weight of "4" in the received message is set as the additional reference weight of object 2513 that is stored in the message (FIG. 80).

Figure 81:
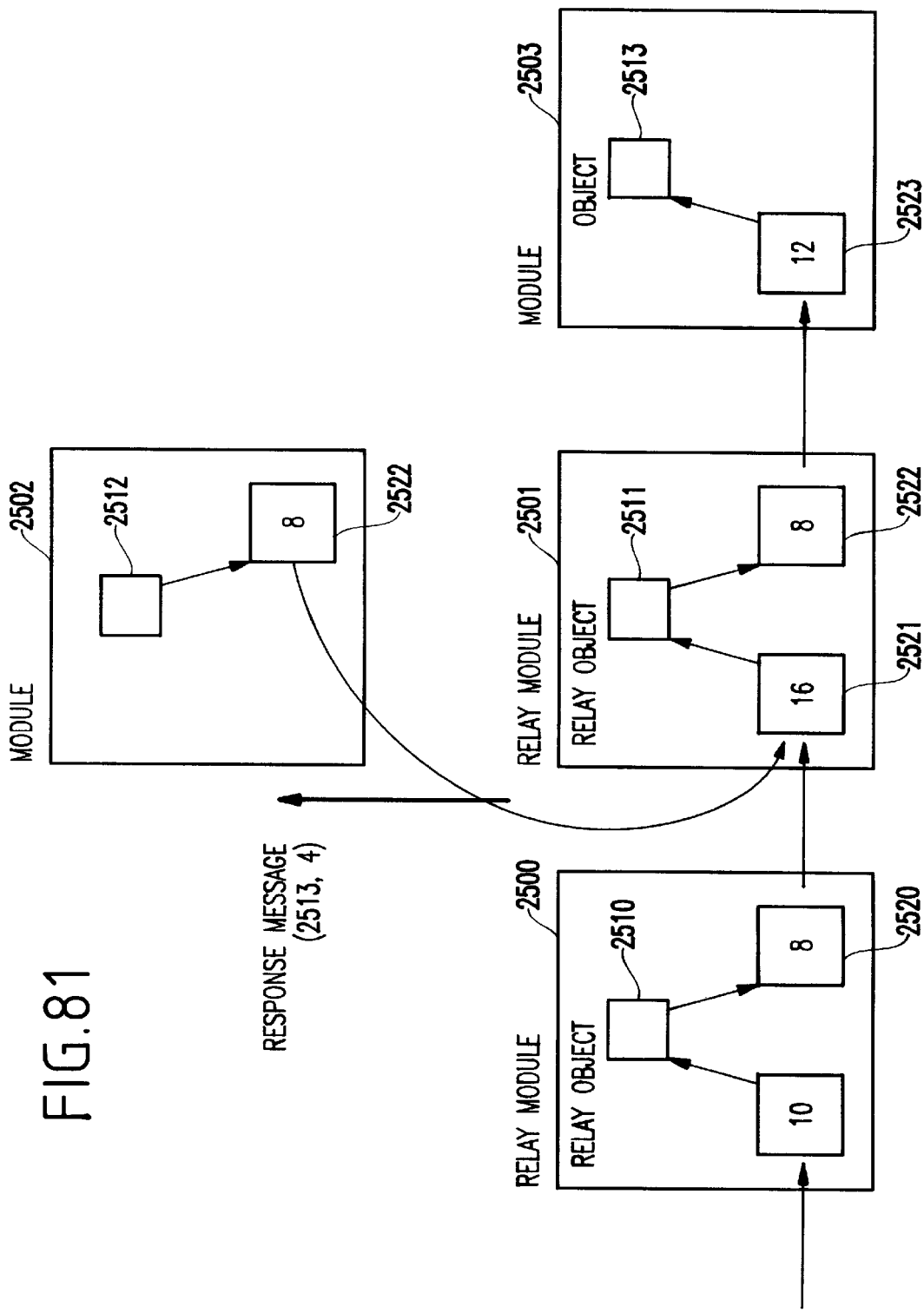
FIG. 81 is for explaining a concrete example of the operation in the third embodiment of the present invention.

Upon receiving the response message from module 2503, relay module 2501 verifies that the remote reference destination of object 2513 has not been updated. Relay module 2501 then produces a response message to module 2502 and transmits the response message with "4" stored unchanged as the additional reference weight of object 2513 (FIG. 81).

Figure 82:
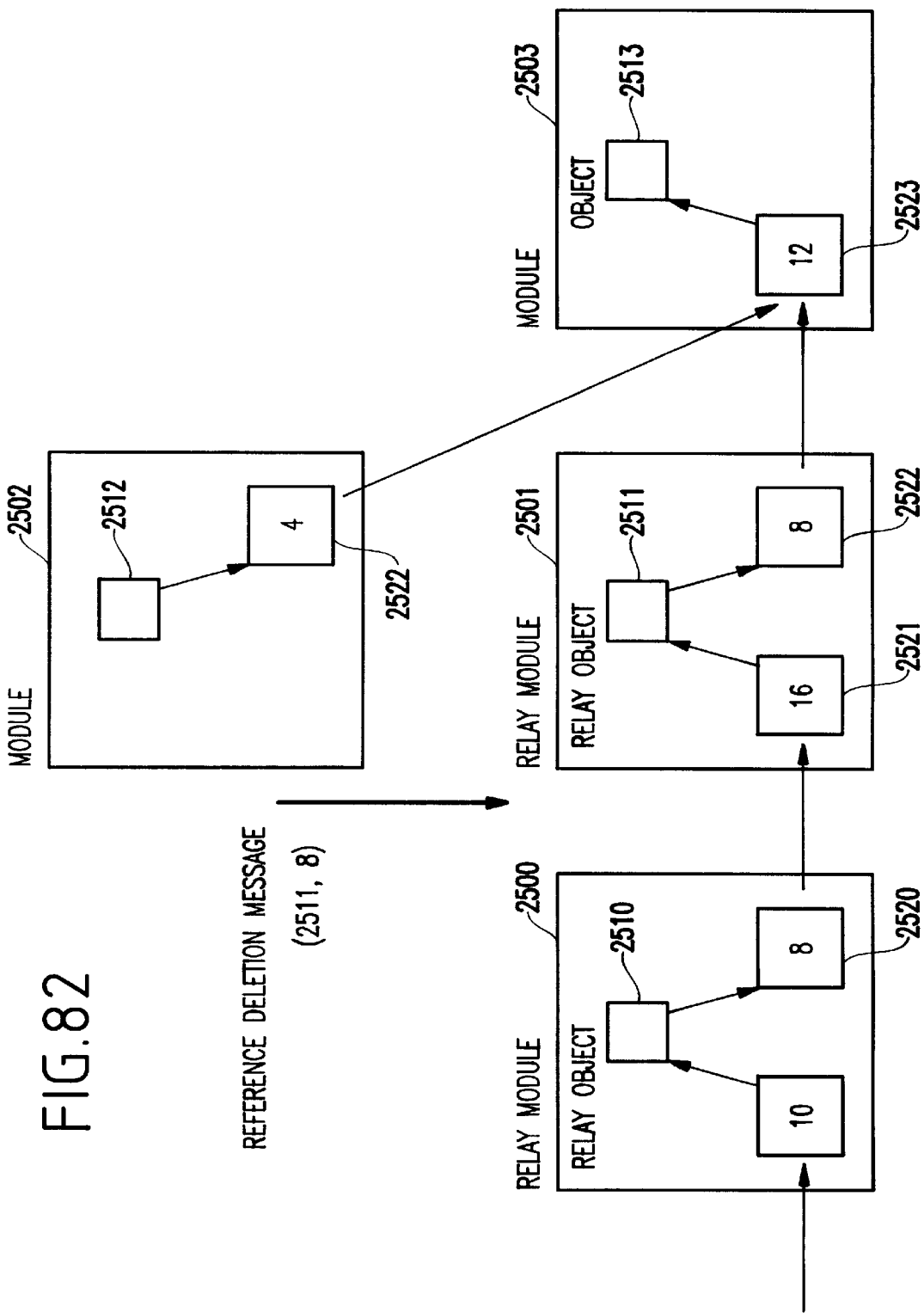
FIG. 82 is for explaining a concrete example of the operation in the third embodiment of the present invention.

Upon receiving the response message from relay module 2501, module 2502 accepts the information of object 2513 and verifies that the reference destination of object 2512 has changed. Module 2502 updates the reference destination of object 2512 from object 2511 to object 2513, and sets the additional reference weight "4" of object 2513 received in the message in partial reference weight 2522. Module 2502 then transmits a reference deletion message to module 2501 in which the additional reference weight is made the original partial reference weight portion "8" of the original reference destination object 2511 (FIG. 82).

Figure 83:
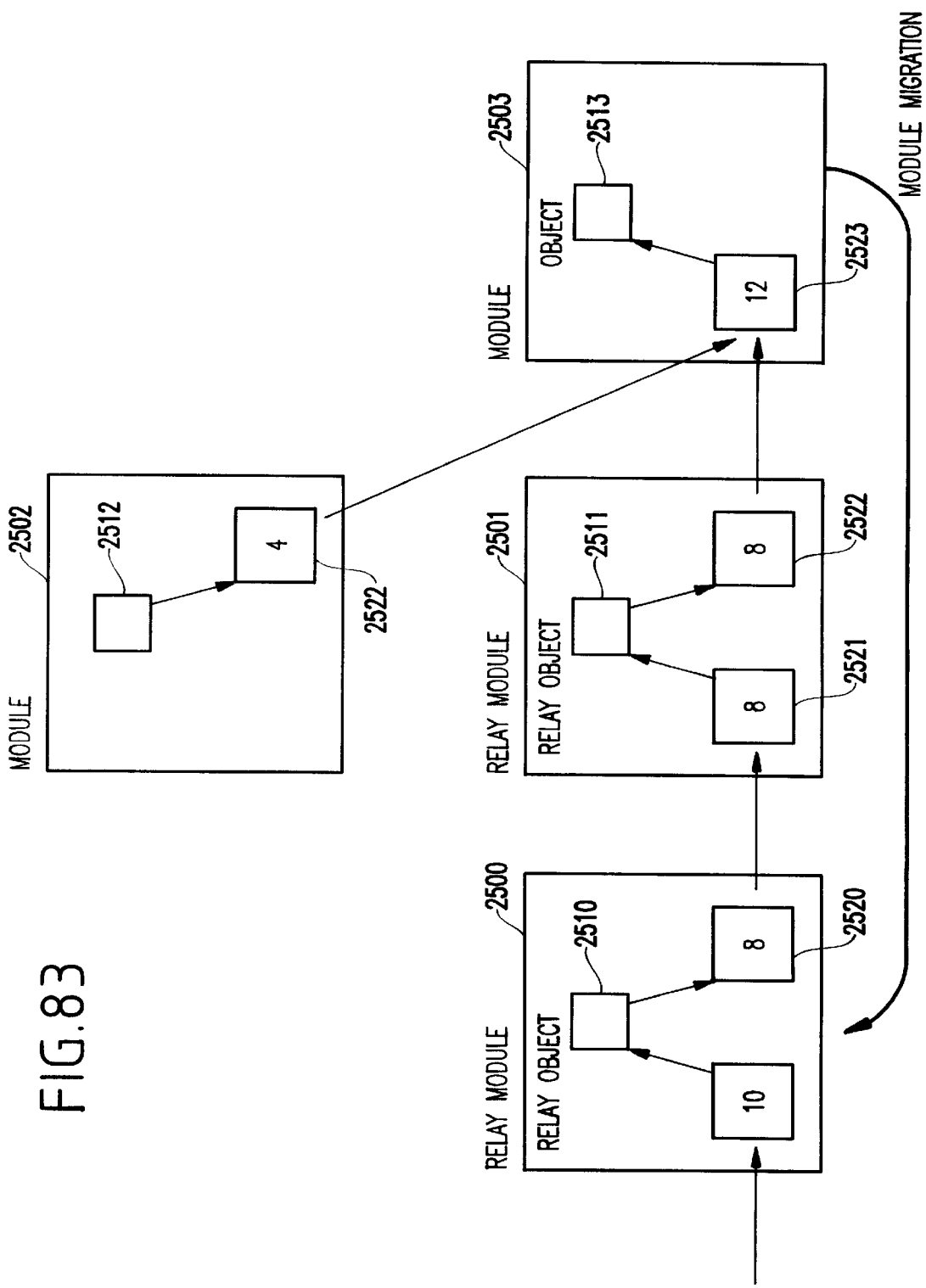
FIG. 83 is for explaining a concrete example of the operation in the third embodiment of the present invention.

Upon receiving the reference deletion message from module 2502, module 2501 takes additional reference weight "8" from total reference weight 2522 of object 2511, making it "8." It is then assumed that module 2503 migrates to the computer in which module 2500 resides (FIG. 83).

Figure 84:
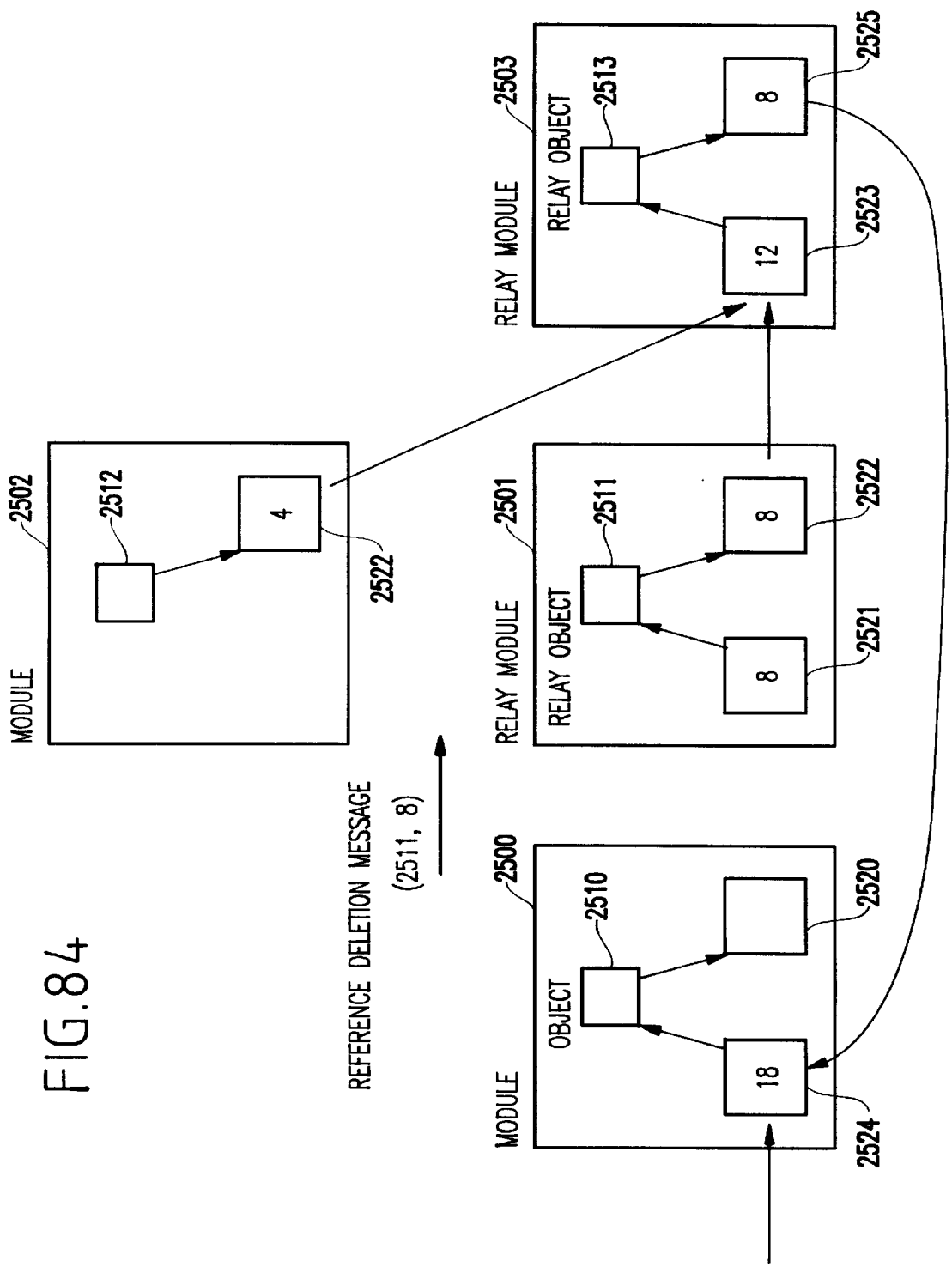
FIG. 84 is for explaining a concrete example of the operation in the third embodiment of the present invention.

Module 2500 is the relay module to module 2503 and is therefore integrated by module migration managing means. The information of object 2513 contained in the migration message is integrated with relay object 2510, relay object 2510 becomes the object carrying actual content, while object 2513 becomes a relay object that remote-references object 2510. Module 2500 thus changes from a relay module to an actual module, and module 2503 c onversely changes from an actual module to a relay module. The remote reference to relay object 2511 originally held by object 2510 therefore becomes unnecessary, and a reference deletion message (additional reference weight "8") for object 2511 is transmitted to module 2501 (FIG. 84).

Figure 85:
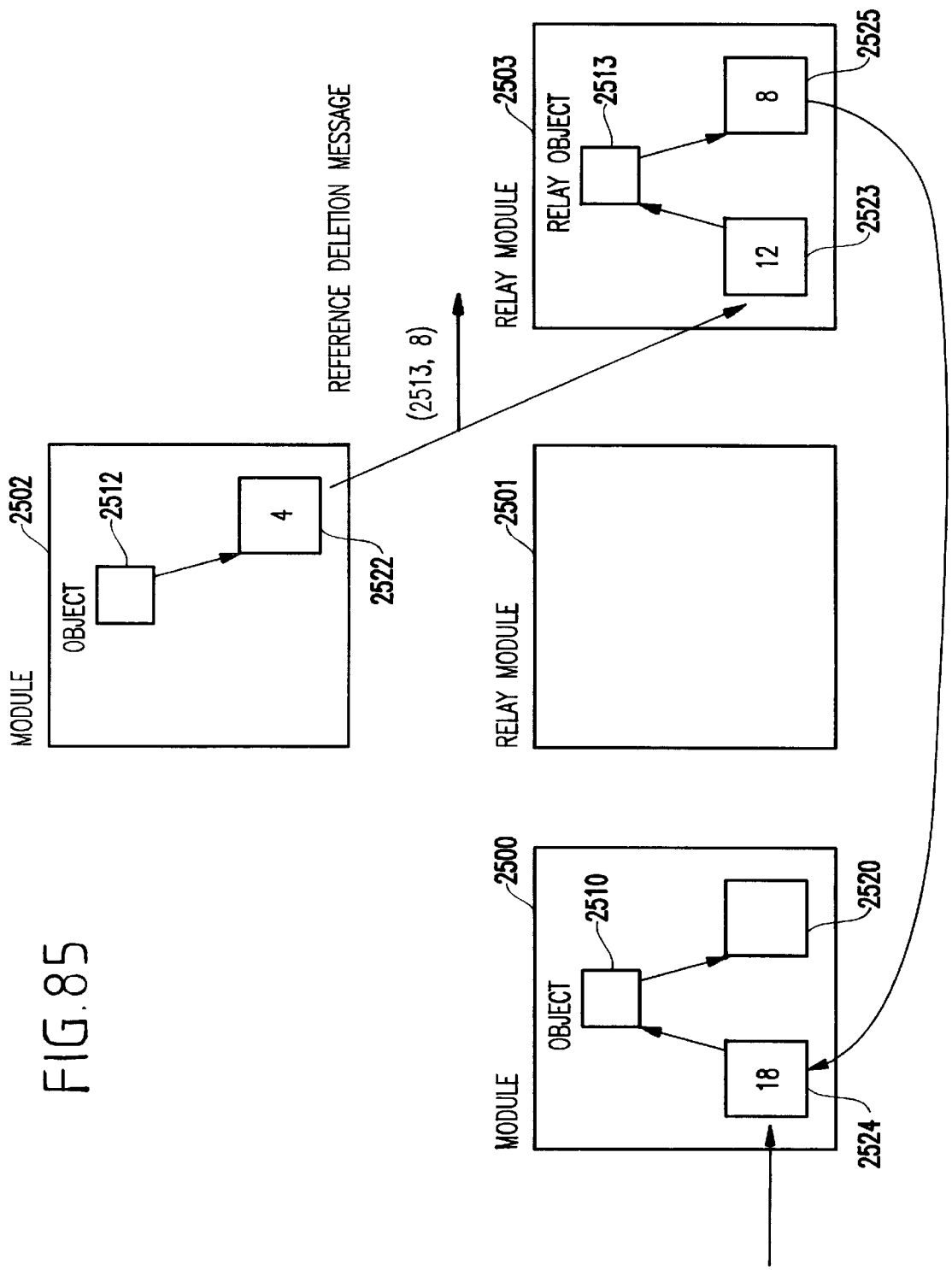
FIG. 85 is for explaining a concrete example of the operation in the third embodiment of the present invention.

Upon receiving the reference deletion message from module 2500, module 2501 subtracts "8" from total reference weight 2521 of object 2511, making it "0." Relay object 2511 is subsequently reclaimed by the heap memory managing means of module 2501, and another reference deletion message (additional reference weight "8") is transmitted to the reference destination object 2513 (FIG. 85).

Figure 86:
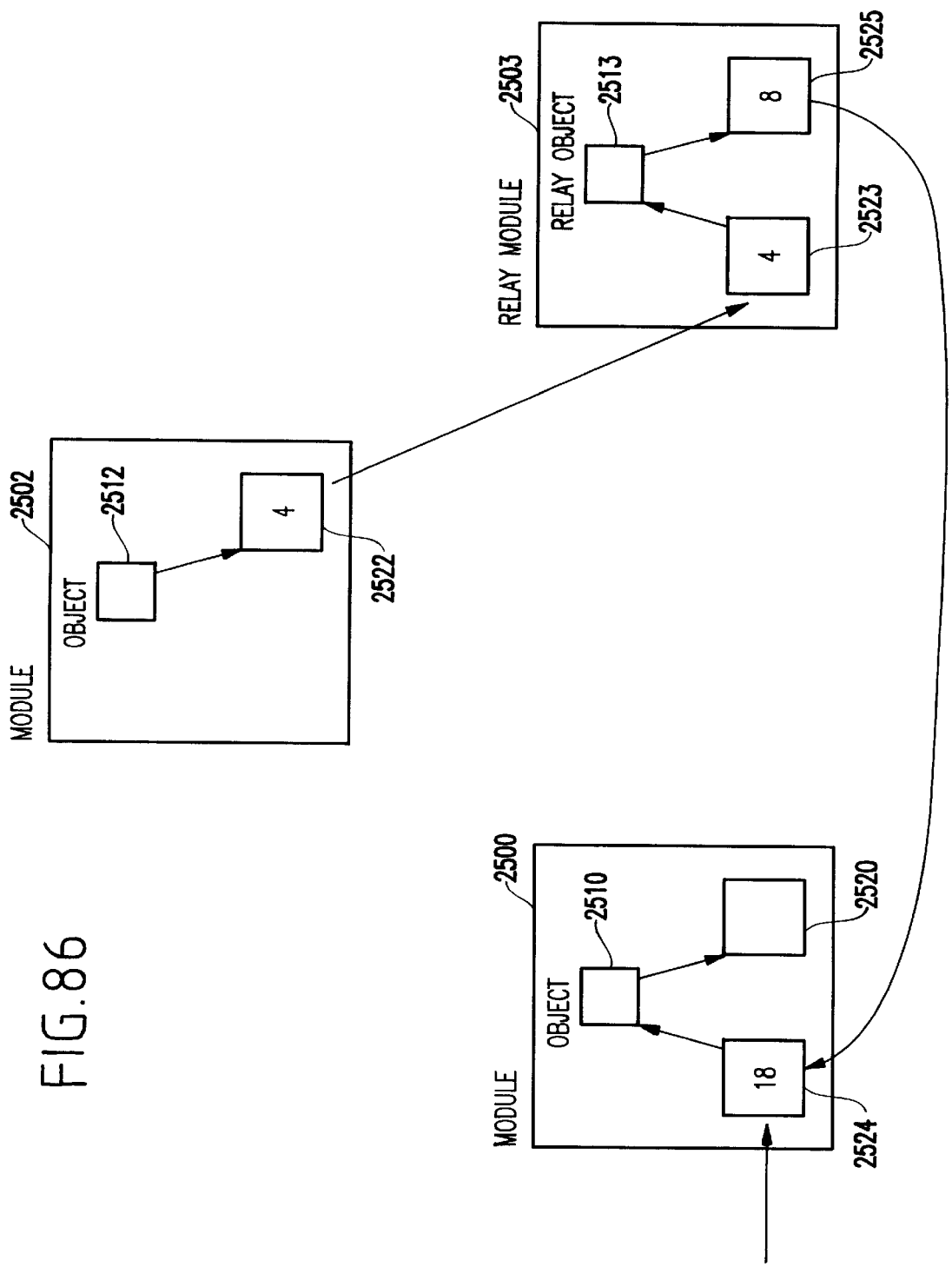
FIG. 86 is for explaining a concrete example of the operation in the third embodiment of the present invention.

Upon receiving the reference deletion request message from relay module 2501, module 2503 subtracts "8" from total reference weight 2523 of object 2513, making the total reference weight "4" (FIG. 86). If everything other than relay object 2511 that resided in relay module 2501 is eliminated, all memory regions in relay module 2501 along with the memory region of relay module 2501 itself can be reclaimed (FIG. 86).

Explanation is next presented regarding the effect of this embodiment.

When a module migrates in this embodiment, the actual content of the module is reactivated as a module on the computer of the migration destination, and regions necessary for module execution and data regions of objects residing in the original module can be reclaimed, thereby enabling effective use of memory regions.

As with the second embodiment of this invention, this embodiment functions effectively and without conflicts in a distributed system that permits migration of a module itself because reference to the module of the migration destination is continuously maintained despite the migration of the module and the change in the execution environment.

If relay objects in a relay module are no longer referenced from other modules, the regions relating to the relay objects can be reclaimed.

In addition, efficient use of memory resources is possible because the regions of the relay module itself can be reclaimed when no relay object remains within a relay module. As a result, no hindrance is placed on the operation of other application programs in the computer environment in which a relay module resides.

Fourth Embodiment

Detailed explanation is next presented with reference to the figures regarding the fourth embodiment of the present invention.

Figure 87:
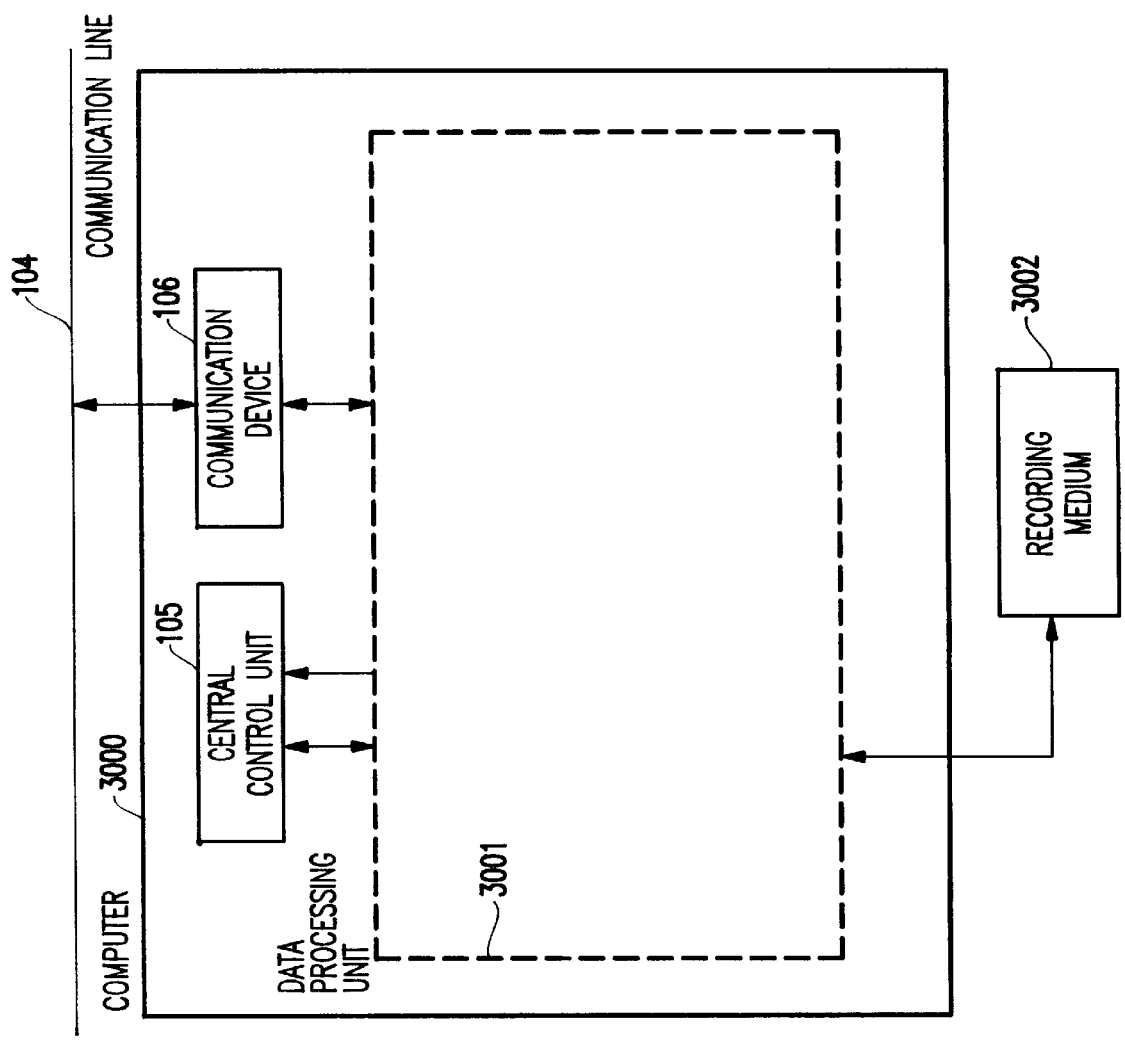
FIG. 87 is a function block diagram showing the functional composition of a computer according to the fourth embodiment of the present invention.

Referring to FIG. 87, the fourth embodiment of the present invention provides recording medium 3002 on which is recorded an automatic memory management program. This recording medium 3002 may be a magnetic disk, a semiconductor memory, or other recording medium.

The automatic memory management program is read from recording medium 3002 by data processing unit 3001 and controls the operation of data processing unit 3001. Under the control of the automatic memory management program, data processing unit 3001 executes the following processes, i.e., executes the same processes as those of data processing units 107, 1001, and 2001 in the first, second, and third embodiments.

The automatic memory management program that is read from recording medium 3002 to data processing unit 3001 operates in each module residing in data processing unit 3001.

Remote access managing means begins execution when one of events 1–9 in FIG. 13 occurs during the execution of a module.

Execution by the object migration managing means is initiated by the occurrence of execution by the object migrating means.

Execution by the module migration managing means is initiated by the occurrence of execution by the module migrating means.

Embodiment Modification

No limitation is placed on the number of computers belonging to distributed system 1 in the first, second, third, and fourth embodiments of the present invention.

In addition, there may be a plurality of modules within a computer.

The present invention enables management of memory without conflicts in a system in which there is change in the execution environment of data regions such as of objects, as described in the foregoing explanation.

The present invention allows a reduction in the amount of communication that accompanies memory management in a network.

The present invention can reduce the possibility of exhausting reference weight used for managing objects.

Finally, the present invention can reduce occurrences of insufficient memory in each computer, thereby enabling high-speed execution of application programs.

While preferred embodiments of the present invention have been described using specific terms, such description is for illustrative purposes only, and it is to be understood that changes and variations may be made without departing from the spirit or scope of the following claims.

What is claimed is:

1. A distributed system provided with a plurality of modules that manages each of a reference origin object that references an object residing in another module and a reference destination object that is referenced from said reference origin object by means of partial reference weight and total reference weight;

wherein said module in which said reference origin object resides, comprising:

partial reference weight discriminating means.for discriminating whether or not said partial reference weight of said reference origin object is within a prescribed range;

first transmitting means for transmitting to a module in which said reference destination object resides a first additional reference weight having a prescribed value together with a reference request to said reference destination object when said partial reference weight discriminating means determines that said partial reference weight is not within a prescribed range;

first receiving means for receiving second additional reference weight transmitted from said module in which said reference destination object resides together with a response to said reference request; and partial reference weight updating means for updating partial reference weight of said reference origin object in accordance with said second additional reference weight received by said first receiving means;

and wherein said module in which said reference destination object resides, comprising:

second receiving means for receiving said reference request and said first additional reference weight transmitted from said first transmitting means;

first total reference weight updating means for updating total reference weight of said reference destination object in accordance with said first additional reference weight received by said second receiving means; and second transmitting means for transmitting to said first receiving means said second additional reference weight having a value corresponding to said first additional reference weight together with said response to said reference request received by said second receiving means.

2. A distributed system according to claim 1 wherein a module that includes said reference origin object, further comprising:

garbage object discriminating means for discriminating whether or not said reference origin object has become unnecessary;

third transmitting means for transmitting to said module in which said reference destination object resides a third additional reference weight that corresponds to partial reference weight of said reference origin object together with a reference deletion request for deleting reference from said reference origin object when said garbage object discriminating means determines that said reference origin object has become unnecessary; and first memory region reclaiming means for reclaiming memory region of said reference origin object when said garbage object discriminating means determines that said reference origin object has become unnecessary;

and a module that includes said reference destination object further comprises:

third receiving means for receiving said reference deletion request and said third additional reference weight transmitted from said third transmitting means; and second total reference weight updating means for updating total reference weight held by said reference destination object in accordance with said third additional reference weight received by said third receiving means.

3. A distributed system provided with a plurality of modules that manages each of a reference origin object that references an object residing in another module and a reference destination object that is referenced from said reference origin object by means of partial reference weight and total reference weight;

wherein at least one module of said plurality of modules, comprising:

first transmitting means for transmitting information relating to an object residing in said module to another module;

first receiving means for receiving a first additional reference weight for setting partial reference weight and a response to information relating to said object transmitted from another module; and first relay object creating means for setting said first additional reference weight received by said first receiving means as partial reference weight, and converting said object to a relay object for transferring a reference request from another object to the transmission destination of information relating to said object;

and wherein at least one other module of said plurality of modules comprises:

second receiving means for receiving information relating to an object transmitted from a first transmitting means of another module;

reference destination object creating means for setting a prescribed value as total reference weight and creating a reference destination object based on information relating to said object received by said second receiving means; and second transmitting means for transmitting to said first receiving means said first additional reference weight having a value corresponding to said total reference weight together with a response to information relating to said object received by said second receiving means.

4. A distributed system that is made up of a plurality of computers joined by way of a network, that is provided with a plurality of modules, and that manages each of a reference origin object that references an object residing in another module and a reference destination object that is referenced from said reference origin object by means of partial reference weight and total reference weight;

wherein at least one computer of said plurality of computers, comprising:

first transmitting means for transmitting, to another computer by way of said network, information relating to that module including information relating to an object residing inside said computer;

first receiving means for receiving a response to information relating to said module that was transmitted from a module created in another computer, and first additional reference weight for setting partial reference weight; and first relay module creating means for setting said first additional reference weight received by said first receiving means as partial reference weight, and converting an object within said module to a relay object for transferring a reference request from another object to a transmission destination of information relating to said module;

and wherein at least one other computer of said plurality of computers, comprising:

second receiving means for receiving information relating to a module transmitted from said first transmitting means of another computer;

module creating means for creating a module having a reference destination object in which a prescribed value is set as total reference weight based on information relating to said module received by said second receiving means; and second transmitting means for transmitting to said first receiving means said first additional reference weight having a value corresponding to said total reference weight together with a response to information relating to said module received by said second receiving means.

5. A memory management device for managing each of a reference origin object that references an object residing in another module and a reference destination object that is referenced from said reference origin object by means of partial reference weight and total reference weight, comprising:

partial reference weight discriminating means for discriminating whether or not partial reference weight belonging to said reference origin object is within a prescribed range when said reference origin object references said reference destination object;

first transmitting means for transmitting to another module in which said reference destination object resides a first additional reference weight having a prescribed value together with a reference request to said reference destination object when said partial reference weight discriminating means determines that said partial reference weight is not within a prescribed range;

first receiving means for receiving first additional reference weight and a reference request transmitted from a first transmitting means belonging to another module;

first total reference weight updating means for updating total reference weight belonging to said reference destination object in accordance with said first additional reference weight received by said first receiving means;

second transmitting means for transmitting, to another module that transmitted said reference request, a second additional reference weight having a value corresponding to said first additional reference weight received by said first receiving means, together with a response to said reference request received by said first receiving means;

second receiving means for receiving a second additional reference weight and a response transmitted by a second transmitting means of another module; and partial reference weight updating means for updating partial reference weight belonging to said reference origin object in accordance with said second additional reference weight received by said second receiving means.

6. A memory management device according to claim 5, wherein said partial reference weight discriminating means, further comprising:

first discriminating means for discriminating whether or not said partial reference weight is smaller than a prescribed minimum;

wherein said first transmitting means transmits a first additional reference weight having a positive value together with said reference request when said first discriminating means determines that said partial reference weight is smaller than a prescribed minimum; and said first total reference weight updating means updates total reference weight belonging to said reference destination object by adding first additional reference weight having a positive value received by said first receiving means.

7. A memory management device according to claim 5, wherein said partial reference weight discriminating means, further comprising:

a second discriminating means for discriminating whether or not said partial reference weight is greater than a prescribed maximum;

wherein said first transmitting means transmits a first additional reference weight having a negative value together with said reference request when said second discriminating means determines that said partial reference weight is greater than a prescribed maximum; and said first total reference weight updating means updates total reference weight belonging to said reference destination object by adding a first additional reference weight having a negative value received by said first receiving means.

8. A memory management device according to claim 6, wherein said partial reference weight discriminating means, further comprising:

a second discriminating means for discriminating whether or not said partial reference weight is greater than a prescribed maximum;

wherein said first transmitting means transmits a first additional reference weight having a negative value together with said reference request when said second discriminating means determines that said partial reference weight is greater than a prescribed maximum; and said first total reference weight updating means updates total reference weight belonging to said reference destination object by adding a first additional reference weight having a negative value received by said first receiving means.

9. A memory management device according to claim 5, comprising:

garbage object discriminating means for discriminating whether or not said reference origin object has become unnecessary;

third transmitting means for transmitting, to a module in which said reference destination object resides, a third additional reference weight that corresponds to partial reference weight belonging to said reference origin object together with a reference deletion request for deleting reference from said reference origin object when said garbage object discriminating means determines that said reference origin object has become unnecessary;

third receiving means for receiving a reference deletion request and third additional reference weight transmitted from a third transmitting means belonging to another module;

second total reference weight updating means for updating total reference weight belonging to said reference destination object in accordance with said third additional reference weight received by said third receiving means; and first memory region reclaiming means for reclaiming memory region of said reference origin object when said garbage object discriminating means determines that said reference origin object has become unnecessary.

10. A memory management device according to claim 6, comprising:

garbage object discriminating means for discriminating whether or not said reference origin object has become unnecessary;

third transmitting means for transmitting, to a module in which said reference destination object resides, a third additional reference weight that corresponds to partial reference weight belonging to said reference origin object together with a reference deletion request for deleting reference from said reference origin object when said garbage object discriminating means determines that said reference origin object has become unnecessary;

third receiving means for receiving a reference deletion request and third additional reference weight transmitted from a third transmitting means belonging to another module;

second total reference weight updating means for updating total reference weight belonging to said reference destination object in accordance with said third additional reference weight received by said third receiving means; and first memory region reclaiming means for reclaiming memory region of said reference origin object when said garbage object discriminating means determines that said reference origin object has become unnecessary.

11. A memory management device according to claim 7, comprising:

garbage object discriminating means for discriminating whether or not said reference origin object has become unnecessary; third transmitting means for transmitting, to a module in which said reference destination object resides, a third additional reference weight that corresponds to partial reference weight belonging to said reference origin object together with a reference deletion request for deleting reference from said reference origin object when said garbage object discriminating means determines that said reference origin object has become unnecessary;

third receiving means for receiving a reference deletion request and third additional reference weight transmitted from a third transmitting means belonging to another module;

second total reference weight updating means for updating total reference weight belonging to said reference destination object in accordance with said third additional reference weight received by said third receiving means; and first memory region reclaiming means for reclaiming memory region of said reference origin object when said garbage object discriminating means determines that said reference origin object has become unnecessary.

12. A memory management device according to claim 8, comprising:

garbage object discriminating means for discriminating whether or not said reference origin object has become unnecessary;

third transmitting means for transmitting, to a module in which said reference destination object resides, a third additional reference weight that corresponds to partial reference weight belonging to said reference origin object together with a reference deletion request for deleting reference from said reference origin object when said garbage object discriminating means determines that said reference origin object has become unnecessary;

third receiving means for receiving a reference deletion request and third additional reference weight transmitted from a third transmitting means belonging to another module;

second total reference weight updating means for updating total reference weight belonging to said reference destination object in accordance with said third additional reference weight received by said third receiving means; and first memory region reclaiming means for reclaiming memory region of said reference origin object when said garbage object discriminating means determines that said reference origin object has become unnecessary.

13. A memory management device according to claim 9, comprising:

reference state discriminating means for discriminating whether or not said reference destination object has not been referenced from a reference origin object residing in another module and, moreover, has not been referenced from other objects residing in the same module; and second memory region reclaiming means for reclaiming memory region of said reference destination object when said reference state discriminating means determines that said reference destination object has not been referenced by either said reference origin object or said other objects.

14. A memory management device according to claim 10, comprising:

reference state discriminating means for discriminating whether or not said reference destination object has not been referenced from a reference origin object residing in another module and, moreover, has not been referenced from other objects residing in the same module; and second memory region reclaiming means for reclaiming memory region of said reference destination object when said reference state discriminating means determines that said reference destination object has not been referenced by either said reference origin object or said other objects.

15. A memory management device according to claim 11, comprising:

reference state discriminating means for discriminating whether or not said reference destination object has not been referenced from a reference origin object residing in another module and, moreover, has not been referenced from other objects residing in the same module; and second memory region reclaiming means for reclaiming memory region of said reference destination object when said reference state discriminating means determines that said reference destination object has not been referenced by either said reference origin object or said other objects.

16. A memory management device according to claim 12, comprising:

reference state discriminating means for discriminating whether or not said reference destination object has not been referenced from a reference origin object residing in another module and, moreover, has not been referenced from other objects residing in the same module; and second memory region reclaiming means for reclaiming memory region of said reference destination object when said reference state discriminating means determines that said reference destination object has not been referenced by either said reference origin object or said other objects.

17. A memory management device for managing each of a reference origin object that references an object residing in another module and a reference destination object that is referenced from said reference origin object by means of partial reference weight and total reference weight, comprising:

first transmitting means for transmitting information relating to an object that resides in the same module to another module;

first receiving means for receiving information relating to an object that is transmitted from a first transmitting means of another module;

first reference destination object creating means for setting a prescribed value as total reference weight and creating a reference destination object based on information relating to said object received by said first receiving means;

second transmitting means for transmitting, to a module that transmitted information relating to said object, a first additional reference weight having a value that corresponds to said total reference weight together with a response to information relating to said object received by said first receiving means;

second receiving means for receiving a first additional reference weight for setting partial reference weight and a response to information relating to an object transmitted from a second transmitting means of another module; and first relay object creating means for setting said first additional reference weight received by said second receiving means as a partial reference weight, and converting said object to a relay object for transferring a reference request from another object to a reference destination object created by said first reference destination object creating means.

18. A memory management device according to claim 17, wherein a relay object converted by said first relay object creating means is not an object carrying actual content.

19. A memory management device according to claim 17, further comprising:

third transmitting means for transmitting to another module information relating to said reference destination object created by said first reference destination object creating means;

third receiving means for receiving information relating to a reference destination object transmitted from a third transmitting means of another module;

second reference destination object creating means for setting a prescribed value as total reference weight and creating a reference destination object based on information relating to said reference destination object received by said third receiving means;

fourth transmitting means for transmitting, to a module that transmitted information relating to said object, a second additional reference weight having a value that corresponds to said total reference weight together with a response to information relating to said reference destination object received by said third receiving means;

fourth receiving means for receiving a second additional reference weight for setting partial reference weight and a response to information relating to a reference destination object transmitted from a fourth transmitting means of another module; and second relay object creating means for setting said second additional reference weight received by said fourth receiving means as partial reference weight, and converting said reference destination object to a relay object for transferring a reference request from another object to a reference destination object created by said second reference destination object creating means.

20. A memory management device according to claim 18, further comprising:

third transmitting means for transmitting to another module information relating to said reference destination object created by said first reference destination object creating means;

third receiving means for receiving information relating to a reference destination object transmitted from a third transmitting means of another module;

second reference destination object creating means for setting a prescribed value as total reference weight and creating a reference destination object based on information relating to said reference destination object received by said third receiving means;

fourth transmitting means for transmitting, to a module that transmitted information relating to said object, a second additional reference weight having a value that corresponds to said total reference weight together with a response to information relating to said reference destination object received by said third receiving means;

fourth receiving means for receiving a second additional reference weight for setting partial reference weight and a response to information relating to a reference destination object transmitted from a fourth transmitting means of another module; and second relay object creating means for setting said second additional reference weight received by said fourth receiving means as partial reference weight, and converting said reference destination object to a relay object for transferring a reference request from another object to a reference destination object created by said second reference destination object creating means.

21. A memory management device according to claim 19, wherein said relay object converted by said second relay object creating means is not an object carrying actual content.

22. A memory management device according to claim 20 wherein said relay object converted by said second relay object creating means is not an object carrying actual content.

23. A memory management device according to claim 17, further comprising:

fifth transmitting means for, when a relay object created by said first relay object creating means has received a reference request from another object, adding to said reference request a third additional reference weight having a prescribed value and transferring said reference request to a module having a first reference destination object;

fifth receiving means for receiving third additional reference weight and a reference request transferred from a fifth transmitting means of another module;

first total reference weight updating means for updating total reference weight belonging to a reference destination object created by said first reference destination object creating means in accordance with said third additional reference weight received by said fifth receiving means;

sixth transmitting means for transmitting a fourth additional reference weight having a value that corresponds to said third additional reference weight and specific information for specifying a module in which said reference destination object resides together with a response corresponding to a reference request received by said fifth receiving means;

sixth receiving means for receiving a response, a fourth additional reference weight, and specific information transmitted from a sixth transmitting means of another module;

reference destination updating means for updating partial reference weight of an object that originated a reference request in accordance with said fourth additional reference weight received by said sixth receiving means and moreover, updating the reference destination of said object in accordance with said specific information;

seventh transmitting means for transmitting, to a module having said reference destination object, a fifth additional reference weight having a value that corresponds to said fourth additional reference weight received by said sixth receiving means together with a reference deletion request for deleting a reference from said relay object;

seventh receiving means for receiving a fifth additional reference weight and a reference deletion request transmitted from a seventh transmitting means of another module; and second total reference weight updating means for updating total reference weight of said reference destination object in accordance with said fifth additional reference weight received by said seventh receiving means.

24. A memory management device according to claim 18, further comprising:
fifth transmitting means for, when a relay object created by said first relay object creating means has received a reference request from another object, adding a third additional reference weight having a prescribed value and transferring said reference request to a module having a first reference destination object;
fifth receiving means for receiving third additional reference weight and a reference request transferred from a fifth transmitting means of another module;
first total reference weight updating means for updating total reference weight belonging to a reference destination object created by said first reference destination object creating means in accordance with said third additional reference weight received by said fifth receiving means;
sixth transmitting means for transmitting a fourth additional reference weight having a value that corresponds to said third additional reference weight and specific information for specifying a module in which said reference destination object resides together with a response corresponding to a reference request received by said fifth receiving means;
sixth receiving means for receiving a response, a fourth additional reference weight, and specific information transmitted from a sixth transmitting means of another module;
reference destination updating means for updating partial reference weight of an object that originated a reference request in accordance with said fourth additional reference weight received by said sixth receiving means and moreover, updates the reference destination of said object in accordance with said specific information;
seventh transmitting means for transmitting, to a module having said reference destination object, a fifth additional reference weight having a value that corresponds to said fourth additional reference weight received by said sixth receiving means together with a reference deletion request for deleting a reference from said relay object;
seventh receiving means for receiving a fifth additional reference weight and a reference deletion request transmitted from a seventh transmitting means of another module; and
second total reference weight updating means for updating total reference weight of said reference destination object in accordance with said fifth additional reference weight received by said seventh receiving means.

25. A memory management device according to claim 17, further comprising:
relay discriminating means for discriminating whether or not said relay object is referenced from another object; and
memory region reclaiming means for reclaiming memory regions of said relay object when said relay discriminating means determines that said relay object is not referenced from another object.

26. A memory management device according to claim 18, further comprising:
relay discriminating means for discriminating whether or not said relay object is referenced from another object; and
memory region reclaiming means for reclaiming memory regions of said relay object when said relay discriminating means determines that said relay object is not referenced from another object.

27. A memory management device according to claim 19, further comprising:
relay discriminating means for discriminating whether or not said relay object is referenced from another object; and
memory region reclaiming means for reclaiming memory regions of said relay object when said relay discriminating means determines that said relay object is not referenced from another object.

28. A memory management device according to claim 20, further comprising:
relay discriminating means for discriminating whether or not said relay object is referenced from another object; and
memory region reclaiming means for reclaiming memory regions of said relay object when said relay discriminating means determines that said relay object is not referenced from another object.

29. A memory management device according to claim 21, further comprising:
relay discriminating means for discriminating whether or not said relay object is referenced from another object; and
memory region reclaiming means for reclaiming memory regions of said relay object when said relay discriminating means determines that said relay object is not referenced from another object.

30. A memory management device according to claim 22, further comprising:
relay discriminating means for discriminating whether or not said relay object is referenced from another object; and
memory region reclaiming means for reclaiming memory regions of said relay object when said relay discriminating means determines that said relay object is not referenced from another object.

31. A memory management device according to claim 23, further comprising:
relay discriminating means for discriminating whether or not said relay object is referenced from another object; and
memory region reclaiming means for reclaiming memory regions of said relay object when said relay discriminating means determines that said relay object is not referenced from another object.

32. A memory management device according to claim 24, further comprising:
relay discriminating means for discriminating whether or not said relay object is referenced from another object; and
memory region reclaiming means for reclaiming memory regions of said relay object when said relay discriminating means determines that said relay object is not referenced from another object.

33. A memory management device that is joined with other memory management devices by way of a network and that manages each of a reference origin object that references an object residing in another module and a reference destination object that is referenced from said reference origin object by means of partial reference weight and total reference weight, comprising:

first transmitting means for transmitting to another computer by way of said network information relating to a module containing information relating to an object that resides within said memory management device;

first receiving means for receiving information relating to a module transmitted from a first transmitting means of another memory management device;

first module creating means for creating a module having a reference destination object in which a prescribed value is set as total reference weight based on information relating to said module received by said first receiving means;

second transmitting means for transmitting to a first receiving means said first additional reference weight having a value that corresponds to said total reference weight together with a response to information relating to said module received by said first receiving means;

second receiving means for receiving a first additional reference weight for setting partial reference weight and a response to information relating to a module transmitted from a second transmitting means of another memory management device; and first relay module creating means for creating a relay module by setting said first additional reference weight received by said second receiving means as partial reference weight and converting an object within said module to a relay object for transferring a reference request from another object to a transmission destination of information relating to said module.

34. A memory management device according to claim 33, wherein a relay object converted by said first relay module creating means is not an object carrying actual content.

35. A memory management device according to claim 33, further comprising:

third transmitting means for transmitting, to yet another computer by way of said network, information relating to a module including information relating to said reference destination object that was created by said first module creating means;

third receiving means for receiving information relating to said module transmitted from a third transmitting means belonging to another computer;

second module creating means for creating a module having a reference destination object in which a prescribed value is set as total reference weight based on information relating to said module received by said third receiving means;

fourth transmitting means for transmitting, to a module that transmitted information relating to said module, a second additional reference weight having a value that corresponds to said total reference weight together with a response to information relating to said module received by said third receiving means;

fourth receiving means for receiving said second additional reference weight and said response transmitted by a fourth transmitting means belonging to another computer; and second relay module creating means for creating a relay module by setting said second additional reference weight received by said fourth receiving means as partial reference weight and converting said reference destination object contained within a module created by said first module creating means to a relay object for transferring a reference request from another object to a reference destination object contained within a module created by said second module creating means.

36. A memory management device according to claim 34, further comprising:

third transmitting means for transmitting, to yet another computer by way of said network, information relating to a module including information relating to said reference destination object that was created by said first module creating means;

third receiving means for receiving information relating to said module transmitted from a third transmitting means belonging to another computer;

second module creating means for creating a module having a reference destination object in which a prescribed value is set as total reference weight based on information relating to said module received by said third receiving means;

fourth transmitting means for transmitting, to a module that transmitted information relating to said module, a second additional reference weight having a value that corresponds to said total reference weight together with a response to information relating to said module received by said third receiving means;

fourth receiving means for receiving said second additional reference weight and said response transmitted by a fourth transmitting means belonging to another computer; and second relay module creating means for creating a relay module by setting said second additional reference weight received by said fourth receiving means as partial reference weight and converting said reference destination object contained within a module created by said first module creating means to a relay object for transferring a reference request from another object to a reference destination object contained within a module created by said second module creating means.

37. A memory management device according to claim 35 wherein a relay object converted by said second relay module creating means is not an object carrying actual content.

38. A memory management device according to claim 36, wherein a relay object converted by said second relay module creating means is not an object carrying actual content.

39. A memory management device according to claim 34, further comprising:

relay discriminating means for discriminating whether or not all relay objects within a relay module are referenced from other objects; and memory region reclaiming means for reclaiming memory regions of said relay module when said relay discriminating means determines that none of said relay objects are referenced from other objects.

40. A memory management device according to claim 35, further comprising:

relay discriminating means for discriminating whether or not all relay objects within a relay module are referenced from other objects; and memory region reclaiming means for reclaiming memory regions of said relay module when said relay discriminating means determines that none of said relay objects are referenced from other objects.

41. A memory management device according to claim 36, further comprising:

relay discriminating means for discriminating whether or not all relay objects within a relay module are referenced from other objects; and memory region reclaiming means for reclaiming memory regions of said relay module when said relay discriminating means determines that none of said relay objects are referenced from other objects.

42. A memory management device according to claim 37, further comprising:

relay discriminating means for discriminating whether or not all relay objects within a relay module are referenced from other objects; and memory region reclaiming means for reclaiming memory regions of said relay module when said relay discriminating means determines that none of said relay objects are referenced from other objects.

43. A memory management device according to claim 38, further comprising:

relay discriminating means for discriminating whether or not all relay objects within a relay module are referenced from other objects; and memory region reclaiming means for reclaiming memory regions of said relay module when said relay discriminating means determines that none of said relay objects are referenced from other objects.

44. A memory management method for managing each of a reference origin object that references an object residing in another module and a reference destination object that is referenced from said reference origin object by means of partial reference weight and total reference weight, comprising:

a partial reference weight discrimination step for discriminating whether or not partial reference weight belonging to said reference origin object is within a prescribed range when said reference origin object references said reference destination object;

a first transmission step for transmitting, to a module in which said reference destination object resides, a first additional reference weight having a prescribed value together with a reference request to said reference destination object when it is determined in said partial reference weight discrimination step that partial reference weight belonging to said reference origin object is not within a prescribed range;

a first reception step for receiving said first additional reference weight and said reference request transmitted in said first transmission step;

a first total reference weight update step for updating total reference weight belonging to said reference destination object in accordance with said first additional reference weight received in said first reception step;

a second transmission step for transmitting, to a module in which said reference origin object resides, a second additional reference weight having a value that corresponds to said first additional reference weight together with a response to said reference request received in said first reception step;

a second reception step for receiving said second additional reference weight and said response transmitted in said second transmission step; and a partial reference weight update step for updating partial reference weight belonging to said reference origin object in accordance with said second additional reference weight received in said second reception step.

45. A memory management method according to claim 44, further comprising:

a garbage object discrimination step for discriminating whether or not said reference origin object has become unnecessary;

a third transmission step for transmitting, to a module in which said reference destination object resides, a third additional reference weight that corresponds to a partial reference weight belonging to said reference origin object together with a reference deletion request for deleting a reference from said reference origin object when it is determined in said garbage object discrimination step that said reference origin object has become unnecessary;

a third reception step for receiving said third additional reference weight and said reference deletion request transmitted in said third transmission step;

a second total reference weight update step for updating total reference weight belonging to said reference destination object in accordance with said third additional reference weight received in said third reception step; and a memory region reclamation step for reclaiming memory regions of said reference origin object when it is determined in said garbage object discrimination step that said reference origin object has become unnecessary.

46. A memory management method for managing each of a reference origin object that references an object residing in another module and a reference destination object that is referenced from said reference origin object by means of partial reference weight and total reference weight, comprising:

a first transmission step for transmitting to another module information relating to an object residing within that same module;

a first reception step for receiving information relating to an object transmitted in said first transmission step;

a first reference destination object creation step for setting a prescribed value as total reference weight and creating a reference destination object based on information relating to said object received in said first reception step;

a second transmission step for transmitting, to a module that transmitted information relating to said object, first additional reference weight having a value that corresponds to said total reference weight together with a response to information relating to said object received in said first reception step;

a second reception step for receiving said first additional reference weight for setting partial reference weight and a response to information relating to said object transmitted in said second transmission step; and a first relay object creation step for setting said first additional reference weight received in said second reception step as partial reference weight, and converting said object to a relay object for transferring a reference request from another object to a reference destination object created in said first reference destination object creation step.

47. A memory management method according to claim 46, further comprising:

a third transmission step for transmitting to another module information relating to said reference destination object created in said first reference destination object creation step;

a third reception step for receiving information relating to said reference destination object that was transmitted in said third transmission step;

a second reference destination object creation step for setting a prescribed value as total reference weight and creating a reference destination object based on information relating to said reference destination object received in said third reception step;

a fourth transmission step for transmitting, to a module that transmitted information relating to said object, second additional reference weight having a value that corresponds to said total reference weight together with a response to information relating to said reference destination object that was received in said third reception step;

a fourth reception step for receiving said second additional reference weight and said response transmitted in said fourth transmission step; and a second relay object creation step for setting said second additional reference weight received in said fourth reception step as partial reference weight and converting said reference destination object to a relay object for transferring a reference request from another object to a reference destination object created in said second reference destination object creation step.

48. A memory management method according to claim 46, further comprising:

a fifth transmission step for, when a relay object created in said first relay object creation step has received a reference request from another object, adding a third additional reference weight having a prescribed value and transferring said reference request to said first reference destination object;

a fifth reception step for receiving said third additional reference weight and said reference request transmitted in said fifth transmission step;

a first total reference weight update step for updating total reference weight belonging to a reference destination object created in said first reference destination object creation step in accordance with said third additional reference weight received in said fifth reception step;

a sixth transmission step for transmitting a fourth additional reference weight having a value that corresponds to said third additional reference weight and specific information for specifying a module in which said reference destination object resides together with a response to a reference request received in said fifth reception step;

a sixth reception step for receiving said specific information and said fourth additional reference weight and said response transmitted in said sixth transmission step;

a reference destination update step for updating partial reference weight of an object that originated a reference request in accordance with said fourth additional reference weight received in said sixth reception step, and further, updating the reference destination of that object in accordance with said specific information;

a seventh transmission step for transmitting, to a module that has said reference destination object, a fifth additional reference weight having a value that corresponds to said fourth additional reference weight received in said sixth reception step together with a reference deletion request for deleting a reference from said relay object;

a seventh reception step for receiving a fifth additional reference weight and a reference deletion request transmitted in said seventh transmission step; and a second total reference weight update step for updating total reference weight of said reference destination object in accordance with said fifth additional reference weight received in said seventh reception step.

49. A memory management method according to claim 47, further comprising:

a fifth transmission step for, when a relay object created in said first relay object creation step has received a reference request from another object, adding a third additional reference weight having a prescribed value and transferring said reference request to said first reference destination object;

a fifth reception step for receiving said third additional reference weight and said reference request transmitted in said fifth transmission step;

a first total reference weight update step for updating total reference weight belonging to a reference destination object created in said first reference destination object creation step in accordance with said third additional reference weight received in said fifth reception step;

a sixth transmission step for transmitting a fourth additional reference weight having a value that corresponds to said third additional reference weight and specific information for specifying a module in which said reference destination object resides together with a response to a reference request received in said fifth reception step;

a sixth reception step for receiving said specific information and said fourth additional reference weight and said response transmitted in said sixth transmission step;

a reference destination update step for updating partial reference weight of an object that originated a reference request in accordance with said fourth additional reference weight received in said sixth reception step, and further, updating the reference destination of that object in accordance with said specific information;

a seventh transmission step for transmitting, to a module that has said reference destination object, a fifth additional reference weight having a value that corresponds to said fourth additional reference weight received in said sixth reception step together with a reference deletion request for deleting a reference from said relay object;

a seventh reception step for receiving a fifth additional reference weight and a reference deletion request transmitted in said seventh transmission step; and a second total reference weight update step for updating total reference weight of said reference destination object in accordance with said fifth additional reference weight received in said seventh reception step.

50. A memory management method according to claim 46, further comprising:

a relay discrimination step for discriminating whether or not said rela object is referenced from another object; and a memory region reclamation step for reclaiming memory regions of said relay object when it is determined in said relay discrimination step that said relay object is not referenced from another object.

51. A memory management method according to claim 47, further comprising:

a relay discrimination step for discriminating whether or not said relay object is referenced from another object; and a memory region reclamation step for reclaiming memory regions of said relay object when it is determined in said relay discrimination step that said relay object is not referenced from another object.

52. A memory management method according to claim 48, further comprising:
   a relay discrimination step for discriminating whether or not said relay object is referenced from another object; and
   a memory region reclamation step for reclaiming memory regions of said relay object when it is determined in said relay discrimination step that said relay object is not referenced from another object.

53. A memory management method according to claim 49, further comprising:
   a relay discrimination step for discriminating whether or not said relay object is referenced from another object; and
   a memory region reclamation step for reclaiming memory regions of said relay object when it is determined in said relay discrimination step that said relay object is not referenced from another object.

54. A memory management method for managing each of a reference origin object that references an object residing in another module and a reference destination object that is referenced from said reference origin object by means of partial reference weight and total reference weight, comprising:
   a first transmission step for transmitting information relating to a module including information relating to an object to another computer other than the computer in which said module resides;
   a first reception step for receiving information relating to a module transmitted in said first transmission step;
   a first module creation step for creating a module having a reference destination object in which a prescribed value is set as total reference weight based on information relating to said module received in said first reception step;
   a second transmission step for transmitting to a first receiving means said first additional reference weight having a value that corresponds to said total reference weight together with a response to information relating to said module received in said first reception step;
   a second reception step for receiving a first additional reference weight for setting partial reference weight and a response to information relating to a module transmitted in said second transmission step; and
   a first relay module creation step for creating a relay module by setting said first additional reference weight received in said second reception step as partial reference weight and converting an object within that module to a relay object for transferring a reference request from another object to a transmission destination of information relating to said module.

55. A memory management method according to claim 54, further comprising:
   a third transmission step for transmitting, to yet another computer by way of said network, information relating to a module created in said first module creation step containing information relating to said reference destination object;
   a third reception step for receiving information relating to said module transmitted in a third transmission step of another computer;
   a second module creation step for creating a module having a reference destination object in which a pre-scribed value is set as total reference weight based on information relating to said module received in said third reception step;
   a fourth transmission step for transmitting, to a module that transmitted information relating to said module, a second additional reference weight having a value that corresponds to said total reference weight together with a response to information relating to said module received in said third reception step;
   a fourth reception step for receiving said second additional reference weight and said response transmitted in a fourth transmission step of another computer; and
   a second relay module creation step for creating a relay module by setting said second additional reference weight received in said fourth reception step as partial reference weight and converting said reference destination object contained within a module created in said first module creation step to a relay object for transferring a reference request from another object to a reference destination object contained within a module created in said second module creation step.

56. A recording medium that can be read by a computer and that stores a program for managing each of a reference origin object that references an object residing in another module and a reference destination object that is referenced from said reference origin object by means of partial reference weight and total reference weight; and that stores a program for realizing:
   a partial reference weight discrimination step for discriminating whether or not a partial reference weight belonging to said reference origin object is within a prescribed range when said reference origin object references said reference destination object;
   a first transmission step for transmitting, to a module in which said reference destination object resides, a first additional reference weight having a prescribed value together with a reference request to said reference destination object when it is determined in said partial reference weight discrimination step that said partial reference weight belonging to said reference origin object is not within said prescribed range;
   a first reception step for receiving said first additional reference weight and said reference request transmitted in said first transmission step;
   a first total reference weight update step for updating total reference weight belonging to said reference destination object i n accordance with said first additional reference weight received in said first reception step;
   a second transmission step for transmitting, to a module in which said reference origin object resides, a second additional reference weight having a value that corresponds to said first additional reference weight together with a response to said reference request received in said first reception step;
   a second reception step for receiving said second additional reference weight and said response transmitted in said second transmission step; and
   a partial reference weight update step for updating partial reference weight belonging to said reference origin object in accordance with said second additional reference weight received in said second reception step.

57. A recording medium that can be read by a computer according to claim 56, that further stores a program for realizing:
   a garbage object discrimination step for discriminating whether or not said reference origin object has become unnecessary;

a third transmission step for transmitting, to a module in which said reference destination object resides, a third additional reference weight that corresponds to a partial reference weight belonging to said reference origin object together with a reference deletion request for deleting references from said reference origin object when it is determined in said garbage object discrimination step that said reference origin object has become unnecessary;

a third reception step for receiving said third additional reference weight and said reference deletion request transmitted in said third transmission step;

a second total reference weight update step for updating total reference weight belonging to said reference destination object in accordance with said third additional reference weight received in said third reception step; and a memory region reclamation step for reclaiming memory regions of said reference origin object when it is determined in said garbage object discrimination step that said reference origin object has become unnecessary.

58. A recording medium that can be read by a computer and that stores a program for managing each of a reference origin object that references an object residing in another module and a reference destination object that is referenced from said reference origin object by means of partial reference weight and total reference weight; and stores a program for realizing:

a first transmission step for transmitting to another module information relating to an object residing within that same module;

a first reception step for receiving information relating to an object transmitted in said first reception step;

a first reference destination object creation step for setting a prescribed value as total reference weight and creating a reference destination object based on information relating to said object received in said first reception step;

a second transmission step for transmitting, to a module that transmitted information relating to said object, a first additional reference weight having a value that corresponds to said total reference weight together with a response to information relating to said object received in said first reception step;

a second reception step for receiving said first additional reference weight for setting partial reference weight and a response to information relating to said object transmitted in said second transmission step; and a first relay object creation step for setting said first additional reference weight received in said second reception step as partial reference weight and converting said reference destination object to a relay object for transferring a reference request from another object to a reference destination object created in said first reference destination object creation step.

59. A recording medium that can be read by a computer according to claim 58, that further stores a program for realizing:

a third transmission step for transmitting to another module information relating to said reference destination object created in said first reference destination object creation step;

a third reception step for receiving information relating to said reference destination object that was transmitted in said third transmission step;

a second reference destination object creation step for setting a prescribed value as total reference weight and creating a reference destination object based on information relating to said reference destination object received in said third reception step;

a fourth transmission step for transmitting, to a module that transmitted information relating to said object, second additional reference weight having a value that corresponds to said total reference weight together with a response to information relating to said reference destination object that was received in said third reception step;

a fourth reception step for receiving said second additional reference weight and said response transmitted in said fourth transmission step; and a second relay object creation step for setting said second additional reference weight received in said fourth reception step as partial reference weight and converting said reference destination object to a relay object for transferring a reference request from another object to a reference destination object created in said second reference destination object creation step.

60. A recording medium that can be read by a computer according to claim 58, that further stores a program for realizing:

a fifth transmission step for, when a relay object created in said first relay object creation step receives a reference request from another object, adding a third additional reference weight having a prescribed value and transferring said reference request to said first reference destination object;

a fifth reception step for receiving said third additional reference weight and said reference request transmitted in said fifth transmission step;

a first total reference weight update step for updating total reference weight belonging to a reference destination object created in said first reference destination object creation step in accordance with said third additional reference weight received in said fifth reception step;

a sixth transmission step for transmitting a fourth additional reference weight having a value that corresponds to said third additional reference weight and specific information for specifying a module in which said reference destination object resides together with a response to a reference request received in said fifth reception step;

a sixth reception step for receiving said fourth additional reference weight, said specific information, and said response transmitted in said sixth transmission step;

a reference destination update step for updating partial reference weight of an object originating a reference request in accordance with said fourth additional reference weight received in said sixth reception step, and moreover, updating the reference destination of that object in accordance with said specific information;

a seventh transmission step for transmitting, to a module that has said reference destination object, a fifth additional reference weight having a value that corresponds to said fourth additional reference weight received in said sixth reception step together with a reference deletion request for deleting a reference from said relay object;

a seventh reception step for receiving a fifth additional reference weight and a reference deletion request transmitted in said seventh transmission step; and a second total reference weight update step for updating total reference weight of said reference destination object in accordance with said fifth additional reference weight received in said seventh reception step.

61. A recording medium that can be read by a computer according to claim 59, that further stores a program for realizing:

a fifth transmission step for, when a relay object created in said first relay object creation step receives a reference request from another object, adding a third additional reference weight having a prescribed value and transferring said reference request to said first reference destination object;

a fifth reception step for receiving said third additional reference weight and said reference request transmitted in said fifth transmission step;

a first total reference weight update step for updating total reference weight belonging to a reference destination object created in said first reference destination object creation step in accordance with said third additional reference weight received in said fifth reception step;

a sixth transmission step for transmitting a fourth additional reference weight having a value that corresponds to said third additional reference weight and specific information for specifying a module in which said reference destination object resides together with a response to a reference request received in said fifth reception step;

a sixth reception step for receiving said fourth additional reference weight, said specific information, and said response transmitted in said sixth transmission step;

a reference destination update step for updating partial reference weight of an object originating a reference request in accordance with said fourth additional reference weight received in said sixth reception step, and moreover, updating the reference destination of that object in accordance with said specific information;

a seventh transmission step for transmitting, to a module that has said reference destination object, a fifth additional reference weight having a value that corresponds to said fourth additional reference weight received in said sixth reception step together with a reference deletion request for deleting a reference from said relay object;

a seventh reception step for receiving a fifth additional reference weight and a reference deletion request transmitted in said seventh transmission step; and a second total reference weight update step for updating total reference weight of said reference destination object in accordance with said fifth additional reference weight received in said seventh reception step.

62. A recording medium that can be read by a computer according to claim 58, that further stores a program for realizing:

a relay discrimination step for discriminating whether or not said relay object is referenced from another object; and a memory region reclamation step for reclaiming memory regions of said relay object when it is determined in said relay discrimination step that said relay object is not referenced from another object.

63. A recording medium that can be read by a computer according to claim 59, that further stores a program for realizing:

a relay discrimination step for discriminating whether or not said relay object is referenced from another object; and a memory region reclamation step for reclaiming memory regions of said relay object when it is determined in said relay discrimination step that said relay object is not referenced from another object.

64. A recording medium that can be read by a computer according to claim 60, that further stores a program for realizing:

a relay discrimination step for discriminating whether or not said relay object is referenced from another object; and a memory region reclamation step for reclaiming memory regions of said relay object when it is determined in said relay discrimination step that said relay object is not referenced from another object.

65. A recording medium that can be read by a computer according to claim 61, that further stores a program for realizing:

a relay discrimination step for discriminating whether or not said relay object is referenced from another object; and a memory region reclamation step for reclaiming memory regions of said relay object when it is determined in said relay discrimination step that said relay object is not referenced from another object.

66. A recording medium that can be read by a computer and that stores a program for managing each of a reference origin object that references an object residing in another module and a reference destination object that is referenced from said reference origin object by means of partial reference weight and total reference weight; and stores a program for realizing:

a first transmission step for transmitting information relating to a module including information relating to an object to another computer other than said computer in which said module resides;

a first reception step for receiving information relating to a module transmitted in said first transmission step;

a first module creation step for creating a module having a reference destination object in which a prescribed value is set as total reference weight based on information relating to said module received in said first reception step;

a second transmission step for transmitting to a first receiving means said first additional reference weight having a value that corresponds to said total reference weight together with a response to information relating to said module received in said first reception step;

a second reception step for receiving a first additional reference weight for setting partial reference weight and a response to information relating to a module transmitted in said second transmission step; and a first relay module creation step for creating a relay module by setting said first additional reference weight received in said second reception step as partial reference weight and converting an object within that module to a relay object for transferring a reference request from another object to a transmission destination of information relating to said module.

67. A recording medium that can be read by a computer according to claim 66 that further stores a program for realizing:

a third transmission step for transmitting, to yet another computer by way of said network, information relating to a module created in said first module creation step containing information relating to said reference destination object;

a third reception step for receiving information relating to said module transmitted in a third transmission step of another computer;

a second module creation step for creating a module having a reference destination object in which a prescribed value is set as total reference weight based on information relating to said module received in said third reception step;

a fourth transmission step for transmitting, to a module that transmitted information relating to said module, a second additional reference weight having a value that corresponds to said total reference weight together with a response to information relating to said module received in said third reception step;

a fourth reception step for receiving said second additional reference weight and said response transmitted in a fourth transmission step of another computer; and a second relay module creation step for creating a relay module by setting said second additional reference weight received in said fourth reception step as partial reference weight and converting said reference destination object contained within a module created in said first module creation step to a relay object for transferring a reference request from another object to a reference destination object contained within a module created in said second module creation step.

* * * * *